(12) United States Patent
Agrawal et al.

(10) Patent No.: US 11,023,486 B2
(45) Date of Patent: Jun. 1, 2021

(54) LOW-LATENCY PREDICTIVE DATABASE ANALYSIS

(71) Applicant: ThoughtSpot, Inc., Sunnyvale, CA (US)

(72) Inventors: Sanjay Agrawal, Sammamish, WA (US); Antony Chuxiao Chen, Bellevue, WA (US); Gunjan Jha, Redmond, WA (US)

(73) Assignee: ThoughtSpot, Inc., Sunnyvale, CA (US)

( * ) Notice: Subject to any disclaimer, the term of this patent is extended or adjusted under 35 U.S.C. 154(b) by 23 days.

(21) Appl. No.: 16/681,208

(22) Filed: Nov. 12, 2019

(65) Prior Publication Data

US 2020/0151191 A1 May 14, 2020

Related U.S. Application Data

(60) Provisional application No. 62/760,419, filed on Nov. 13, 2018.

(51) Int. Cl.
*G06F 16/26* (2019.01)
*G06F 16/242* (2019.01)
(Continued)

(52) U.S. Cl.
CPC ............ *G06F 16/26* (2019.01); *G06F 16/248* (2019.01); *G06F 16/2428* (2019.01); *G06F 16/2457* (2019.01)

(58) Field of Classification Search
CPC .. G06F 16/26; G06F 16/2428; G06F 16/2457; G06F 16/248
(Continued)

(56) References Cited

U.S. PATENT DOCUMENTS

| 8,577,913 B1 | 11/2013 | Hansson et al. |
| 9,275,132 B2 | 3/2016 | Roberts et al. |

(Continued)

FOREIGN PATENT DOCUMENTS

| EP | 268367 A2 | 5/1988 |
| EP | 1587011 A1 | 10/2005 |

(Continued)

OTHER PUBLICATIONS

Sayyadian et al., "Efficient Keyword Search Across Heterogeneous Relational Databases", 2007, IEEE, 346-355 (10 pp).
(Continued)

*Primary Examiner* — Joshua Bullock
(74) *Attorney, Agent, or Firm* — Young Basile Hanlon & MacFarlane, P.C.

(57) ABSTRACT

Low-latency autonomous-analysis includes obtaining data expressing a usage intent with respect to a low-latency database analysis system that intent omits data corresponding to user input expressly requesting low-latency autonomous-analysis, obtaining requested results data based on the data expressing the usage intent, outputting requested visualization data representing at least a portion of the requested results data for presentation to a user, and, in response to outputting the requested visualization data, obtaining low-latency autonomous-analysis data by performing low-latency autonomous-analysis based on the data expressing the usage intent by identifying an autonomous-analysis predicate based on the requested visualization data, obtaining a defined autonomous-analysis latency constraint, obtaining the low-latency autonomous-analysis data based on the autonomous-analysis predicate in accordance with the defined autonomous-analysis latency constraint, such that the low-latency autonomous-analysis data differs from the requested results data, and outputting at least a portion of the (Continued)

low-latency autonomous-analysis data for presentation to a user.

20 Claims, 9 Drawing Sheets

(51) Int. Cl.
   *G06F 16/2457* (2019.01)
   *G06F 16/248* (2019.01)
(58) Field of Classification Search
   USPC .......................................................... 707/722
   See application file for complete search history.

(56) References Cited

U.S. PATENT DOCUMENTS

| | | | |
|---|---|---|---|
| 9,405,794 | B2 | 8/2016 | Prakash et al. |
| 10,248,720 | B1* | 4/2019 | Wesley ................... G06F 16/34 |
| 2004/0267730 | A1 | 12/2004 | Dumais et al. |
| 2005/0027717 | A1 | 2/2005 | Koudas et al. |
| 2005/0289124 | A1 | 12/2005 | Kaiser et al. |
| 2006/0122976 | A1* | 6/2006 | Baluja ................. G06F 16/9558 |
| 2007/0192300 | A1 | 8/2007 | Reuther et al. |
| 2007/0219974 | A1 | 9/2007 | Chickering et al. |
| 2008/0109422 | A1 | 5/2008 | Dedhia |
| 2009/0019019 | A1 | 1/2009 | Jones et al. |
| 2009/0019022 | A1 | 1/2009 | Schallert et al. |
| 2011/0113048 | A1 | 5/2011 | Njemanze |
| 2012/0066217 | A1 | 3/2012 | Eder |
| 2012/0162265 | A1 | 6/2012 | Heinrich et al. |
| 2013/0339370 | A1 | 12/2013 | Holstege et al. |
| 2014/0156639 | A1 | 6/2014 | Shridhar et al. |
| 2014/0201241 | A1 | 7/2014 | Wood et al. |
| 2014/0337371 | A1 | 11/2014 | Li |
| 2015/0026153 | A1 | 1/2015 | Gupta et al. |
| 2016/0371317 | A1* | 12/2016 | Sharma ................... G06F 16/23 |
| 2017/0270159 | A1 | 9/2017 | Wang et al. |
| 2019/0095510 | A1* | 3/2019 | Cruise ................. G06F 11/3452 |

FOREIGN PATENT DOCUMENTS

| | | | |
|---|---|---|---|
| EP | 2202658 | A2 | 6/2010 |
| EP | 2207106 | A2 | 7/2010 |
| WO | 0141002 | A1 | 6/2001 |
| WO | 2015009353 | A1 | 1/2015 |

OTHER PUBLICATIONS

Wu et al: "Towards Keyword-Driven Analytical Processing", Proceedings of the 2007 ACM Sigmod International Conference on Management of Data, Sigmo '07, Jun. 12, 2007, (12 pp).

Anonymous: "File System Permission—Wikipedia, The Free Encyclopedia." Jun. 11, 2013 (Jun. 11, 2013); URL: http://en.wikipedia.org/w/index/php?title.sub.-File.sub.-system.sub.-p-ermissions &oldid=559455322 [retrieved on May 11, 2014]; (8 pp).

Shi et al.: "50x Faster: Speeding Up an SQL-Based Legacy System With Few Changes", Oct. 4, 2011 Retrieved from Internet: URL: http://www.user.tu-berline.de/komm/CD/paper/040221.pdf [retrieved on Jun. 11, 2014]. (12 pp).

Li et al: "Efficient Type-Ahead Search on Relational Data: a Tastier Approach", Sigmod-Pods '09: Compilation Proceedings of the International Conference on Management Data & 28th Symposium on Principles of Database Systems; Providence, RI,USA, Association for Computing Machines, New York NY Jun. 29, 2009, pp. 695-706 (12 pp).

Blunschi et al: "SODA: Generating SQL for Business Users", Proceedings of the VLDB Endowment, vol. 5, No. 10, Aug. 27, 2012 pp. 932-935 (12 pp).

Baid et al: "Toward Scalable Keyword Search over Relational Data", Proceedings of the VLDS Endowment, vol. 3, No. 1-2, Sep. 1, 2010, pp. 140-149 (10 pp).

Jajodia et al., "Flexible Support for Multiple Access Control Policies", ACM Transactions on Database Systems, ACM New York, NY, USA, vol. 26, No. 2, Jun. 1, 2001, pp. 217-228 (48 pp).

Anonymous, "Natural Language Processing", Wikipedia, Downloaded Jan. 30, 2019, https://en.wikipedia.org/wiki/Natural_language_processing, (8 pp).

Seif, G., "An Easy Introduction to Natural Language Processing—Using Computers to Understand Human Language", Oct. 1, 2018 (Downloaded Jan. 30, 2019), https://towardsdatascience.com/an-easy-introduction-to-natural-language-processing-b1e2801291c1, (11 pp).

Extended European Search Report received in co-pending Application No. EP 19160657.3 dated Apr. 4, 2019 (11 pp).

International Search Report and Written Opinion for PCT/US14/39230; dated Nov. 24, 2014 (16 pp).

Avrach, A., thoughtspot.com, "What the Bleep is a Chasm Trap?", https://www.thoughtspot.com/fact-and-dimension/what-bleep-chasm-trap 9/, Date Unknown, Downloaded Apr. 2, 2019 (9 pp).

Sisense, "Chasm and Fan Traps", https://documentation.sisense.com/latest/managing-data/working-with-data/chasm-fan-traps.htm, Date Unknown, Downloaded Apr. 2, 2019 (8 pp).

Thoughtspot, "Chasm Traps", https://docs.thoughtspot.com/4.4/admin/loading/chasm-trap.html, Version 4.4 Guides, Date Unknown, Downloaded Apr. 2, 2019 (4 pp).

Morton, K., et al., "Dynamic Workload Driven Data Integration In Tableau", Proceedings of the 2012 International Conference on Management of Data, SIGMOD '12, Jan. 1, 2012, p. 807 (9 pp).

Extended European Search Report dated Jul. 26, 2019, issued in co-pending EP Application No. 19166422.6 (11 pp).

Wikipedia, "Consistent hashing", https://en.wikipedia.org/wiki/Consistent_hashing, Date Unknown, Downloaded Aug. 15, 2019, (5 pp).

Eades, Peter, et al., "A Fast & Effective Heuristic for the Feedback Arc Set Problem," Information Processing Letters, vol. 47, Issue 6, Oct. 18, 1993, pp. 319-323.

Wikipedia, "Dijkstra's algorithm", Date Unknown, downloaded Jul. 16, 2019, https://en.wikipedia.org/wiki/Dijkstra%27s_algorithm (11 pp).

Extended European Search Reported issued in co-pending European Application No. 19208974.6 dated Mar. 30, 2020 (9 pp).

* cited by examiner

LOW-LATENCY PREDICTIVE DATABASE ANALYSIS

CROSS-REFERENCE TO RELATED APPLICATION(S)

This application claims priority to and the benefit of U.S. Provisional Application Patent Ser. No. 62/760,419, filed Nov. 13, 2018, the entire disclosure of which is hereby incorporated by reference.

BACKGROUND

Advances in computer storage and database technology have led to exponential growth of the amount of data being created. Businesses are overwhelmed by the volume of the data stored in their computer systems. Existing database analytic tools are inefficient, costly to utilize, and/or require substantial configuration and training.

SUMMARY

Disclosed herein are implementations of low-latency predictive database analysis.

An aspect of the disclosure is a method of low-latency predictive database analysis for use in a low-latency database analysis system. Low-latency predictive database analysis includes obtaining data expressing a usage intent with respect to the low-latency database analysis system, wherein the data expressing the usage intent omits data corresponding to user input expressly requesting low-latency autonomous-analysis, obtaining requested results data based on the data expressing the usage intent, outputting requested visualization data representing at least a portion of the requested results data for presentation to a user, and, in response to outputting the requested visualization data, obtaining low-latency autonomous-analysis data by performing low-latency autonomous-analysis based on the data expressing the usage intent. Low-latency autonomous-analysis includes identifying an autonomous-analysis predicate based on the requested visualization data, obtaining a defined autonomous-analysis latency constraint, obtaining the low-latency autonomous-analysis data based on the autonomous-analysis predicate in accordance with the defined autonomous-analysis latency constraint, such that the low-latency autonomous-analysis data differs from the requested results data, and outputting at least a portion of the low-latency autonomous-analysis data for presentation to a user.

Another aspect of the disclosure is a method of low-latency predictive database analysis for use in a low-latency database analysis system. Low-latency predictive database analysis includes obtaining data expressing a usage intent with respect to the low-latency database analysis system, wherein the data expressing the usage intent omits data corresponding to user input expressly requesting low-latency autonomous-analysis, obtaining requested results data based on the data expressing the usage intent, and outputting requested visualization data representing at least a portion of the requested results data for presentation to a user. In response to outputting the requested visualization data, low-latency predictive database analysis includes obtaining a defined autonomous-analysis latency constraint, wherein obtaining the defined autonomous-analysis latency constraint includes identifying a value of an autonomous-analysis depth constraint, wherein a first candidate value of the autonomous-analysis depth constraint indicates the omission of low-latency autonomous-analysis, and, in response to a determination that the value of the autonomous-analysis depth constraint is a second candidate value of the autonomous-analysis depth constraint that differs from the first candidate value of the autonomous-analysis depth constraint, obtaining low-latency autonomous-analysis data by identifying an autonomous-analysis predicate based on the requested visualization data, identifying a requested data portion based on the autonomous-analysis predicate, obtaining the low-latency autonomous-analysis data, in accordance with the defined autonomous-analysis depth constraint, based on the requested data portion, and outputting a visualization card representing at least a portion of the low-latency autonomous-analysis data for presentation to a user Another aspect of the disclosure is a method of low-latency predictive database analysis for use in a low-latency database analysis system. Low-latency predictive database analysis includes obtaining data expressing a usage intent with respect to the low-latency database analysis system, wherein the data expressing the usage intent omits data corresponding to user input expressly requesting low-latency autonomous-analysis, obtaining requested results data based on the data expressing the usage intent, wherein obtaining the requested results data includes identifying a first resolved-request corresponding to the expressly-specified request for data, outputting requested visualization data representing at least a portion of the requested results data for presentation to a user, and, in response to outputting the requested visualization data, and in response to a determination that the data expressing the usage intent includes an expressly-specified request for data, obtaining low-latency autonomous-analysis related-request data by identifying an autonomous-analysis predicate based on the requested visualization data, obtaining a defined autonomous-analysis related-request latency constraint, obtaining the low-latency autonomous-analysis related-request data based on the autonomous-analysis predicate in accordance with the defined autonomous-analysis related-request latency constraint, such that the low-latency autonomous-analysis related-request data includes a second resolved-request that differs from the first resolved-request, and outputting at least a portion of the low-latency autonomous-analysis related-request data for presentation to a user.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Businesses and other organizations store large amounts of data, such as business records, transaction records, and the like, in data storage systems, such as relational database systems that store data as records, or rows, having values, or fields, corresponding to respective columns in tables that can be interrelated using key values. Databases structures are often normalized or otherwise organized to maximize data density and to maximize transactional data operations at the expense of increased complexity and reduced accessibility for analysis. Individual records and tables may have little or no utility without substantial correlation, interpretation, and analysis. The complexity of these data structures and the large volumes of data that can be stored therein limit the accessibility of the data and require substantial skilled human resources to code procedures and tools that allow business users to access useful data. The tools that are available for accessing these systems are limited to outputting data expressly requested by the users and lack the capability to identify and prioritize data other than the data expressly requested. Useful data, such as data aggregations, patterns, and statistical anomalies that would not be available in smaller data sets (e.g., 10,000 rows of data), and may not be apparent to human users, may be derivable using the large volume of data (e.g., millions or billions of rows) stored in complex data storage systems, such as relational database systems, and may be inaccessible due to the complexity and limitations of the data storage systems.

The systems and methods for low-latency predictive database analysis disclosed herein improve the efficiency and accessibility of database storage systems by automatically identifying and prioritizing data based on probabilistic utility, to create or surface low-latency autonomous-analysis data other than data expressly requested. The low-latency autonomous-analysis data may include low-latency autonomous-analysis insight data, low-latency autonomous-analysis related-request data, or both. Low-latency autonomous-analysis insight data may include automatically generated data indicating a data anomaly related to requested data, a trend related to requested data, a cross-correlation among aspects of requested data or data related to the requested data, a comparative analysis of aspects of the requested data, or a combination thereof. Low-latency autonomous-analysis related-request data may indicate an automatically generated request for data that differs from an expressly-specified request for data. The low-latency autonomous-analysis data may be obtained based on probabilistic utility. Low-latency predictive database analysis may improve the performance and efficiency of predictive database analysis by identifying one or more latency constraints and limiting the resource utilization of the predictive database analysis based on the identified latency constraints.

Figure 1:
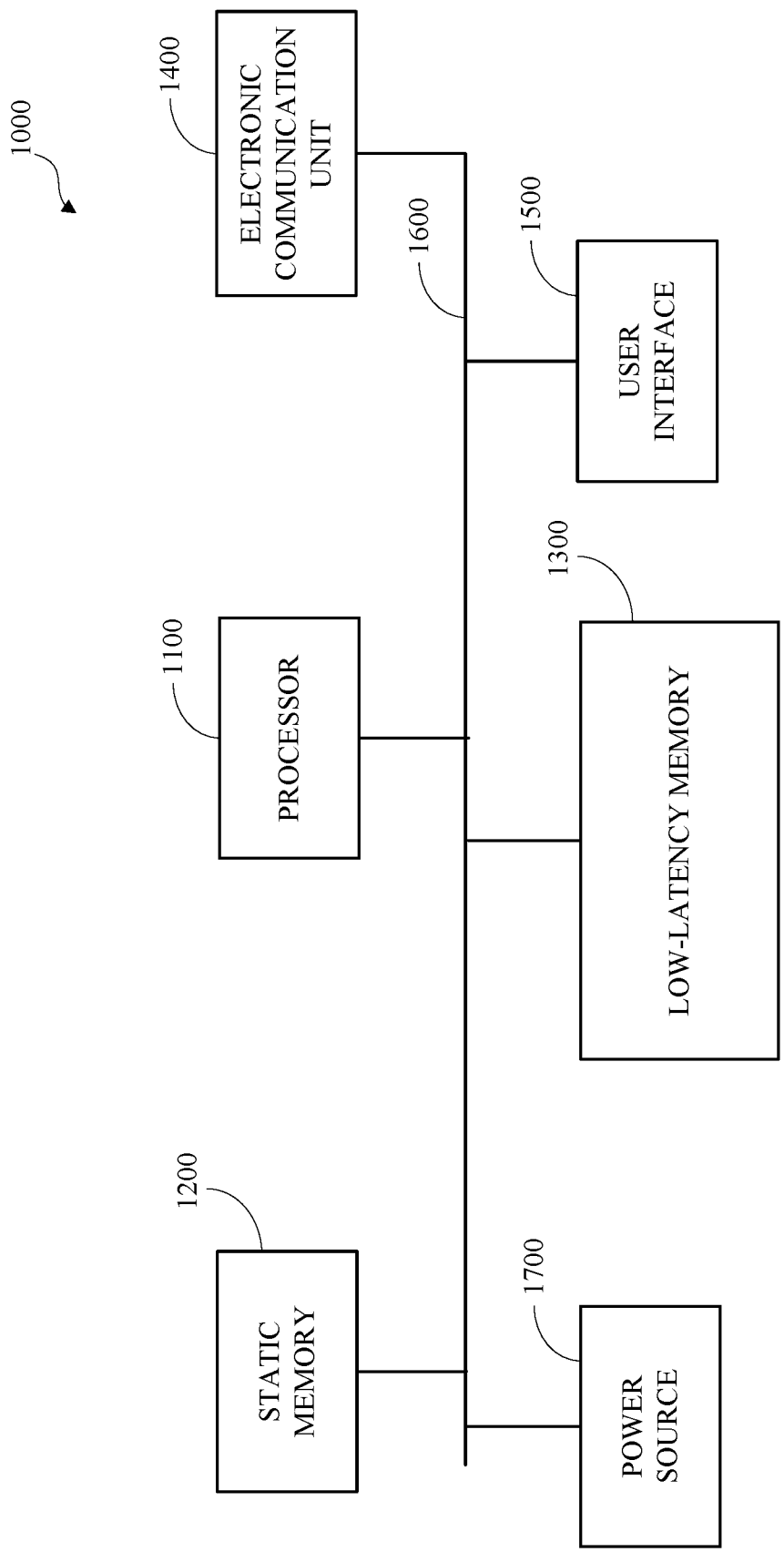
FIG. 1 is a block diagram of an example of a computing device.

FIG. 1 is a block diagram of an example of a computing device 1000. One or more aspects of this disclosure may be implemented using the computing device 1000. The computing device 1000 includes a processor 1100, static memory 1200, low-latency memory 1300, an electronic communication unit 1400, a user interface 1500, a bus 1600, and a power source 1700. Although shown as a single unit, any one or more element of the computing device 1000 may be integrated into any number of separate physical units. For example, the low-latency memory 1300 and the processor 1100 may be integrated in a first physical unit and the user interface 1500 may be integrated in a second physical unit. Although not shown in FIG. 1, the computing device 1000 may include other aspects, such as an enclosure or one or more sensors.

The computing device 1000 may be a stationary computing device, such as a personal computer (PC), a server, a workstation, a minicomputer, or a mainframe computer; or a mobile computing device, such as a mobile telephone, a personal digital assistant (PDA), a laptop, or a tablet PC.

The processor 1100 may include any device or combination of devices capable of manipulating or processing a signal or other information, including optical processors, quantum processors, molecular processors, or a combination thereof. The processor 1100 may be a central processing unit (CPU), such as a microprocessor, and may include one or more processing units, which may respectively include one or more processing cores. The processor 1100 may include multiple interconnected processors. For example, the multiple processors may be hardwired or networked, including wirelessly networked. In some implementations, the operations of the processor 1100 may be distributed across multiple physical devices or units that may be coupled directly or across a network. In some implementations, the processor 1100 may include a cache, or cache memory, for internal storage of operating data or instructions. The processor 1100 may include one or more special purpose processors, one or more digital signal processor (DSP), one or more microprocessors, one or more controllers, one or more microcontrollers, one or more integrated circuits, one or more an Application Specific Integrated Circuits, one or more Field Programmable Gate Array, one or more programmable logic arrays, one or more programmable logic controllers, firmware, one or more state machines, or any combination thereof.

The processor 1100 may be operatively coupled with the static memory 1200, the low-latency memory 1300, the electronic communication unit 1400, the user interface 1500, the bus 1600, the power source 1700, or any combination thereof. The processor may execute, which may include controlling, such as by sending electronic signals to, receiving electronic signals from, or both, the static memory 1200, the low-latency memory 1300, the electronic communication unit 1400, the user interface 1500, the bus 1600, the power source 1700, or any combination thereof to execute, instructions, programs, code, applications, or the like, which may include executing one or more aspects of an operating system, and which may include executing one or more instructions to perform one or more aspects described herein, alone or in combination with one or more other processors.

The static memory 1200 is coupled to the processor 1100 via the bus 1600 and may include non-volatile memory, such as a disk drive, or any form of non-volatile memory capable of persistent electronic information storage, such as in the absence of an active power supply. Although shown as a single block in FIG. 1, the static memory 1200 may be implemented as multiple logical or physical units.

The static memory 1200 may store executable instructions or data, such as application data, an operating system, or a combination thereof, for access by the processor 1100. The executable instructions may be organized into programmable modules or algorithms, functional programs, codes, code segments, or combinations thereof to perform one or more aspects, features, or elements described herein. The application data may include, for example, user files, database catalogs, configuration information, or a combination thereof. The operating system may be, for example, a desktop or laptop operating system; an operating system for a mobile device, such as a smartphone or tablet device; or an operating system for a large device, such as a mainframe computer.

The low-latency memory 1300 is coupled to the processor 1100 via the bus 1600 and may include any storage medium with low-latency data access including, for example, DRAM modules such as DDR SDRAM, Phase-Change Memory (PCM), flash memory, or a solid-state drive. Although shown as a single block in FIG. 1, the low-latency memory 1300 may be implemented as multiple logical or physical units. Other configurations may be used. For example, low-latency memory 1300, or a portion thereof, and processor 1100 may be combined, such as by using a system on a chip design.

The low-latency memory 1300 may store executable instructions or data, such as application data for low-latency access by the processor 1100. The executable instructions may include, for example, one or more application programs, that may be executed by the processor 1100. The executable instructions may be organized into programmable modules or algorithms, functional programs, codes, code segments, and/or combinations thereof to perform various functions described herein.

The low-latency memory 1300 may be used to store data that is analyzed or processed using the systems or methods described herein. For example, storage of some or all data in low-latency memory 1300 instead of static memory 1200 may improve the execution speed of the systems and methods described herein by permitting access to data more quickly by an order of magnitude or greater (e.g., nanoseconds instead of microseconds).

The electronic communication unit 1400 is coupled to the processor 1100 via the bus 1600. The electronic communication unit 1400 may include one or more transceivers. The electronic communication unit 1400 may, for example, provide a connection or link to a network via a network interface. The network interface may be a wired network interface, such as Ethernet, or a wireless network interface. For example, the computing device 1000 may communicate with other devices via the electronic communication unit 1400 and the network interface using one or more network protocols, such as Ethernet, Transmission Control Protocol/Internet Protocol (TCP/IP), power line communication (PLC), Wi-Fi, infrared, ultra violet (UV), visible light, fiber optic, wire line, general packet radio service (GPRS), Global System for Mobile communications (GSM), code-division multiple access (CDMA), Long-Term Evolution (LTE), or other suitable protocols.

The user interface 1500 may include any unit capable of interfacing with a human user, such as a virtual or physical keypad, a touchpad, a display, a touch display, a speaker, a microphone, a video camera, a sensor, a printer, or any combination thereof. For example, a keypad can convert physical input of force applied to a key to an electrical signal that can be interpreted by computing device 1000. In another example, a display can convert electrical signals output by computing device 1000 to light. The purpose of such devices may be to permit interaction with a human user, for example by accepting input from the human user and providing output back to the human user. The user interface 1500 may include a display; a positional input device, such as a mouse, touchpad, touchscreen, or the like; a keyboard; or any other human and machine interface device. The user interface 1500 may be coupled to the processor 1100 via the bus 1600. In some implementations, the user interface 1500 can include a display, which can be a liquid crystal display (LCD), a cathode-ray tube (CRT), a light emitting diode (LED) display, an organic light emitting diode (OLED) display, an active matrix organic light emitting diode (AMOLED), or other suitable display. In some implementations, the user interface 1500, or a portion thereof, may be part of another computing device (not shown). For example, a physical user interface, or a portion thereof, may be omitted from the computing device 1000 and a remote or virtual interface may be used, such as via the electronic communication unit 1400.

The bus 1600 is coupled to the static memory 1200, the low-latency memory 1300, the electronic communication unit 1400, the user interface 1500, and the power source 1700. Although a single bus is shown in FIG. 1, the bus 1600 may include multiple buses, which may be connected, such as via bridges, controllers, or adapters.

The power source 1700 provides energy to operate the computing device 1000. The power source 1700 may be a general-purpose alternating-current (AC) electric power supply, or power supply interface, such as an interface to a household power source. In some implementations, the power source 1700 may be a single use battery or a rechargeable battery to allow the computing device 1000 to operate independently of an external power distribution system. For example, the power source 1700 may include a wired power source; one or more dry cell batteries, such as nickel-cadmium (NiCad), nickel-zinc (NiZn), nickel metal hydride (NiMH), lithium-ion (Li-ion); solar cells; fuel cells; or any other device capable of powering the computing device 1000.

Figure 2:
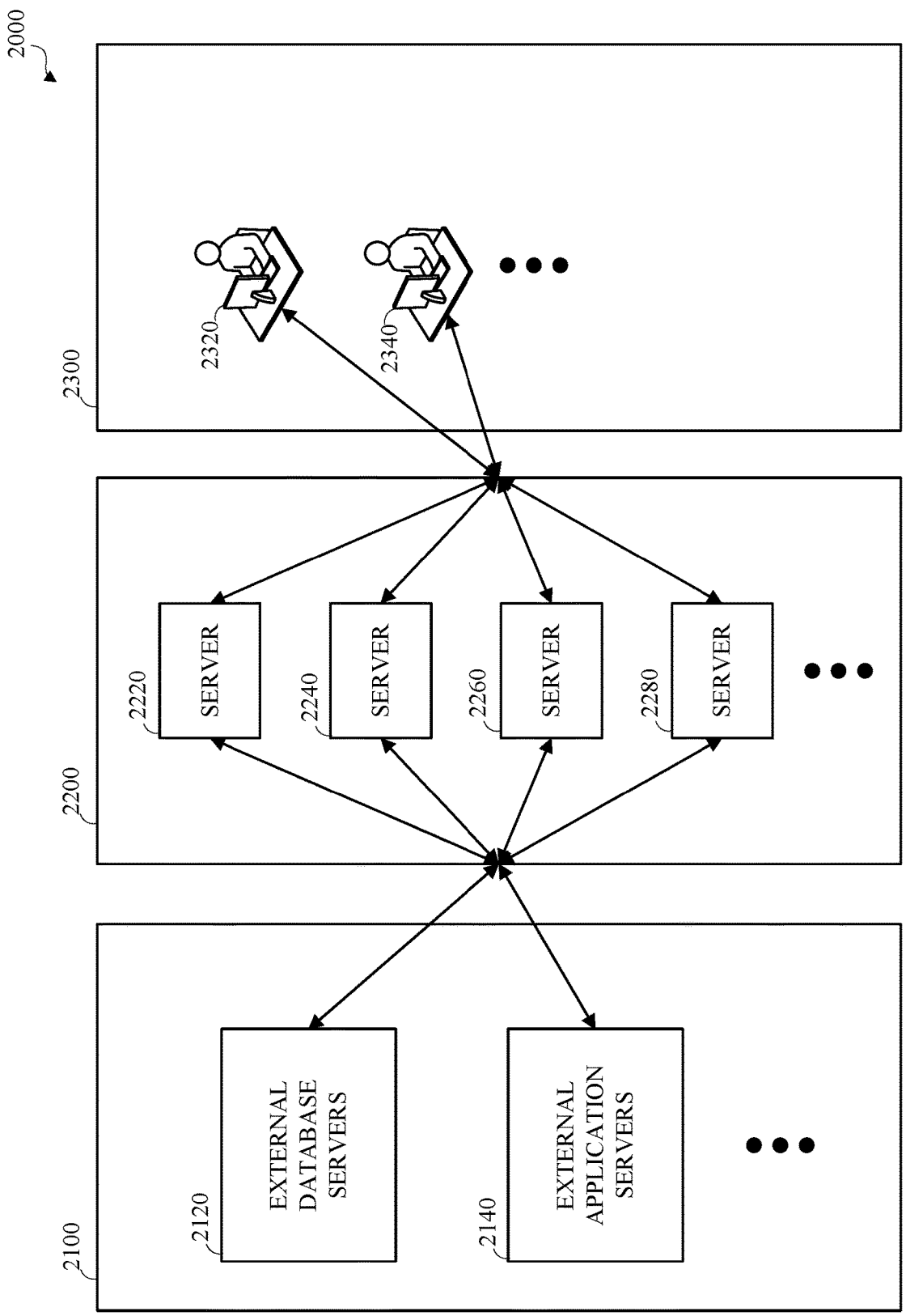
FIG. 2 is a block diagram of an example of a computing system.

FIG. 2 is a block diagram of an example of a computing system 2000. As shown, the computing system 2000 includes an external data source portion 2100, an internal database analysis portion 2200, and a system interface portion 2300. The computing system 2000 may include other elements not shown in FIG. 2, such as computer network elements.

The external data source portion 2100 may be associated with, such as controlled by, an external person, entity, or organization (second-party). The internal database analysis portion 2200 may be associated with, such as created by or controlled by, a person, entity, or organization (first-party). The system interface portion 2300 may be associated with, such as created by or controlled by, the first-party and may be accessed by the first-party, the second-party, third-parties, or a combination thereof, such as in accordance with access and authorization permissions and procedures.

The external data source portion 2100 is shown as including external database servers 2120 and external application servers 2140. The external data source portion 2100 may include other elements not shown in FIG. 2. The external data source portion 2100 may include external computing devices, such as the computing device 1000 shown in FIG. 1, which may be used by or accessible to the external person, entity, or organization (second-party) associated with the external data source portion 2100, including but not limited to external database servers 2120 and external application servers 2140. The external computing devices may include data regarding the operation of the external person, entity, or organization (second-party) associated with the external data source portion 2100.

The external database servers 2120 may be one or more computing devices configured to store data in a format and schema determined externally from the internal database analysis portion 2200, such as by a second-party associated with the external data source portion 2100, or a third party. For example, the external database server 2120 may use a relational database and may include a database catalog with a schema. In some embodiments, the external database server 2120 may include a non-database data storage structure, such as a text-based data structure, such as a comma separated variable structure or an extensible markup language formatted structure or file. For example, the external database servers 2120 can include data regarding the production of materials by the external person, entity, or organization (second-party) associated with the external data source portion 2100, communications between the external person, entity, or organization (second-party) associated with the external data source portion 2100 and third parties, or a combination thereof. Other data may be included. The external database may be a structured database system, such as a relational database operating in a relational database management system (RDBMS), which may be an enterprise database. In some embodiments, the external database may be an unstructured data source. The external data may include data or content, such as sales data, revenue data, profit data, tax data, shipping data, safety data, sports data, health data, weather data, or the like, or any other data, or combination of data, that may be generated by or associated with a user, an organization, or an enterprise and stored in a database system. For simplicity and clarity, data stored in or received from the external data source portion 2100 may be referred to herein as enterprise data.

The external application server 2140 may include application software, such as application software used by the external person, entity, or organization (second-party) associated with the external data source portion 2100. The external application server 2140 may include data or metadata relating to the application software.

The external database servers 2120, the external application servers 2140, or both, shown in FIG. 2 may represent logical units or devices that may be implemented on one or more physical units or devices, which may be controlled or operated by the first party, the second party, or a third party.

The external data source portion 2100, or aspects thereof, such as the external database servers 2120, the external application servers 2140, or both, may communicate with the internal database analysis portion 2200, or an aspect thereof, such as one or more of the servers 2220, 2240, 2260, and 2280, via an electronic communication medium, which may be a wired or wireless electronic communication medium. For example, the electronic communication medium may include a local area network (LAN), a wide area network (WAN), a fiber channel network, the Internet, or a combination thereof.

The internal database analysis portion 2200 is shown as including servers 2220, 2240, 2260, and 2280. The servers 2220, 2240, 2260, and 2280 may be computing devices, such as the computing device 1000 shown in FIG. 1. Although four servers 2220, 2240, 2260, and 2280 are shown in FIG. 2, other numbers, or cardinalities, of servers may be used. For example, the number of computing devices may be determined based on the capability of individual computing devices, the amount of data to be processed, the complexity of the data to be processed, or a combination thereof. Other metrics may be used for determining the number of computing devices.

The internal database analysis portion 2200 may store data, process data, or store and process data. The internal database analysis portion 2200 may include a distributed cluster (not expressly shown) which may include two or more of the servers 2220, 2240, 2260, and 2280. The operation of distributed cluster, such as the operation of the servers 2220, 2240, 2260, and 2280 individually, in combination, or both, may be managed by a distributed cluster manager. For example, the server 2220 may be the distributed cluster manager. In another example, the distributed cluster manager may be implemented on another computing device (not shown). The data and processing of the distributed cluster may be distributed among the servers 2220, 2240, 2260, and 2280, such as by the distributed cluster manager.

Enterprise data from the external data source portion 2100, such as from the external database server 2120, the external application server 2140, or both may be imported into the internal database analysis portion 2200. The external database server 2120, the external application server 2140, or both may be one or more computing devices and may communicate with the internal database analysis portion 2200 via electronic communication. The imported data may be distributed among, processed by, stored on, or a combination thereof, one or more of the servers 2220, 2240, 2260, and 2280. Importing the enterprise data may include importing or accessing the data structures of the enterprise data. Importing the enterprise data may include generating internal data, internal data structures, or both, based on the enterprise data. The internal data, internal data structures, or both may accurately represent and may differ from the enterprise data, the data structures of the enterprise data, or both. In some implementations, enterprise data from multiple external data sources may be imported into the internal database analysis portion 2200. For simplicity and clarity, data stored or used in the internal database analysis portion 2200 may be referred to herein as internal data. For example, the internal data, or a portion thereof, may represent, and may be distinct from, enterprise data imported into or accessed by the internal database analysis portion 2200.

The system interface portion 2300 may include one or more client devices 2320, 2340. The client devices 2320, 2340 may be computing devices, such as the computing device 1000 shown in FIG. 1. For example, one of the client devices 2320, 2340 may be a desktop or laptop computer and the other of the client devices 2320, 2340 may be a mobile device, smartphone, or tablet. One or more of the client devices 2320, 2340 may access the internal database analysis portion 2200. For example, the internal database analysis portion 2200 may provide one or more services, application interfaces, or other electronic computer communication interfaces, such as a web site, and the client devices 2320, 2340 may access the interfaces provided by the internal database analysis portion 2200, which may include accessing the internal data stored in the internal database analysis portion 2200.

In an example, one or more of the client devices 2320, 2340 may send a message or signal indicating a request for data, which may include a request for data analysis, to the internal database analysis portion 2200. The internal database analysis portion 2200 may receive and process the request, which may include distributing the processing among one or more of the servers 2220, 2240, 2260, and 2280, may generate a response to the request, which may include generating or modifying internal data, internal data structures, or both, and may output the response to the client device 2320, 2340 that sent the request. Processing the request may include accessing one or more internal data indexes, an internal database, or a combination thereof. The client device 2320, 2340 may receive the response, including the response data or a portion thereof, and may store, output, or both, the response or a representation thereof, such as a representation of the response data, or a portion thereof, which may include presenting the representation via a user interface on a presentation device of the client device 2320, 2340, such as to a user of the client device 2320, 2340.

The system interface portion 2300, or aspects thereof, such as one or more of the client devices 2320, 2340, may communicate with the internal database analysis portion 2200, or an aspect thereof, such as one or more of the servers 2220, 2240, 2260, and 2280, via an electronic communication medium, which may be a wired or wireless electronic communication medium. For example, the electronic communication medium may include a local area network (LAN), a wide area network (WAN), a fiber channel network, the Internet, or a combination thereof.

Figure 3:
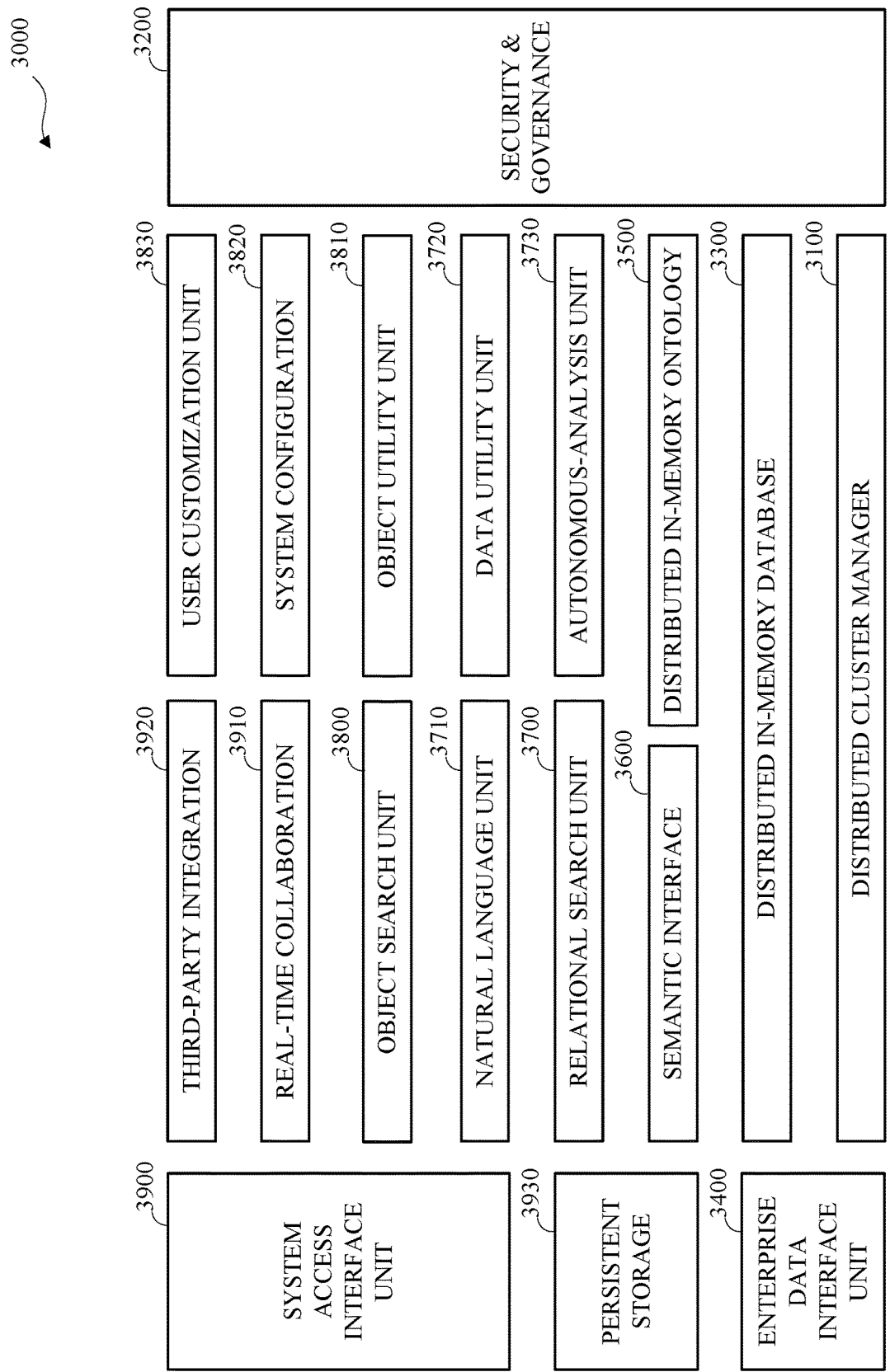
FIG. 3 is a block diagram of an example of a low-latency database analysis system.

FIG. 3 is a block diagram of an example of a low-latency database analysis system 3000. The low-latency database analysis system 3000, or aspects thereof, may be similar to the internal database analysis portion 2200 shown in FIG. 2, except as described herein or otherwise clear from context. The low-latency database analysis system 3000, or aspects thereof, may be implemented on one or more computing devices, such as servers 2220, 2240, 2260, and 2280 shown in FIG. 2, which may be in a clustered or distributed computing configuration.

The low-latency database analysis system 3000 may store and maintain the internal data, or a portion thereof, such as low-latency data, in a low-latency memory device, such as the low-latency memory 1300 shown in FIG. 1, or any other type of data storage medium or combination of data storage devices with relatively fast (low-latency) data access, organized in a low-latency data structure. In some embodiments, the low-latency database analysis system 3000 may be implemented as one or more logical devices in a cloud-based configuration optimized for automatic database analysis.

As shown, the low-latency database analysis system 3000 includes a distributed cluster manager 3100, a security and governance unit 3200, a distributed in-memory database 3300, an enterprise data interface unit 3400, a distributed in-memory ontology unit 3500, a semantic interface unit 3600, a relational search unit 3700, a natural language processing unit 3710, a data utility unit 3720, an autonomous-analysis unit 3730, an object search unit 3800, an object utility unit 3810, a system configuration unit 3820, a user customization unit 3830, a system access interface unit 3900, a real-time collaboration unit 3910, a third-party integration unit 3920, and a persistent storage unit 3930, which may be collectively referred to as the components of the low-latency database analysis system 3000.

Although not expressly shown in FIG. 3, one or more of the components of the low-latency database analysis system 3000 may be implemented on one or more operatively connected physical or logical computing devices, such as in a distributed cluster computing configuration, such as the internal database analysis portion 2200 shown in FIG. 2. Although shown separately in FIG. 3, one or more of the components of the low-latency database analysis system 3000, or respective aspects thereof, may be combined or otherwise organized.

The low-latency database analysis system 3000 may include different, fewer, or additional components not shown in FIG. 3. The aspects or components implemented in an instance of the low-latency database analysis system 3000 may be configurable. For example, the autonomous-analysis unit 3730 may be omitted or disabled. One or more of the components of the low-latency database analysis system 3000 may be implemented in a manner such that aspects thereof are divided or combined into various executable modules or libraries in a manner which may differ from that described herein.

The low-latency database analysis system 3000 may implement an application programming interface (API), which may monitor, receive, or both, input signals or messages from external devices and systems, client systems, process received signals or messages, transmit corresponding signals or messages to one or more of the components of the low-latency database analysis system 3000, and output, such as transmit or send, output messages or signals to respective external devices or systems. The low-latency database analysis system 3000 may be implemented in a distributed computing configuration.

The distributed cluster manager 3100 manages the operative configuration of the low-latency database analysis system 3000. Managing the operative configuration of the low-latency database analysis system 3000 may include controlling the implementation of and distribution of processing and storage across one or more logical devices operating on one or more physical devices, such as the servers 2220, 2240, 2260, and 2280 shown in FIG. 2. The distributed cluster manager 3100 may generate and maintain configuration data for the low-latency database analysis system 3000, such as in one or more tables, identifying the operative configuration of the low-latency database analysis system 3000. For example, the distributed cluster manager 3100 may automatically update the low-latency database analysis system configuration data in response to an operative configuration event, such as a change in availability or performance for a physical or logical unit of the low-latency database analysis system 3000. One or more of the component units of low-latency database analysis system 3000 may access the database analysis system configuration data, such as to identify intercommunication parameters or paths.

The security and governance unit 3200 may describe, implement, enforce, or a combination thereof, rules and procedures for controlling access to aspects of the low-latency database analysis system 3000, such as the internal data of the low-latency database analysis system 3000 and the features and interfaces of the low-latency database analysis system 3000. The security and governance unit 3200 may apply security at an ontological level to control or limit access to the internal data of the low-latency database analysis system 3000, such as to columns, tables, rows, or fields, which may include using row level security.

Although shown as a single unit in FIG. 3, the distributed in-memory database 3300 may be implemented in a distributed configuration, such as distributed among the servers 2220, 2240, 2260, and 2280 shown in FIG. 2, which may include multiple in-memory database instances. Each in-memory database instance may utilize one or more distinct resources, such as processing or low-latency memory resources, that differ from the resources utilized by the other in-memory database instances. In some embodiments, the in-memory database instances may utilize one or more shared resources, such as resources utilized by two or more in-memory database instances.

The distributed in-memory database 3300 may generate, maintain, or both, a low-latency data structure and data stored or maintained therein (low-latency data). The low-latency data may include principal data, which may represent enterprise data, such as enterprise data imported from an external enterprise data source, such as the external data source portion 2100 shown in FIG. 2. In some implementations, the distributed in-memory database 3300 may include system internal data representing one or more aspects, features, or configurations of the low-latency database analysis system 3000. The distributed in-memory database 3300 and the low-latency data stored therein, or a portion thereof, may be accessed using commands, messages, or signals in accordance with a defined structured query language associated with the distributed in-memory database 3300.

The low-latency data, or a portion thereof, may be organized as tables in the distributed in-memory database 3300. A table may be a data structure to organize or group the data or a portion thereof, such as related or similar data. A table may have a defined structure. For example, each table may define or describe a respective set of one or more columns.

A column may define or describe the characteristics of a discrete aspect of the data in the table. For example, the definition or description of a column may include an identifier, such as a name, for the column within the table, and one or more constraints, such as a data type, for the data corresponding to the column in the table. The definition or description of a column may include other information, such as a description of the column. The data in a table may be accessible or partitionable on a per-column basis. The set of tables, including the column definitions therein, and information describing relationships between elements, such as tables and columns, of the database may be defined or described by a database schema or design. The cardinality of columns of a table, and the definition and organization of the columns, may be defined by the database schema or design. Adding, deleting, or modifying a table, a column, the definition thereof, or a relationship or constraint thereon, may be a modification of the database design, schema, model, or structure.

The low-latency data, or a portion thereof, may be stored in the database as one or more rows or records in respective tables. Each record or row of a table may include a respective field or cell corresponding to each column of the table. A field may store a discrete data value. The cardinality of rows of a table, and the values stored therein, may be variable based on the data. Adding, deleting, or modifying rows, or the data stored therein may omit modification of the database design, schema, or structure. The data stored in respective columns may be identified or defined as a measure data, attribute data, or enterprise ontology data (e.g., metadata).

Measure data, or measure values, may include quantifiable or additive numeric values, such as integer or floating-point values, which may include numeric values indicating sizes, amounts, degrees, or the like. A column defined as representing measure values may be referred to herein as a measure or fact. A measure may be a property on which quantitative operations (e.g., sum, count, average, minimum, maximum) may be performed to calculate or determine a result or output.

Attribute data, or attribute values, may include non-quantifiable values, such as text or image data, which may indicate names and descriptions, quantifiable values designated, defined, or identified as attribute data, such as numeric unit identifiers, or a combination thereof. A column defined as including attribute values may be referred to herein as an attribute or dimension. For example, attributes may include text, identifiers, timestamps, or the like.

Enterprise ontology data may include data that defines or describes one or more aspects of the database, such as data that describes one or more aspects of the attributes, measures, rows, columns, tables, relationships, or other aspects of the data or database schema. For example, a portion of the database design, model, or schema may be represented as enterprise ontology data in one or more tables in the database.

Distinctly identifiable data in the low-latency data may be referred to herein as a data portion. For example, the low-latency data stored in the distributed in-memory database 3300 may be referred to herein as a data portion, a table from the low-latency data may be referred to herein as a data portion, a column from the low-latency data may be referred to herein as a data portion, a row or record from the low-latency data may be referred to herein as a data portion, a value from the low-latency data may be referred to herein as a data portion, a relationship defined in the low-latency data may be referred to herein as a data portion, enterprise ontology data describing the low-latency data may be referred to herein as a data portion, or any other distinctly identifiable data, or combination thereof, from the low-latency data may be referred to herein as a data portion.

The distributed in-memory database 3300 may create or add one or more data portions, such as a table, may read from or access one or more data portions, may update or modify one or more data portions, may remove or delete one or more data portions, or a combination thereof. Adding, modifying, or removing data portions may include changes to the data model of the low-latency data. Changing the data model of the low-latency data may include notifying one or more other components of the low-latency database analysis system 3000, such as by sending, or otherwise making available, a message or signal indicating the change. For example, the distributed in-memory database 3300 may create or add a table to the low-latency data and may transmit or send a message or signal indicating the change to the semantic interface unit 3600.

In some implementations, a portion of the low-latency data may represent a data model of an external enterprise database and may omit the data stored in the external enterprise database, or a portion thereof. For example, prioritized data may be cached in the distributed in-memory database 3300 and the other data may be omitted from storage in the distributed in-memory database 3300, which may be stored in the external enterprise database. In some implementations, requesting data from the distributed in-memory database 3300 may include requesting the data, or a portion thereof, from the external enterprise database.

The distributed in-memory database 3300 may receive one or more messages or signals indicating respective data-queries for the low-latency data, or a portion thereof, which may include data-queries for modified, generated, or aggregated data generated based on the low-latency data, or a portion thereof. For example, the distributed in-memory database 3300 may receive a data-query from the semantic interface unit 3600, such as in accordance with a request for data. The data-queries received by the distributed in-memory database 3300 may be agnostic to the distributed configuration of the distributed in-memory database 3300. A data-query, or a portion thereof, may be expressed in accordance with the defined structured query language implemented by the distributed in-memory database 3300. In some implementations, a data-query may be included, such as stored or communicated, in a data-query data structure or container.

The distributed in-memory database 3300 may execute or perform one or more queries to generate or obtain response data responsive to the data-query based on the low-latency data.

The distributed in-memory database 3300 may interpret, evaluate, or otherwise process a data-query to generate one or more distributed-queries, which maybe expressed in accordance with the defined structured query language. For example, an in-memory database instance of the distributed in-memory database 3300 may be identified as a query coordinator. The query coordinator may generate a query plan, which may include generating one or more distributed-queries, based on the received data-query. The query plan may include query execution instructions for executing one or more queries, or one or more portions thereof, based on the received data-query by the one or more of the in-memory database instances. Generating the query plan may include optimizing the query plan. The query coordinator may distribute, or otherwise make available, the respective portions of the query plan, as query execution instructions, to the corresponding in-memory database instances.

The respective in-memory database instances may receive the corresponding query execution instructions from the query coordinator. The respective in-memory database instances may execute the corresponding query execution instructions to obtain, process, or both, data (intermediate results data) from the low-latency data. The respective in-memory database instances may output, or otherwise make available, the intermediate results data, such as to the query coordinator.

The query coordinator may execute a respective portion of query execution instructions (allocated to the query coordinator) to obtain, process, or both, data (intermediate results data) from the low-latency data. The query coordinator may receive, or otherwise access, the intermediate results data from the respective in-memory database instances. The query coordinator may combine, aggregate, or otherwise process, the intermediate results data to obtain results data.

In some embodiments, obtaining the intermediate results data by one or more of the in-memory database instances may include outputting the intermediate results data to, or obtaining intermediate results data from, one or more other in-memory database instances, in addition to, or instead of, obtaining the intermediate results data from the low-latency data.

The distributed in-memory database 3300 may output, or otherwise make available, the results data to the semantic interface unit 3600.

The enterprise data interface unit 3400 may interface with, or communicate with, an external enterprise data system. For example, the enterprise data interface unit 3400 may receive or access enterprise data from or in an external system, such as an external database. The enterprise data interface unit 3400 may import, evaluate, or otherwise process the enterprise data to populate, create, or modify data stored in the low-latency database analysis system 3000. The enterprise data interface unit 3400 may receive, or otherwise access, the enterprise data from one or more external data sources, such as the external data source portion 2100 shown in FIG. 2, and may represent the enterprise data in the low-latency database analysis system 3000 by importing, loading, or populating the enterprise data as principal data in the distributed in-memory database 3300, such as in one or more low-latency data structures. The enterprise data interface unit 3400 may implement one or more data connectors, which may transfer data between, for example, the external data source and the distributed in-memory database 3300, which may include altering, formatting, evaluating, or manipulating the data.

The enterprise data interface unit 3400 may receive, access, or generate metadata that identifies one or more parameters or relationships for the principal data, such as based on the enterprise data, and may include the generated metadata in the low-latency data stored in the distributed in-memory database 3300. For example, the enterprise data interface unit 3400 may identify characteristics of the principal data such as, attributes, measures, values, unique identifiers, tags, links, keys, or the like, and may include metadata representing the identified characteristics in the low-latency data stored in the distributed in-memory database 3300. The characteristics of the data can be automatically determined by receiving, accessing, processing, evaluating, or interpreting the schema in which the enterprise data is stored, which may include automatically identifying links or relationships between columns, classifying columns (e.g., using column names), and analyzing or evaluating the data.

Distinctly identifiable operative data units or structures representing one or more data portions, one or more entities, users, groups, or organizations represented in the internal data, or one or more aggregations, collections, relations, analytical results, visualizations, or groupings thereof, may be represented in the low-latency database analysis system 3000 as objects. An object may include a unique identifier for the object, such as a fully qualified name. An object may include a name, such as a displayable value, for the object.

For example, an object may represent a user, a group, an entity, an organization, a privilege, a role, a table, a column, a data relationship, a worksheet, a view, a context, an answer, autonomous-analysis data, a pinboard, a tag, a comment, a trigger, a defined variable, a data source, an object-level security rule, a row-level security rule, or any other data capable of being distinctly identified and stored or otherwise obtained in the low-latency database analysis system 3000. An object may represent or correspond with a logical entity. Data describing an object may include data operatively or uniquely identifying data corresponding to, or represented by, the object in the low-latency database analysis system. For example, a column in a table in a database in the low-latency database analysis system may be represented in the low-latency database analysis system as an object and the data describing or defining the object may include data operatively or uniquely identifying the column.

A worksheet (worksheet object), or worksheet table, may be a logical table, or a definition thereof, which may be a collection, a sub-set (such as a subset of columns from one or more tables), or both, of data from one or more data sources, such as columns in one or more tables, such as in the distributed in-memory database 3300. A worksheet, or a definition thereof, may include one or more data organization or manipulation definitions, such as join paths or worksheet-column definitions, which may be user defined. A worksheet may be a data structure that may contain one or more rules or definitions that may define or describe how a respective tabular set of data may be obtained, which may include defining one or more sources of data, such as one or more columns from the distributed in-memory database 3300. A worksheet may be a data source. For example, a worksheet may include references to one or more data sources, such as columns in one or more tables, such as in the distributed in-memory database 3300, and a request for data referencing the worksheet may access the data from the data sources referenced in the worksheet. In some implementations, a worksheet may omit aggregations of the data from the data sources referenced in the worksheet.

An answer (answer object), or report, may be defined, such as previously generated, request for data, such as a resolved-request. An answer may include information describing a visualization of data responsive to the request for data.

A visualization (visualization object) may be a defined representation or expression of data, such as a visual representation of the data, for presentation to a user or human observer, such as via a user interface. Although described as a visual representation, in some implementations, a visualization may include non-visual aspects, such as auditory or haptic presentation aspects. A visualization may be generated to represent a defined set of data in accordance with a defined visualization type or template (visualization template object), such as in a chart, graph, or tabular form. Example visualization types may include, and are not limited to, chloropleths, cartograms, dot distribution maps, proportional symbol maps, contour/isopleth/isarithmic maps, daysymetric map, self-organizing map, timeline, time series, connected scatter plots, Gantt charts, steam graph/theme river, arc diagrams, polar area/rose/circumplex charts, Sankey diagrams, alluvial diagrams, pie charts, histograms, tag clouds, bubble charts, bubble clouds, bar charts, radial bar charts, tree maps, scatter plots, line charts, step charts, area charts, stacked graphs, heat maps, parallel coordinates, spider charts, box and whisker plots, mosaic displays, waterfall charts, funnel charts, or radial tree maps. A visualization template may define or describe one or more visualization parameters, such as one or more color parameters. Visualization data for a visualization may include values of one or more of the visualization parameters of the corresponding visualization template.

A view (view object) may be a logical table, or a definition thereof, which may be a collection, a sub-set, or both, of data from one or more data sources, such as columns in one or more tables, such as in the distributed in-memory database 3300. For example, a view may be generated based on an answer, such as by storing the answer as a view. A view may define or describe a data aggregation. A view may be a data source. For example, a view may include references to one or more data sources, such as columns in one or more tables, such as in the distributed in-memory database 3300, which may include a definition or description of an aggregation of the data from a respective data source, and a request for data referencing the view may access the aggregated data, the data from the unaggregated data sources referenced in the worksheet, or a combination thereof. The unaggregated data from data sources referenced in the view defined or described as aggregated data in the view may be unavailable based on the view. A view may be a materialized view or an unmaterialized view. A request for data referencing a materialized view may obtain data from a set of data previously obtained (view-materialization) in accordance with the definition of the view and the request for data. A request for data referencing an unmaterialized view may obtain data from a set of data currently obtained in accordance with the definition of the view and the request for data.

A pinboard (pinboard object), or dashboard, may be a defined collection or grouping of objects, such as visualizations, answers, or autonomous-analysis data. Pinboard data for a pinboard may include information associated with the pinboard, which may be associated with respective objects included in the pinboard.

A context (context object) may be a data structure for containing and organizing a set or collection of data associated with a request for data or one or more other discretely related interactions with the low-latency database analysis system 3000.

A definition may be a set of data describing the structure or organization of a data portion. For example, in the distributed in-memory database 3300, a column definition may define one or more aspects of a column in a table, such as a name of the column, a description of the column, a datatype for the column, or any other information about the column that may be represented as discrete data.

A data source object may represent a source or repository of data accessible by the low-latency database analysis system 3000. A data source object may include data indicating an electronic communication location, such as an address, of a data source, connection information, such as protocol information, authentication information, or a combination thereof, or any other information about the data source that may be represented as discrete data. For example, a data source object may represent a table in the distributed in-memory database 3300 and include data for accessing the table from the database, such as information identifying the database, information identifying a schema within the database, and information identifying the table within the schema within the database. An external data source object may represent an external data source. For example, an external data source object may include data indicating an electronic communication location, such as an address, of an external data source, connection information, such as protocol information, authentication information, or a combination thereof, or any other information about the external data source that may be represented as discrete data.

A sticker (sticker object) may be a description of a classification, category, tag, subject area, or other information that may be associated with one or more other objects such that objects associated with a sticker may be grouped, sorted, filtered, or otherwise identified based on the sticker. In the distributed in-memory database 3300 a tag may be a discrete data portion that may be associated with other data portions, such that data portions associated with a tag may be grouped, sorted, filtered, or otherwise identified based on the tag.

The distributed in-memory ontology unit 3500 generates, maintains, or both, information (ontological data) defining or describing the operative ontological structure of the objects represented in the low-latency database analysis system 3000, such as in the low-latency data stored in the distributed in-memory database 3300, which may include describing attributes, properties, states, or other information about respective objects and may include describing relationships among respective objects.

Objects may be referred to herein as primary objects, secondary objects, or tertiary objects. Other types of objects may be used.

Primary objects may include objects representing distinctly identifiable operative data units or structures representing one or more data portions in the distributed in-memory database 3300, or another data source in the low-latency database analysis system 3000. For example, primary objects may be data source objects, table objects, column objects, relationship objects, or the like. Primary objects may include worksheets, views, filters, such as row-level-security filters and table filters, variables, or the like. Primary objects may be referred to herein as data-objects or queryable-objects.

Secondary objects may be objects representing distinctly identifiable operative data units or structures representing analytical data aggregations, collections, analytical results, visualizations, or groupings thereof, such as pinboard objects, answer objects, autonomous-analysis data, visualization objects, and the like. Secondary objects may be referred to herein as analytical-objects.

Tertiary objects may be objects representing distinctly identifiable operative data units or structures representing operational aspects of the low-latency database analysis system 3000, such as one or more entities, users, groups, or organizations represented in the internal data, such as user objects, user-group objects, role objects, sticker objects, and the like.

The distributed in-memory ontology unit 3500 may represent the ontological structure, which may include the objects therein, as a graph having nodes and edges. A node may be a representation of an object in the graph structure of the distributed in-memory ontology unit 3500. A node object can include one or more component objects. Component objects may be versioned, such as on a per-component object basis. For example, a node can include a header object, a content object, or both. A header object may include information about the node. A content may include the content of the node. An edge may represent a relationship between nodes, which may be directional.

In some implementations, the distributed in-memory ontology unit 3500 graph may include one or more nodes, edges, or both, representing one or more objects, relationships or both, corresponding to a respective internal representation of enterprise data stored in an external enterprise data storage unit, wherein a portion of the data stored in the external enterprise data storage unit represented in the distributed in-memory ontology unit 3500 graph is omitted from the distributed in-memory database 3300.

In some embodiments, the distributed in-memory ontology unit 3500 may generate, modify, or remove a portion of the ontology graph in response to one or more messages, signals, or notifications from one or more of the components of the low-latency database analysis system 3000. For example, the distributed in-memory ontology unit 3500 may generate, modify, or remove a portion of the ontology graph in response to receiving one or more messages, signals, or notifications from the distributed in-memory database 3300 indicating a change to the low-latency data structure. In another example, the distributed in-memory database 3300 may send one or more messages, signals, or notifications indicating a change to the low-latency data structure to the semantic interface unit 3600 and the semantic interface unit 3600 may send one or more messages, signals, or notifications indicating the change to the low-latency data structure to the distributed in-memory ontology unit 3500.

The distributed in-memory ontology unit 3500 may be distributed, in-memory, multi-versioned, transactional, consistent, durable, or a combination thereof. The distributed in-memory ontology unit 3500 is transactional, which may include implementing atomic concurrent, or substantially concurrent, updating of multiple objects. The distributed in-memory ontology unit 3500 is durable, which may include implementing a robust storage that prevents data loss subsequent to or as a result of the completion of an atomic operation. The distributed in-memory ontology unit 3500 is consistent, which may include performing operations associated with a request for data with reference to or using a discrete data set, which may mitigate or eliminate the risk inconsistent results.

The distributed in-memory ontology unit 3500 may generate, output, or both, one or more event notifications. For example, the distributed in-memory ontology unit 3500 may generate, output, or both, a notification, or notifications, in response to a change of the distributed in-memory ontology. The distributed in-memory ontology unit 3500 may identify a portion of the distributed in-memory ontology (graph) associated with a change of the distributed in-memory ontology, such as one or more nodes depending from a changed node, and may generate, output, or both, a notification, or notifications indicating the identified relevant portion of the distributed in-memory ontology (graph). One or more aspects of the low-latency database analysis system 3000 may cache object data and may receive the notifications from the distributed in-memory ontology unit 3500, which may reduce latency and network traffic relative to systems that omit caching object data or omit notifications relevant to changes to portions of the distributed in-memory ontology (graph).

The distributed in-memory ontology unit 3500 may implement prefetching. For example, the distributed in-memory ontology unit 3500 may predictively, such as based on determined probabilistic utility, fetch one or more nodes, such as in response to access to a related node by a component of the low-latency database analysis system 3000.

The distributed in-memory ontology unit 3500 may implement a multi-version concurrency control graph data storage unit. Each node, object, or both, may be versioned. Changes to the distributed in-memory ontology may be reversible. For example, the distributed in-memory ontology may have a first state prior to a change to the distributed in-memory ontology, the distributed in-memory ontology may have a second state subsequent to the change, and the state of the distributed in-memory ontology may be reverted to the first state subsequent to the change, such as in response to the identification of an error or failure associated with the second state.

In some implementations, reverting a node, or a set of nodes, may omit reverting one or more other nodes. In some implementations, the distributed in-memory ontology unit 3500 may maintain a change log indicating a sequential record of changes to the distributed in-memory ontology (graph), such that a change to a node or a set of nodes may be reverted and one or more other changes subsequent to the reverted change may be reverted for consistency.

The distributed in-memory ontology unit 3500 may implement optimistic locking to reduce lock contention times. The use of optimistic locking permits improved throughput of data through the distributed in-memory ontology unit 3500.

The semantic interface unit 3600 may implement procedures and functions to provide a semantic interface between the distributed in-memory database 3300 and one or more of the other components of the low-latency database analysis system 3000.

The semantic interface unit 3600 may implement ontological data management, data-query generation, authentication and access control, object statistical data collection, or a combination thereof.

Ontological data management may include object lifecycle management, object data persistence, ontological modifications, or the like. Object lifecycle management may include creating one or more objects, reading or otherwise accessing one or more objects, updating or modifying one or more objects, deleting or removing one or more objects, or a combination thereof. For example, the semantic interface unit 3600 may interface or communicate with the distributed in-memory ontology unit 3500, which may store the ontological data, object data, or both, to perform object lifecycle management, object data persistence, ontological modifications, or the like.

For example, the semantic interface unit 3600 may receive, or otherwise access, a message, signal, or notification, such as from the distributed in-memory database 3300, indicating the creation or addition of a data portion, such as a table, in the low-latency data stored in the distributed in-memory database 3300, and the semantic interface unit 3600 may communicate with the distributed in-memory ontology unit 3500 to create an object in the ontology representing the added data portion. The semantic interface unit 3600 may transmit, send, or otherwise make available, a notification, message, or signal to the relational search unit 3700 indicating that the ontology has changed.

The semantic interface unit 3600 may receive, or otherwise access, a request message or signal, such as from the relational search unit 3700, indicating a request for information describing changes to the ontology (ontological updates request). The semantic interface unit 3600 may generate and send, or otherwise make available, a response message or signal to the relational search unit 3700 indicating the changes to the ontology (ontological updates response). The semantic interface unit 3600 may identify one or more data portions for indexing based on the changes to the ontology. For example, the changes to the ontology may include adding a table to the ontology, the table including multiple rows, and the semantic interface unit 3600 may identify each row as a data portion for indexing. The semantic interface unit 3600 may include information describing the ontological changes in the ontological updates response. The semantic interface unit 3600 may include one or more data-query definitions, such as data-query definitions for indexing data-queries, for each data portion identified for indexing in the ontological updates response. For example, the data-query definitions may include a sampling data-query, which may be used to query the distributed in-memory database 3300 for sample data from the added data portion, an indexing data-query, which may be used to query the distributed in-memory database 3300 for data from the added data portion, or both.

The semantic interface unit 3600 may receive, or otherwise access, internal signals or messages including data expressing a usage intent, such as data indicating requests to access or modify the low-latency data stored in the distributed in-memory database 3300 (e.g., a request for data). The request to access or modify the low-latency data received by the semantic interface unit 3600 may include a resolved-request. The resolved-request, which may be database and visualization agnostic, may be expressed or communicated as an ordered sequence of tokens, which may represent semantic data. For example, the relational search unit 3700 may tokenize, identify semantics, or both, based on input data, such as input data representing user input, to generate the resolved-request. The resolved-request may include an ordered sequence of tokens that represent the request for data corresponding to the input data, and may transmit, send, or otherwise make accessible, the resolved-request to the semantic interface unit 3600. The semantic interface unit 3600 may process or respond to a received resolved-request.

The semantic interface unit 3600 may process or transform the received resolved-request, which may be, at least in part, incompatible with the distributed in-memory database 3300, to generate one or more corresponding data-queries that are compatible with the distributed in-memory database 3300, which may include generating a proto-query representing the resolved-request, generating a pseudo-query representing the proto-query, and generating the data-query representing the pseudo-query.

The semantic interface unit 3600 may generate a proto-query based on the resolved-request. A proto-query, which may be database agnostic, may be structured or formatted in a form, language, or protocol that differs from the defined structured query language of the distributed in-memory database 3300. Generating the proto-query may include identifying visualization identification data, such as an indication of a type of visualization, associated with the request for data, and generating the proto-query based on the resolved-request and the visualization identification data.

The semantic interface unit 3600 may transform the proto-query to generate a pseudo-query. The pseudo-query, which may be database agnostic, may be structured or formatted in a form, language, or protocol that differs from the defined structured query language of the distributed in-memory database 3300. Generating a pseudo-query may include applying a defined transformation, or an ordered sequence of transformations. Generating a pseudo-query may include incorporating row-level security filters in the pseudo-query.

The semantic interface unit 3600 may generate a data-query based on the pseudo-query, such as by serializing the pseudo-query. The data-query, or a portion thereof, may be structured or formatted using the defined structured query language of the distributed in-memory database 3300. In some implementations, a data-query may be structured or formatted using a defined structured query language of another database, which may differ from the defined structured query language of the distributed in-memory database 3300. Generating the data-query may include using one or more defined rules for expressing respective the structure and content of a pseudo-query in the respective defined structured query language.

The semantic interface unit 3600 may communicate, or issue, the data-query to the distributed in-memory database 3300. In some implementations, processing or responding to a resolved-request may include generating and issuing multiple data-queries to the distributed in-memory database 3300.

The semantic interface unit 3600 may receive results data from the distributed in-memory database 3300 responsive to one or more resolved-requests. The semantic interface unit 3600 may process, format, or transform the results data to obtain visualization data. For example, the semantic interface unit 3600 may identify a visualization for representing or presenting the results data, or a portion thereof, such as based on the results data or a portion thereof. For example, the semantic interface unit 3600 may identifying a bar chart visualization for results data including one measure and attribute.

Although not shown separately in FIG. 3, the semantic interface unit 3600 may include a data visualization unit. In some embodiments, the data visualization unit may be a distinct unit, separate from the semantic interface unit 3600. In some embodiments, the data visualization unit may be included in the system access interface unit 3900. The data visualization unit, the system access interface unit 3900, or a combination thereof, may generate a user interface, or one or more portions thereof. For example, data visualization unit, the system access interface unit 3900, or a combination thereof, may obtain the results data, such as the visualization data, and may generate user interface elements (visualizations) representing the results data.

The semantic interface unit 3600 may implement object-level security, row-level security, or a combination thereof. Object level security may include security associated with an object, such as a table, a column, a worksheet, an answer, or a pinboard. Row-level security may include user-based or group-based access control of rows of data in the low-latency data, the indexes, or both. The semantic interface unit 3600 may implement on or more authentication procedures, access control procedures, or a combination thereof.

The semantic interface unit 3600 may implement one or more user-data integration features. For example, the semantic interface unit 3600 may generate and output a user interface, or a portion thereof, for inputting, uploading, or importing user data, may receive user data, and may import the user data. For example, the user data may be enterprise data.

The semantic interface unit 3600 may implement object statistical data collection. Object statistical data may include, for respective objects, temporal access information, access frequency information, access recency information, access requester information, or the like. For example, the semantic interface unit 3600 may obtain object statistical data as described with respect to the data utility unit 3720, the object utility unit 3810, or both. The semantic interface unit 3600 may send, transmit, or otherwise make available, the object statistical data for data-objects to the data utility unit 3720. The semantic interface unit 3600 may send, transmit, or otherwise make available, the object statistical data for analytical-objects to the object utility unit 3810.

The semantic interface unit 3600 may implement or expose one or more services or application programming interfaces. For example, the semantic interface unit 3600 may implement one or more services for access by the system access interface unit 3900. In some implementations, one or more services or application programming interfaces may be exposed to one or more external devices or systems.

The semantic interface unit 3600 may generate and transmit, send, or otherwise communicate, one or more external communications, such as e-mail messages, such as periodically, in response to one or more events, or both. For example, the semantic interface unit 3600 may generate and transmit, send, or otherwise communicate, one or more external communications including a portable representation, such as a portable document format representation of one or more pinboards in accordance with a defined schedule, period, or interval. In another example, the semantic interface unit 3600 may generate and transmit, send, or otherwise communicate, one or more external communications in response to input data indicating an express request for a communication. In another example, the semantic interface unit 3600 may generate and transmit, send, or otherwise communicate, one or more external communications in response to one or more defined events, such as the expiration of a recency of access period for a user.

Although shown as a single unit in FIG. 3, the relational search unit 3700 may be implemented in a distributed configuration, which may include a primary relational search unit instance and one or more secondary relational search unit instances.

The relational search unit 3700 may generate, maintain, operate, or a combination thereof, one or more indexes, such as one or more of an ontological index, a constituent data index, a control-word index, a numeral index, or a constant index, based on the low-latency data stored in the distributed in-memory database 3300, the low-latency database analysis system 3000, or both. An index may be a defined data structure, or combination of data structures, for storing tokens, terms, or string keys, representing a set of data from one or more defined data sources in a form optimized for searching. For example, an index may be a collection of index shards. In some implementations, an index may be segmented into index segments and the index segments may be sharded into index shards. In some implementations, an index may be partitioned into index partitions, the index partitions may be segmented into index segments and the index segments may be sharded into index shards.

Generating, or building, an index may be performed to create or populate a previously unavailable index, which may be referred to as indexing the corresponding data, and may include regenerating, rebuilding, or reindexing to update or modify a previously available index, such as in response to a change in the indexed data (constituent data).

The ontological index may be an index of data (ontological data) describing the ontological structure or schema of the low-latency database analysis system 3000, the low-latency data stored in the distributed in-memory database 3300, or a combination thereof. For example, the ontological index may include data representing the table and column structure of the distributed in-memory database 3300. The relational search unit 3700 may generate, maintain, or both, the ontological index by communicating with, such as requesting ontological data from, the distributed in-memory ontology unit 3500, the semantic interface unit 3600, or both. Each record in the ontological index may correspond to a respective ontological token, such as a token that identifies a column by name.

The control-word index may be an index of a defined set of control-word tokens. A control-word token may be a character, a symbol, a word, or a defined ordered sequence of characters or symbols, that is identified in one or more grammars of the low-latency database analysis system 3000 as having one or more defined grammatical functions, which may be contextual. For example, the control-word index may include the control-word token "sum", which may be identified in one or more grammars of the low-latency database analysis system 3000 as indicating an additive aggregation. In another example, the control-word index may include the control-word token "top", which may be identified in one or more grammars of the low-latency database analysis system 3000 as indicating a maximal value from an ordered set. In another example, the control-word index may include operator tokens, such as the equality operator token ("="). The constant index may be an index of constant tokens such as "100" or "true". The numeral index may be an index of number word tokens (or named numbers), such as number word tokens for the positive integers between zero and one million, inclusive. For example, "one hundred and twenty eight".

A token may be a word, phrase, character, sequence of characters, symbol, combination of symbols, or the like. A token may represent a data portion in the low-latency data stored in the low-latency data structure. For example, the relational search unit 3700 may automatically generate respective tokens representing the attributes, the measures, the tables, the columns, the values, unique identifiers, tags, links, keys, or any other data portion, or combination of data portions, or a portion thereof. The relational search unit 3700 may classify the tokens, which may include storing token classification data in association with the tokens. For example, a token may be classified as an attribute token, a measure token, a value token, or the like.

The constituent data index may be an index of the constituent data values stored in the low-latency database analysis system 3000, such as in the distributed in-memory database 3300. The relational search unit 3700 may generate, maintain, or both, the constituent data index by communicating with, such as requesting data from, the distributed in-memory database 3300. For example, the relational search unit 3700 may send, or otherwise communicate, a message or signal to the distributed in-memory database 3300 indicating a request to perform an indexing data-query, the relational search unit 3700 may receive response data from the distributed in-memory database 3300 in response to the requested indexing data-query, and the relational search unit 3700 may generate the constituent data index, or a portion thereof, based on the response data. For example, the constituent data index may index data-objects.

An index shard may be used for token searching, such as exact match searching, prefix match searching, substring match searching, or suffix match searching. Exact match searching may include identifying tokens in the index shard that matches a defined target value. Prefix match searching may include identifying tokens in the index shard that include a prefix, or begin with a value, such as a character or string, that matches a defined target value. Substring match searching may include identifying tokens in the index shard that include a value, such as a character or string, that matches a defined target value. Suffix match searching may include identifying tokens in the index shard that include a suffix, or end with a value, such as a character or string, that matches a defined target value. In some implementations, an index shard may include multiple distinct index data structures. For example, an index shard may include a first index data structure optimized for exact match searching, prefix match searching, and suffix match searching, and a second index data structure optimized for substring match searching. Traversing, or otherwise accessing, managing, or using, an index may include identifying one or more of the index shards of the index and traversing the respective index shards. In some implementations, one or more indexes, or index shards, may be distributed, such as replicated on multiple relational search unit instances. For example, the ontological index may be replicated on each relational search unit instance.

The relational search unit 3700 may receive a request for data from the low-latency database analysis system 3000. For example, the relational search unit 3700 may receive data expressing a usage intent indicating the request for data in response to input, such as user input, obtained via a user interface, such as a user interface generated, or partially generated, by the system access interface unit 3900, which may be a user interface operated on an external device, such as one of the client devices 2320, 2340 shown in FIG. 2. In some implementations, the relational search unit 3700 may receive the data expressing the usage intent from the system access interface unit 3900 or from the semantic interface unit 3600. For example, the relational search unit 3700 may receive or access the data expressing the usage intent in a request for data message or signal.

The relational search unit 3700 may process, parse, identify semantics, tokenize, or a combination thereof, the request for data to generate a resolved-request, which may include identifying a database and visualization agnostic ordered sequence of tokens based on the data expressing the usage intent. The data expressing the usage intent, or request for data, may include request data, such as resolved request data, unresolved request data, or a combination of resolved request data and unresolved request data. The relational search unit 3700 may identify the resolved request data. The relational search unit 3700 may identify the unresolved request data and may tokenize the unresolved request data.

Resolved request data may be request data identified in the data expressing the usage intent as resolved request data. Each resolved request data portion may correspond with a respective token in the low-latency database analysis system 3000. The data expressing the usage intent may include information identifying one or more portions of the request data as resolved request data.

Unresolved request data may be request data identified in the data expressing the usage intent as unresolved request data, or request data for which the data expressing the usage intent omits information identifying the request data a resolved request data. Unresolved request data may include text or string data, which may include a character, sequence of characters, symbol, combination of symbols, word, sequence of words, phrase, or the like, for which information, such as tokenization binding data, identifying the text or string data as resolved request data is absent or omitted from the request data. The data expressing the usage intent may include information identifying one or more portions of the request data as unresolved request data. The data expressing the usage intent may omit information identifying whether one or more portions of the request data are resolved request data. The relational search unit 3700 may identify one or more portions of the request data for which the data expressing the usage intent omits information identifying whether the one or more portions of the request data are resolved request data as unresolved request data.

For example, the data expressing the usage intent may include a request string and one or more indications that one or more portions of the request string are resolved request data. One or more portions of the request string that are not identified as resolved request data in the data expressing the usage intent may be identified as unresolved request data. For example, the data expressing the usage intent may include the request string "example text"; the data expressing the usage intent may include information indicating that the first portion of the request string, "example", is resolved request data; and the data expressing the usage intent may omit information indicating that the second portion of the request string, "text", is resolved request data.

The information identifying one or more portions of the request data as resolved request data may include tokenization binding data indicating a previously identified token corresponding to the respective portion of the request data. The tokenization binding data corresponding to a respective token may include, for example, one or more of a column identifier indicating a column corresponding to the respective token, a data type identifier corresponding to the respective token, a table identifier indicating a table corresponding to the respective token, an indication of an aggregation corresponding to the respective token, or an indication of a join path associated with the respective token. Other tokenization binding data may be used. In some implementations, the data expressing the usage intent may omit the tokenization binding data and may include an identifier that identifies the tokenization binding data.

The relational search unit 3700 may implement or access one or more grammar-specific tokenizers, such as a tokenizer for a defined relational search grammar or a tokenizer for a natural-language grammar. For example, the relational search unit 3700 may implement one or more of a formula tokenizer, a row-level-security tokenizer, a relational search tokenizer, or a natural language tokenizer. Other tokenizers may be used. In some implementations, the relational search unit 3700 may implement one or more of the grammar-specific tokenizers, or a portion thereof, by accessing another component of the low-latency database analysis system 3000 that implements the respective grammar-specific tokenizer, or a portion thereof. For example, the natural language processing unit 3710 may implement the natural language tokenizer and the relational search unit 3700 may access the natural language processing unit 3710 to implement natural language tokenization.

A tokenizer, such as the relational search tokenizer, may parse text or string data (request string), such as string data included in a data expressing the usage intent, in a defined read order, such as from left to right, such as on a character-by-character or symbol-by-symbol basis. For example, a request string may include a single character, symbol, or letter, and tokenization may include identifying one or more tokens matching, or partially matching, the input character.

Tokenization may include parsing the request string to identify one or more words or phrases. For example, the request string may include a sequence of characters, symbols, or letters, and tokenization may include parsing the sequence of characters in a defined order, such as from left to right, to identify distinct words or terms and identifying one or more tokens matching the respective words. In some implementations, word or phrase parsing may be based on one or more of a set of defined delimiters, such as a whitespace character, a punctuation character, or a mathematical operator.

The relational search unit 3700 may traverse one or more of the indexes to identify one or more tokens corresponding to a character, word, or phrase identified in request string. Tokenization may include identifying multiple candidate tokens matching a character, word, or phrase identified in request string. Candidate tokens may be ranked or ordered, such as based on probabilistic utility.

Tokenization may include match-length maximization. Match-length maximization may include ranking or ordering candidate matching tokens in descending magnitude order. For example, the longest candidate token, having the largest cardinality of characters or symbols, matching the request string, or a portion thereof, may be the highest ranked candidate token. For example, the request string may include a sequence of words or a semantic phrase, and tokenization may include identifying one or more tokens matching the input semantic phrase. In another example, the request string may include a sequence of phrases, and tokenization may include identifying one or more tokens matching the input word sequence. In some implementations, tokenization may include identifying the highest ranked candidate token for a portion of the request string as a resolved token for the portion of the request string.

The relational search unit 3700 may implement one or more finite state machines. For example, tokenization may include using one or more finite state machines. A finite state machine may model or represent a defined set of states and a defined set of transitions between the states. A state may represent a condition of the system represented by the finite state machine at a defined temporal point. A finite state machine may transition from a state (current state) to a subsequent state in response to input (e.g., input to the finite state machine). A transition may define one or more actions or operations that the relational search unit 3700 may implement. One or more of the finite state machines may be non-deterministic, such that the finite state machine may transition from a state to zero or more subsequent states.

The relational search unit 3700 may generate, instantiate, or operate a tokenization finite state machine, which may represent the respective tokenization grammar. Generating, instantiating, or operating a finite state machine may include operating a finite state machine traverser for traversing the finite state machine. Instantiating the tokenization finite state machine may include entering an empty state, indicating the absence of received input. The relational search unit 3700 may initiate or execute an operation, such as an entry operation, corresponding to the empty state in response to entering the empty state. Subsequently, the relational search unit 3700 may receive input data, and the tokenization finite state machine may transition from the empty state to a state corresponding to the received input data. In some embodiments, the relational search unit 3700 may initiate one or more data-queries in response to transitioning to or from a respective state of a finite state machine. In the tokenization finite state machine, a state may represent a possible next token in the request string. The tokenization finite state machine may transition between states based on one or more defined transition weights, which may indicate a probability of transiting from a state to a subsequent state.

The tokenization finite state machine may determine tokenization based on probabilistic path utility. Probabilistic path utility may rank or order multiple candidate traversal paths for traversing the tokenization finite state machine based on the request string. The candidate paths may be ranked or ordered based on one or more defined probabilistic path utility metrics, which may be evaluated in a defined sequence. For example, the tokenization finite state machine may determine probabilistic path utility by evaluating the weights of the respective candidate transition paths, the lengths of the respective candidate transition paths, or a combination thereof. In some implementations, the weights of the respective candidate transition paths may be evaluated with high priority relative to the lengths of the respective candidate transition paths.

In some implementations, one or more transition paths evaluated by the tokenization finite state machine may include a bound state such that the candidate tokens available for tokenization of a portion of the request string may be limited based on the tokenization of a previously tokenized portion of the request string.

Tokenization may include matching a portion of the request string to one or more token types, such as a constant token type, a column name token type, a value token type, a control-word token type, a date value token type, a string value token type, or any other token type defined by the low-latency database analysis system 3000. A constant token type may be a fixed, or invariant, token type, such as a numeric value. A column name token type may correspond with a name of a column in the data model. A value token type may correspond with an indexed data value. A control-word token type may correspond with a defined set of control-words. A date value token type may be similar to a control-word token type and may correspond with a defined set of control-words for describing temporal information. A string value token type may correspond with an unindexed value.

Token matching may include ordering or weighting candidate token matches based on one or more token matching metrics. Token matching metrics may include whether a candidate match is within a defined data scope, such as a defined set of tables, wherein a candidate match outside the defined data scope (out-of-scope) may be ordered or weighted lower than a candidate match within the define data scope (in-scope). Token matching metrics may include whether, or the degree to which, a candidate match increases query complexity, such as by spanning multiple roots, wherein a candidate match that increases complexity may be ordered or weighted lower than a candidate match that does not increase complexity or increases complexity to a lesser extent. Token matching metrics may include whether the candidate match is an exact match or a partial match, wherein a candidate match that is a partial may be ordered or weighted lower than a candidate match that is an exact match. In some implementations, the cardinality of the set of partial matches may be limited to a defined value.

Token matching metrics may include a token score (TokenScore), wherein a candidate match with a relatively low token score may be ordered or weighted lower than a candidate match with a relatively high token score. The token score for a candidate match may be determined based one or more token scoring metrics. The token scoring metrics may include a finite state machine transition weight metric (FSMScore), wherein a weight of transitioning from a current state of the tokenization finite state machine to a state indicating a candidate matching token is the finite state machine transition weight metric. The token scoring metrics may include a cardinality penalty metric (CardinalityScore), wherein a cardinality of values (e.g., unique values) corresponding to the candidate matching token is used as a penalty metric (inverse cardinality), which may reduce the token score. The token scoring metrics may include an index utility metric (IndexScore), wherein a defined utility value, such as one, associated with an object, such as a column wherein the matching token represents the column or a value from the column, is the index utility metric. In some implementations, the defined utility values may be configured, such as in response to user input, on a per object (e.g., per column) basis. The token scoring metrics may include a usage metric (UBRScore). The usage metric may be determined based on a usage based ranking index, one or more usage ranking metrics, or a combination thereof. Determining the usage metric (UBRScore) may include determining a usage boost value (UBRBoost). The token score may be determined based on a defined combination of token scoring metrics. For example, determining the token score may be expressed as the following:

$$TokenScore=FSMScore*(IndexScore+UBRScore*UBRBoost)+Min\,(CardinalityScore,1).$$

Token matching may include grouping candidate token matches by match type, ranking or ordering on a per-match type basis based on token score, and ranking or ordering the match types. For example, the match types may include a first match type for exact matches (having the highest match type priority order), a second match type for prefix matches on ontological data (having a match type priority order lower than the first match type), a third match type for substring matches on ontological data and prefix matches on data values (having a match type priority order lower than the second match type), a fourth match type for substring matches on data values (having a match type priority order lower than the third match type), and a fifth match type for matches omitted from the first through fourth match types (having a match type priority order lower than the fourth match type). Other match types and match type orders may be used.

Tokenization may include ambiguity resolution. Ambiguity resolution may include token ambiguity resolution, join-path ambiguity resolution, or both. In some implementations, ambiguity resolution may cease tokenization in response to the identification of an automatic ambiguity resolution error or failure.

Token ambiguity may correspond with identifying two or more exactly matching candidate matching tokens. Token ambiguity resolution may be based on one or more token ambiguity resolution metrics. The token ambiguity resolution metrics may include using available previously resolved token matching or binding data and token ambiguity may be resolved in favor of available previously resolved token matching or binding data, other relevant tokens resolved from the request string, or both. The token ambiguity resolution may include resolving token ambiguity in favor of integer constants. The token ambiguity resolution may include resolving token ambiguity in favor of control-words, such as for tokens at the end of a request for data, such as last, that are not being edited.

Join-path ambiguity may correspond with identifying matching tokens having two or more candidate join paths. Join-path ambiguity resolution may be based on one or more join-path ambiguity resolution metrics. The join-path ambiguity resolution metrics may include using available previously resolved join-path binding data and join-path ambiguity may be resolved in favor of available previously resolved join-paths. The join-path ambiguity resolution may include favoring join paths that include in-scope objects over join paths that include out-of-scope objects. The join-path ambiguity resolution metrics may include a complexity minimization metric, which may favor a join path that omits or avoids increasing complexity over join paths that increase complexity, such as a join path that may introduce a chasm trap.

The relational search unit 3700 may identify a resolved-request based on the request string. The resolved-request, which may be database and visualization agnostic, may be expressed or communicated as an ordered sequence of tokens representing the request for data indicated by the request string. The relational search unit 3700 may instantiate, or generate, one or more resolved-request objects. For example, the relational search unit 3700 may create or store a resolved-request object corresponding to the resolved-request in the distributed in-memory ontology unit 3500. The relational search unit 3700 may transmit, send, or otherwise make available, the resolved-request to the semantic interface unit 3600.

In some implementations, the relational search unit 3700 may transmit, send, or otherwise make available, one or more resolved-requests, or portions thereof, to the semantic interface unit 3600 in response to finite state machine transitions. For example, the relational search unit 3700 may instantiate a search object in response to a first transition of a finite state machine. The relational search unit 3700 may include a first search object instruction in the search object in response to a second transition of the finite state machine. The relational search unit 3700 may send the search object including the first search object instruction to the semantic interface unit 3600 in response to the second transition of the finite state machine. The relational search unit 3700 may include a second search object instruction in the search object in response to a third transition of the finite state machine. The relational search unit 3700 may send the search object including the search object instruction, or a combination of the first search object instruction and the second search object instruction, to the semantic interface unit 3600 in response to the third transition of the finite state machine. The search object instructions may be represented using any annotation, instruction, text, message, list, pseudo-code, comment, or the like, or any combination thereof that may be converted, transcoded, or translated into structured search instructions for retrieving data from the low-latency data.

The relational search unit 3700 may provide an interface to permit the creation of user-defined syntax. For example, a user may associate a string with one or more tokens. Accordingly, when the string is entered, the pre-associated tokens are returned in lieu of searching for tokens to match the input.

The relational search unit 3700 may include a localization unit (not expressly shown). The localization, globalization, regionalization, or internationalization, unit may obtain source data expressed in accordance with a source expressive-form and may output destination data representing the source data, or a portion thereof, and expressed using a destination expressive-form. The data expressive-forms, such as the source expressive-form and the destination expressive-form, may include regional or customary forms of expression, such as numeric expression, temporal expression, currency expression, alphabets, natural-language elements, measurements, or the like. For example, the source expressive-form may be expressed using a canonical-form, which may include using a natural-language, which may be based on English, and the destination expressive-form may be expressed using a locale-specific form, which may include using another natural-language, which may be a natural-language that differs from the canonical-language. In another example, the destination expressive-form and the source expressive-form may be locale-specific expressive-forms and outputting the destination expressive-form representation of the source expressive-form data may include obtaining a canonical-form representation of the source expressive-form data and obtaining the destination expressive-form representation based on the canonical-form representation. Although, for simplicity and clarity, the grammars described herein, such as the relational search grammar and the natural language search grammar, are described with relation to the canonical expressive-form, the implementation of the respective grammars, or portions thereof, described herein may implement locale-specific expressive-forms. For example, the relational search tokenizer may include multiple locale-specific relational search tokenizers.

The natural language processing unit 3710 may receive input data including a natural language string, such as a natural language string generated in accordance with user input. The natural language string may represent a data request expressed in an unrestricted natural language form, for which data identified or obtained prior to, or in conjunction with, receiving the natural language string by the natural language processing unit 3710 indicating the semantic structure, correlation to the low-latency database analysis system 3000, or both, for at least a portion of the natural language string is unavailable or incomplete. Although not shown separately in FIG. 3, in some implementations, the natural language string may be generated or determined based on processing an analog signal, or a digital representation thereof, such as an audio stream or recording or a video stream or recording, which may include using speech-to-text conversion.

The natural language processing unit 3710 may analyze, process, or evaluate the natural language string, or a portion thereof, to generate or determine the semantic structure, correlation to the low-latency database analysis system 3000, or both, for at least a portion of the natural language string. For example, the natural language processing unit 3710 may identify one or more words or terms in the natural language string and may correlate the identified words to tokens defined in the low-latency database analysis system 3000. In another example, the natural language processing unit 3710 may identify a semantic structure for the natural language string, or a portion thereof. In another example, the natural language processing unit 3710 may identify a probabilistic intent for the natural language string, or a portion thereof, which may correspond to an operative feature of the low-latency database analysis system 3000, such as retrieving data from the internal data, analyzing data the internal data, or modifying the internal data.

The natural language processing unit 3710 may send, transmit, or otherwise communicate request data indicating the tokens, relationships, semantic data, probabilistic intent, or a combination thereof or one or more portions thereof, identified based on a natural language string to the relational search unit 3700.

The data utility unit 3720 may receive, process, and maintain user-agnostic utility data, such as system configuration data, user-specific utility data, such as utilization data, or both user-agnostic and user-specific utility data. The utility data may indicate whether a data portion, such as a column, a record, autonomous-analysis data, or any other data portion, has high utility or low utility within the system, such across all users of the system. For example, the utility data may indicate that a defined column is a high-utility column or a low-utility column. The data utility unit 3720 may store the utility data, such as using the low-latency data structure. For example, in response to a user using, or accessing, a data portion, data utility unit 3720 may store utility data indicating the usage, or access, event for the data portion, which may include incrementing a usage event counter associated with the data portion. In some embodiments, the data utility unit 3720 may receive the information indicating the usage, or access, event for the data portion from the autonomous-analysis unit 3730, and the usage, or access, event for the data portion may indicate that the usage is associated with a set of autonomous-analysis data.

The data utility unit 3720 may receive a signal, message, or other communication, indicating a request for utility information. The request for utility information may indicate an object or data portion. The data utility unit 3720 may determine, identify, or obtain utility data associated with the identified object or data portion. The data utility unit 3720 may generate and send utility response data responsive to the request that may indicate the utility data associated with the identified object or data portion.

The data utility unit 3720 may generate, maintain, operate, or a combination thereof, one or more indexes, such as one or more of a usage (or utility) index, a resolved-request index, or a phrase index, based on the low-latency data stored in the distributed in-memory database 3300, the low-latency database analysis system 3000, or both.

The autonomous-analysis unit 3730, or insight unit, may automatically identify one or more sets of autonomous-analysis data, or insights, which may be data other than data expressly requested by a user, and which may be identified and prioritized, or both, based on probabilistic utility.

The object search unit 3800 may generate, maintain, operate, or a combination thereof, one or more object-indexes, which may be based on the analytical-objects represented in the low-latency database analysis system 3000, or a portion thereof, such as pinboards, answers, and worksheets. An object-index may be a defined data structure, or combination of data structures, for storing analytical-object data in a form optimized for searching. Although shown as a single unit in FIG. 3, the object search unit 3800 may interface with a distinct, separate, object indexing unit (not expressly shown).

The object search unit 3800 may include an object-index population interface, an object-index search interface, or both. The object-index population interface may obtain and store, load, or populate analytical-object data, or a portion thereof, in the object-indexes. The object-index search interface may efficiently access or retrieve analytical-object data from the object-indexes such as by searching or traversing the object-indexes, or one or more portions thereof. In some implementations, the object-index population interface, or a portion thereof, may be a distinct, independent unit.

The object-index population interface may populate, update, or both the object-indexes, such as periodically, such as in accordance with a defined temporal period, such as thirty minutes. Populating, or updating, the object-indexes may include obtaining object indexing data for indexing the analytical-objects represented in the low-latency database analysis system 3000. For example, the object-index population interface may obtain the analytical-object indexing data, such as from the distributed in-memory ontology unit 3500. Populating, or updating, the object-indexes may include generating or creating an indexing data structure representing an object. The indexing data structure for representing an object may differ from the data structure used for representing the object in other components of the low-latency database analysis system 3000, such as in the distributed in-memory ontology unit 3500.

The object indexing data for an analytical-object may be a subset of the object data for the analytical-object. The object indexing data for an analytical-object may include an object identifier for the analytical-object uniquely identifying the analytical-object in the low-latency database analysis system 3000, or in a defined data-domain within the low-latency database analysis system 3000. The low-latency database analysis system 3000 may uniquely, unambiguously, distinguish an object from other objects based on the object identifier associated with the object. The object indexing data for an analytical-object may include data non-uniquely identifying the object. The low-latency database analysis system 3000 may identify one or more analytical-objects based on the non-uniquely identifying data associated with the respective objects, or one or more portions thereof. In some implementations, an object identifier may be an ordered combination of non-uniquely identifying object data that, as expressed in the ordered combination, is uniquely identifying. The low-latency database analysis system 3000 may enforce the uniqueness of the object identifiers.

Populating, or updating, the object-indexes may include indexing the analytical-object by including or storing the object indexing data in the object-indexes. For example, the object indexing data may include data for an analytical-object, the object-indexes may omit data for the analytical-object, and the object-index population interface may include or store the object indexing data in an object-index. In another example, the object indexing data may include data for an analytical-object, the object-indexes may include data for the analytical-object, and the object-index population interface may update the object indexing data for the analytical-object in the object-indexes in accordance with the object indexing data.

Populating, or updating, the object-indexes may include obtaining object utility data for the analytical-objects represented in the low-latency database analysis system 3000. For example, the object-index population interface may obtain the object utility data, such as from the object utility unit 3810. The object-index population interface may include the object utility data in the object-indexes in association with the corresponding objects.

In some implementations, the object-index population interface may receive, obtain, or otherwise access the object utility data from a distinct, independent, object utility data population unit, which may read, obtain, or otherwise access object utility data from the object utility unit 3810 and may send, transmit, or otherwise provide, the object utility data to the object search unit 3800. The object utility data population unit may send, transmit, or otherwise provide, the object utility data to the object search unit 3800 periodically, such as in accordance with a defined temporal period, such as thirty minutes.

The object-index search interface may receive, access, or otherwise obtain data expressing a usage intent with respect to the low-latency database analysis system 3000, which may represent a request to access data in the low-latency database analysis system 3000, which may represent a request to access one or more analytical-objects represented in the low-latency database analysis system 3000. The object-index search interface may generate one or more object-index queries based on the data expressing the usage intent. The object-index search interface may send, transmit, or otherwise make available the object-index queries to one or more of the object-indexes.

The object-index search interface may receive, obtain, or otherwise access object search results data indicating one or more analytical-objects identified by searching or traversing the object-indexes in accordance with the object-index queries. The object-index search interface may sort or rank the object search results data based on probabilistic utility in accordance with the object utility data for the analytical-objects in the object search results data. In some implementations, the object-index search interface may include one or more object search ranking metrics with the object-index queries and may receive the object search results data sorted or ranked based on probabilistic utility in accordance with the object utility data for the objects in the object search results data and in accordance with the object search ranking metrics.

For example, the data expressing the usage intent may include a user identifier, and the object search results data may include object search results data sorted or ranked based on probabilistic utility for the user. In another example, the data expressing the usage intent may include a user identifier and one or more search terms, and the object search results data may include object search results data sorted or ranked based on probabilistic utility for the user identified by searching or traversing the object-indexes in accordance with the search terms.

The object-index search interface may generate and send, transmit, or otherwise make available the sorted or ranked object search results data to another component of the low-latency database analysis system 3000, such as for further processing and display to the user.

The object utility unit 3810 may receive, process, and maintain user-specific object utility data for objects represented in the low-latency database analysis system 3000. The user-specific object utility data may indicate whether an object has high utility or low utility for the user.

The object utility unit 3810 may store the user-specific object utility data, such as on a per-object basis, a per-activity basis, or both. For example, in response to data indicating an object access activity, such as a user using, viewing, or otherwise accessing, an object, the object utility unit 3810 may store user-specific object utility data indicating the object access activity for the object, which may include incrementing an object access activity counter associated with the object, which may be a user-specific object access activity counter. In another example, in response to data indicating an object storage activity, such as a user storing an object, the object utility unit 3810 may store user-specific object utility data indicating the object storage activity for the object, which may include incrementing a storage activity counter associated with the object, which may be a user-specific object storage activity counter. The user-specific object utility data may include temporal information, such as a temporal location identifier associated with the object activity. Other information associated with the object activity may be included in the object utility data.

The object utility unit 3810 may receive a signal, message, or other communication, indicating a request for object utility information. The request for object utility information may indicate one or more objects, one or more users, one or more activities, temporal information, or a combination thereof. The request for object utility information may indicate a request for object utility data, object utility counter data, or both.

The object utility unit 3810 may determine, identify, or obtain object utility data in accordance with the request for object utility information. The object utility unit 3810 may generate and send object utility response data responsive to the request that may indicate the object utility data, or a portion thereof, in accordance with the request for object utility information.

For example, a request for object utility information may indicate a user, an object, temporal information, such as information indicating a temporal span, and an object activity, such as the object access activity. The request for object utility information may indicate a request for object utility counter data. The object utility unit 3810 may determine, identify, or obtain object utility counter data associated with the user, the object, and the object activity having a temporal location within the temporal span, and the object utility unit 3810 may generate and send object utility response data including the identified object utility counter data.

In some implementations, a request for object utility information may indicate multiple users, or may omit indicating a user, and the object utility unit 3810 may identify user-agnostic object utility data aggregating the user-specific object utility data. In some implementations, a request for object utility information may indicate multiple objects, may omit indicating an object, or may indicate an object type, such as answer, pinboard, or worksheet, and the object utility unit 3810 may identify the object utility data by aggregating the object utility data for multiple objects in accordance with the request. Other object utility aggregations may be used.

The system configuration unit 3820 implement or apply one or more low-latency database analysis system configurations to enable, disable, or configure one or more operative features of the low-latency database analysis system 3000. The system configuration unit 3820 may store data representing or defining the one or more low-latency database analysis system configurations. The system configuration unit 3820 may receive signals or messages indicating input data, such as input data generated via a system access interface, such as a user interface, for accessing or modifying the low-latency database analysis system configurations. The system configuration unit 3820 may generate, modify, delete, or otherwise maintain the low-latency database analysis system configurations, such as in response to the input data. The system configuration unit 3820 may generate or determine output data, and may output the output data, for a system access interface, or a portion or portions thereof, for the low-latency database analysis system configurations, such as for presenting a user interface for the low-latency database analysis system configurations. Although not shown in FIG. 3, the system configuration unit 3820 may communicate with a repository, such as an external centralized repository, of low-latency database analysis system configurations; the system configuration unit 3820 may receive one or more low-latency database analysis system configurations from the repository, and may control or configure one or more operative features of the low-latency database analysis system 3000 in response to receiving one or more low-latency database analysis system configurations from the repository.

The user customization unit 3830 may receive, process, and maintain user-specific utility data, such as user defined configuration data, user defined preference data, or a combination thereof. The user-specific utility data may indicate whether a data portion, such as a column, a record, autonomous-analysis data, or any other data portion or object, has high utility or low utility to an identified user. For example, the user-specific utility data may indicate that a defined column is a high-utility column or a low-utility column. The user customization unit 3830 may store the user-specific utility data, such as using the low-latency data structure. The user-specific utility data may include, feedback data, such as feedback indicating user input expressly describing or representing the utility of a data portion or object in response to utilization of the data portion or object, such as positive feedback indicating high utility or negative feedback indicating low utility. The user customization unit 3830 may store the feedback in association with a user identifier. The user customization unit 3830 may store the feedback in association with the context in which feedback was obtained. The user customization data, or a portion thereof, may be stored in an in-memory storage unit of the low-latency database analysis system. In some implementations, the user customization data, or a portion thereof, may be stored in the persistent storage unit 3930.

The system access interface unit 3900 may interface with, or communicate with, a system access unit (not shown in FIG. 3), which may be a client device, a user device, or another external device or system, or a combination thereof, to provide access to the internal data, features of the low-latency database analysis system 3000, or a combination thereof. For example, the system access interface unit 3900 may receive signals, message, or other communications representing interactions with the internal data, such as data expressing a usage intent and may output response messages, signals, or other communications responsive to the received requests.

The system access interface unit 3900 may generate data for presenting a user interface, or one or more portions thereof, for the low-latency database analysis system 3000. For example, the system access interface unit 3900 may generate instructions for rendering, or otherwise presenting, the user interface, or one or more portions thereof and may transmit, or otherwise make available, the instructions for rendering, or otherwise presenting, the user interface, or one or more portions thereof to the system access unit, for presentation to a user of the system access unit. For example, the system access unit may present the user interface via a web browser or a web application and the instructions may be in the form of HTML, JavaScript, or the like.

In an example, the system access interface unit 3900 may include a search field user interface element in the user interface. The search field user interface element may be an unstructured search string user input element or field. The system access unit may display the unstructured search string user input element. The system access unit may receive input data, such as user input data, corresponding to the unstructured search string user input element. The system access unit may transmit, or otherwise make available, the unstructured search string user input to the system access interface unit 3900. The user interface may include other user interface elements and the system access unit may transmit, or otherwise make available, other user input data to the system access interface unit 3900.

The system access interface unit 3900 may obtain the user input data, such as the unstructured search string, from the system access unit. The system access interface unit 3900 may transmit, or otherwise make available, the user input data to one or more of the other components of the low-latency database analysis system 3000.

In some embodiments, the system access interface unit 3900 may obtain the unstructured search string user input as a sequence of individual characters or symbols, and the system access interface unit 3900 may sequentially transmit, or otherwise make available, individual or groups of characters or symbols of the user input data to one or more of the other components of the low-latency database analysis system 3000.

In some embodiments, system access interface unit 3900 may obtain the unstructured search string user input may as a sequence of individual characters or symbols, the system access interface unit 3900 may aggregate the sequence of individual characters or symbols, and may sequentially transmit, or otherwise make available, a current aggregation of the received user input data to one or more of the other components of the low-latency database analysis system 3000, in response to receiving respective characters or symbols from the sequence, such as on a per-character or per-symbol basis.

The real-time collaboration unit 3910 may receive signals or messages representing input received in accordance with multiple users, or multiple system access devices, associated with a collaboration context or session, may output data, such as visualizations, generated or determined by the low-latency database analysis system 3000 to multiple users associated with the collaboration context or session, or both. The real-time collaboration unit 3910 may receive signals or messages representing input received in accordance with one or more users indicating a request to establish a collaboration context or session, and may generate, maintain, or modify collaboration data representing the collaboration context or session, such as a collaboration session identifier. The real-time collaboration unit 3910 may receive signals or messages representing input received in accordance with one or more users indicating a request to participate in, or otherwise associate with, a currently active collaboration context or session, and may associate the one or more users with the currently active collaboration context or session. In some implementations, the input, output, or both, of the real-time collaboration unit 3910 may include synchronization data, such as temporal data, that may be used to maintain synchronization, with respect to the collaboration context or session, among the low-latency database analysis system 3000 and one or more system access devices associated with, or otherwise accessing, the collaboration context or session.

The third-party integration unit 3920 may include an electronic communication interface, such as an application programming interface (API), for interfacing or communicating between an external, such as third-party, application or system, and the low-latency database analysis system 3000. For example, the third-party integration unit 3920 may include an electronic communication interface to transfer data between the low-latency database analysis system 3000 and one or more external applications or systems, such as by importing data into the low-latency database analysis system 3000 from the external applications or systems or exporting data from the low-latency database analysis system 3000 to the external applications or systems. For example, the third-party integration unit 3920 may include an electronic communication interface for electronic communication with an external exchange, transfer, load (ETL) system, which may import data into the low-latency database analysis system 3000 from an external data source or may export data from the low-latency database analysis system 3000 to an external data repository. In another example, the third-party integration unit 3920 may include an electronic communication interface for electronic communication with external machine learning analysis software, which may export data from the low-latency database analysis system 3000 to the external machine learning analysis software and may import data into the low-latency database analysis system 3000 from the external machine learning analysis software. The third-party integration unit 3920 may transfer data independent of, or in conjunction with, the system access interface unit 3900, the enterprise data interface unit 3400, or both.

The persistent storage unit 3930 may include an interface for storing data on, accessing data from, or both, one or more persistent data storage devices or systems. For example, the persistent storage unit 3930 may include one or more persistent data storage devices, such as the static memory 1200 shown in FIG. 1. Although shown as a single unit in FIG. 3, the persistent storage unit 3930 may include multiple components, such as in a distributed or clustered configuration. The persistent storage unit 3930 may include one or more internal interfaces, such as electronic communication or application programming interfaces, for receiving data from, sending data to, or both other components of the low-latency database analysis system 3000. The persistent storage unit 3930 may include one or more external interfaces, such as electronic communication or application programming interfaces, for receiving data from, sending data to, or both, one or more external systems or devices, such as an external persistent storage system. For example, the persistent storage unit 3930 may include an internal interface for obtaining key-value tuple data from other components of the low-latency database analysis system 3000, an external interface for sending the key-value tuple data to, or storing the key-value tuple data on, an external persistent storage system, an external interface for obtaining, or otherwise accessing, the key-value tuple data from the external persistent storage system, and an internal key-value tuple data for sending, or otherwise making available, the key-value tuple data to other components of the low-latency database analysis system 3000. In another example, the persistent storage unit 3930 may include a first external interface for storing data on, or obtaining data from, a first external persistent storage system, and a second external interface for storing data on, or obtaining data from, a second external persistent storage system.

Figure 4:
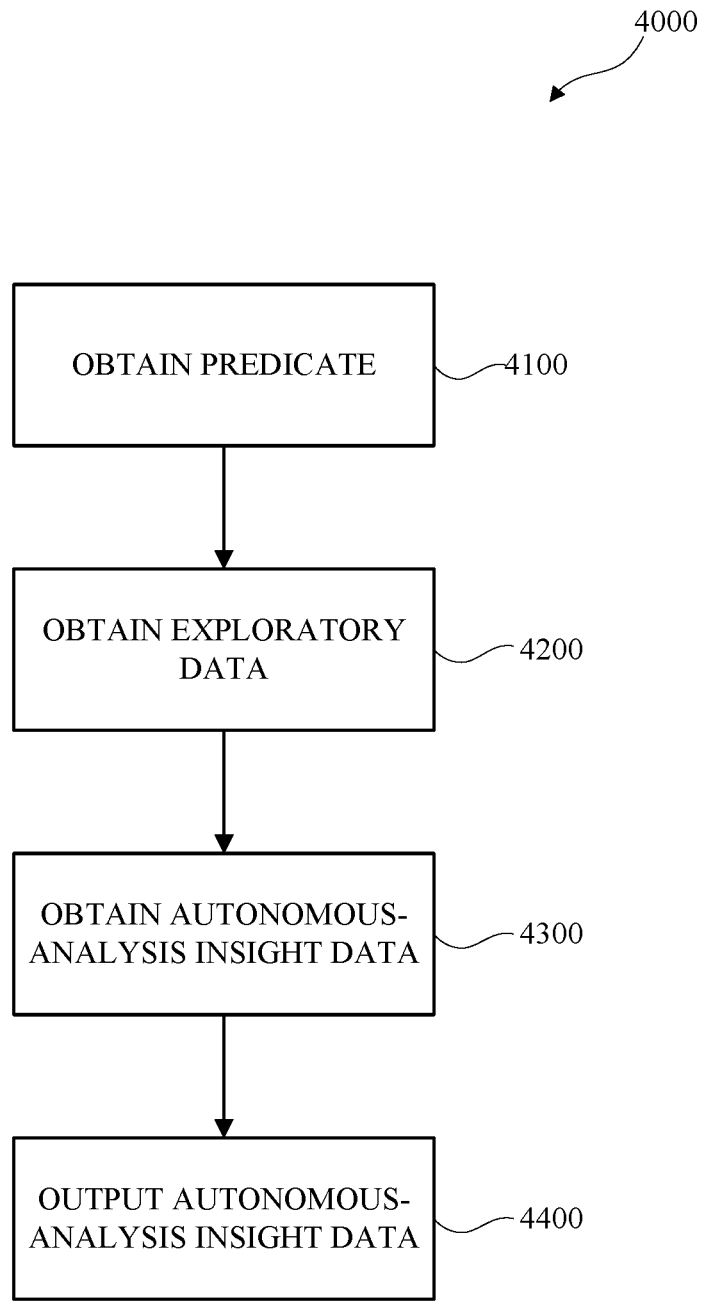
FIG. 4 is a flow diagram of an example of extended-latency predictive database analysis in a low-latency database analysis system.

FIG. 4 is a flow diagram of an example of extended-latency predictive database analysis 4000 in a low-latency database analysis system. Extended-latency predictive database analysis 4000 may be implemented in a low-latency database analysis system, such as the low-latency database analysis system 3000 shown in FIG. 3. For example, extended-latency predictive database analysis 4000, or a portion thereof, may be implemented in an autonomous-analysis unit of the low-latency database analysis system, such as the autonomous-analysis unit 3730 shown in FIG. 3.

As shown in FIG. 4, extended-latency predictive database analysis 4000 includes obtaining an autonomous-analysis predicate 4100, obtaining exploratory data 4200, obtaining autonomous-analysis insight data 4300, and outputting the autonomous-analysis insight data 4400.

An autonomous-analysis predicate may be obtained at 4100. An autonomous-analysis predicate may be a basis for performing extended-latency predictive database analysis, such as a current context, or a portion thereof, one or more analytical-objects, one or more resolved-requests, one or more data-queries, or a combination thereof. For example, the autonomous-analysis unit may receive, obtain, or otherwise access, a current context, such as from a system access interface unit of the low-latency database analysis system, such as the system access interface unit 3900 shown in FIG. 3, from a relational search unit of the low-latency database analysis system, such as the relational search unit 3700 shown in FIG. 3, or from another component of the low-latency database analysis system. The current context may include data representing a request for data from the low-latency database analysis system, such as a resolved-request or a data-query, which may correspond with previously generated autonomous-analysis insight data, and the current context, or a portion thereof, such as the resolved-request or the data-query, may be identified as the autonomous-analysis predicate. The autonomous-analysis predicate may include data identifying one or more data source objects, such as a table or columns. The autonomous-analysis predicate may include requestor data, such as data indicating a current user, group, organization, or a combination thereof. In some implementations, the autonomous-analysis predicate obtained at 4100 may include utility data, or a portion thereof.

Exploratory data may be obtained at 4200. Obtaining the exploratory data at 4200 may include identifying data portions, such as columns, from the low-latency data stored in the distributed in-memory database as data portions of utility, such as a column of utility. The data portion of utility may be identified in response to a determination that a probabilistic utility for the data portion satisfies a defined utility criterion. In some implementations, the autonomous-analysis unit may obtain candidate data portions of utility from a data utility unit of the low-latency database analysis system, such as the data utility unit 3720 shown in FIG. 3. For example, the autonomous-analysis unit may send, transmit, or otherwise make available, the autonomous-analysis predicate, or a portion thereof, to the data utility unit, and may receive the candidate data portions of utility from the data utility unit.

The data utility unit may identify one or more data portions of utility (candidate exploratory data portions) based on a predicate and utility data. For example, the autonomous-analysis predicate may include a resolved-request corresponding to previously generated results data, such as requested results data; the resolved-request may include measure data, such as measure tokens or measure objects corresponding to columns in the low-latency data that are identified as measure columns, and the data utility unit may identify one or more attributes (candidate exploratory attributes, available attributes, or drill attributes), such as attribute tokens or attribute objects corresponding to columns in the low-latency data identified as attribute columns, one or more measures (candidate exploratory measures, available measures, or drill measures), such as measure tokens or measure objects corresponding to columns in the low-latency data identified as measure columns, or a combination thereof.

One or more of the candidate exploratory data portions may be identified based on ontological data, such as a schema graph, describing data portions, such as columns and tables, of the low-latency data, and relationships among the data portions. For example, one or more of the candidate exploratory data portions may be identified from one or more tables (exploratory tables or exploratory data sources), other than the tables indicated by the autonomous-analysis predicate, which may be identified based on ontological data indicating relationships between the exploratory tables and the tables indicated by the autonomous-analysis predicate.

The candidate exploratory data portions may be ordered, ranked, or weighted based on the corresponding utility data. In some implementations, the candidate exploratory attributes may be ordered, ranked, or weighted with respect to other candidate exploratory attributes and the candidate exploratory measures may be ordered, ranked, or weighted with respect to other candidate exploratory measures. The utility data may be user-specific, group-specific, organization-specific, or a combination thereof.

For example, the data utility unit may identify features (for probabilistic data modeling) corresponding to the respective portions of the data source, such as the resolved-request, indicated in the autonomous-analysis predicate. For example, the autonomous-analysis predicate may include a table object as the data source, and respective columns of the table may be identified as respective features. In another example, the autonomous-analysis predicate may include a resolved-request, such as a resolved-request including the ordered sequence of tokens 'yearly' 'precipitation', and each of the respective data portions, 'yearly' and 'precipitation', may be identified as features. Phrase information for the autonomous-analysis predicate may be identified as features. For example, the autonomous-analysis predicate may include the resolved-request including the ordered sequence of tokens 'yearly' 'precipitation', and the phrase type 'measure by attribute' (e.g., 'precipitation' by 'year') may be identified as an attribute. In another example, a pairwise combination of constraints, such as a combination of a user identifier and a column identifier may be a feature. In some implementations, the graph-distance of a candidate exploratory data portion from the data portions indicated in the autonomous-analysis predicate may be included as negative weights for the determination of the probability of utility. For example, a first column from a first table, wherein the first table is indicated in the autonomous-analysis predicate, may have a relatively low graph-distance weight, such as zero, a second column from a second table, which may have an edge connecting the second table to the first table in the ontological-graph, may have a graph-distance weight that is higher than the graph-distance weight of the first column, wherein a higher graph-distance weight indicates a lower probability of utility, and a third column from a third table, which may have an edge connecting the third table to the second table in the ontological-graph, may have a graph-distance weight that is higher than the graph-distance weight of the second column.

The data utility unit may identify a respective probability distribution for available exploratory data portions for a respective identified feature. The data utility unit may generate a combined probability distribution by combining the respective probability distribution for the respective identified features using a machine learning model. For example, the data utility unit may output, such as write, or otherwise make available, a file including the identified features, and a machine learning model generation process may read, or otherwise access, the file including the identified features, and may generate the combined probability distribution. The data utility unit may identify the candidate exploratory data portions based on the combined probability distribution. The data utility unit may identify the candidate exploratory data portions as an ordered, weighted, or both, list of candidate exploratory data portions, wherein the respective order, weight, or both, indicates a probabilistic likelihood of utility for a respective candidate exploratory data portion based on the autonomous-analysis predicate. The data utility unit may output, send, or otherwise make available, the ordered, weighted, or both, set or list of candidate exploratory data portions to the autonomous-analysis unit. The set or list of candidate exploratory data portions may include data indicating a data portion type, such as attribute, measure, or temporal-attribute, for the respective data portions. The attribute data portions include the temporal-attribute portions, except as described herein or otherwise clear from context.

The autonomous-analysis unit may receive, obtain, or otherwise access, data indicating the exploratory data portions from the data utility unit and may generate the exploratory data-queries.

The autonomous-analysis unit may obtain, or otherwise access, the ordered, weighted, or both, candidate exploratory data portions from the data utility unit. The autonomous-analysis unit may obtain express utility data based on the autonomous-analysis predicate. The express utility data may include express utility data associated with a user, group, organization, or a combination thereof, expressly identifying one or more data portions as having high utility or low utility. The autonomous-analysis unit may identify exploratory data portions based on the ordered, weighted, or both, candidate exploratory data portions and the express utility data. For example, the express utility data may indicate a request to exclude a data portion associated with a current user indicated in the autonomous-analysis predicate and the respective data portion may be omitted from the exploratory data portions. Candidate exploratory data portions, other than candidate exploratory data portions omitted from the exploratory data portions, may be included in the exploratory data portions. In another example, the express utility data may indicate user feedback associated with a current user indicated in the autonomous-analysis predicate and indicating high utility for a data portion and the ordered, weighted, or both, candidate exploratory data portions may be updated to increase the order, weight, or both, of the corresponding data portion. In some implementations, the data portion having the lowest ordinal or the earliest position in the order may have the highest utility and increasing the order may indicate lowering the ordinal or otherwise moving the respective element toward the top of the list indicating an increase in probable utility. In some implementations, the autonomous-analysis unit may obtain, or otherwise access, the express utility data, or a portion thereof, from another component of the low-latency database analysis system, such as from a user customization unit of the low-latency database analysis system, such as the user customization unit 3830 shown in FIG. 3, a system configuration unit, such as the system configuration unit 3820 shown in FIG. 3, or a combination thereof.

The autonomous-analysis unit may generate an ordered, ranked, or weighted set or list of exploratory attributes, an ordered, ranked, or weighted set or list of exploratory measures, and an ordered, ranked, or weighted set or list of exploratory temporal-attributes, based on the updated set or list of exploratory data portions.

Autonomous-analysis insight data may be obtained at 4300. Obtaining the autonomous-analysis insight data at 4300 may include identifying one or more types of autonomous-analysis. A respective type of autonomous-analysis may correspond with one or more defined autonomous-analysis policies. The low-latency database analysis system may include one or more defined 'outlier' autonomous-analysis policies for obtaining outlier type autonomous-analysis insight data (outlier autonomous-analysis). The low-latency database analysis system may include one or more defined 'cross-correlation' autonomous-analysis policies for obtaining cross-correlation type autonomous-analysis insight data (cross-correlation autonomous-analysis). The low-latency database analysis system may include one or more defined 'trend' autonomous-analysis policies for obtaining trend type autonomous-analysis insight data (trend autonomous-analysis). The low-latency database analysis system may include one or more defined 'comparative' autonomous-analysis policies for obtaining comparative type autonomous-analysis insight data (comparative autonomous-analysis). Other autonomous-analysis policies and types may be used. The autonomous-analysis policies may be algorithms, such as machine learning algorithms or models, or solutions thereof, which may automatically update or self-tune based on one or more characteristics of the low-latency data, the utility data, or a combination thereof. One or more of outlier autonomous-analysis, cross-correlation autonomous-analysis, trend autonomous-analysis, and comparative autonomous-analysis, or respective portions thereof, may performed substantially concurrently, such as in parallel. For example, obtaining the autonomous-analysis insight data (insights), may include generating the autonomous-analysis insight data based on the autonomous-analysis predicate, the exploratory data, and one or more of the defined autonomous-analysis policies, such as by obtaining first autonomous-analysis insight data based on a first defined autonomous-analysis policy and second autonomous-analysis insight data based on a second defined autonomous-analysis policy.

Obtaining the autonomous-analysis insight data at 4300 may include generating one or more exploratory data-queries based on the autonomous-analysis predicate and the exploratory data portions, obtaining the exploratory results data based on the exploratory data-queries, and obtaining the autonomous-analysis insight data based on the exploratory results data. For example, the exploratory results data may be obtained from a distributed in-memory database of the low-latency database analysis system, such as the distributed in-memory database 3300 shown in FIG. 3.

Obtaining the exploratory results data may include obtaining exploratory results, or an exploratory result set, for a respective exploratory data-query, which may correspond with a respective exploratory data portion, by sending, or otherwise making available, the exploratory data-query to the distributed in-memory database and obtaining, or otherwise accessing, the corresponding exploratory results generated by the distributed in-memory database responsive to the exploratory data-query. An exploratory data-query, corresponding exploratory data sources, exploratory results, or a combination thereof, may be referred to herein as a drill path. For example, the data-query included in the autonomous-analysis predicate may indicate grouping corresponding results data based on a first attribute, and the exploratory data-query may indicate grouping the exploratory results based on a combination of the first attribute and an exploratory attribute. Obtaining the exploratory data may include obtaining multiple sets of exploratory results based on a respective exploratory attribute.

Obtaining the autonomous-analysis insight data may include obtaining outlier autonomous-analysis insight data (outliers or anomalies) based on one or more outlier autonomous-analysis policies, the autonomous-analysis predicate, and the exploratory data. For a respective exploratory attribute, or exploratory temporal-attribute, the autonomous-analysis unit may generate a corresponding exploratory data-query. The exploratory data-query may indicate one or more measures, such as one or more of the exploratory measures, one or more of the measures indicated in the autonomous-analysis predicate, or a combination thereof, one or more attributes or temporal-attributes indicated in the autonomous-analysis predicate, and the respective exploratory attribute or exploratory temporal-attribute. In some implementations, the data-query indicated in the autonomous-analysis predicate may be used as an exploratory data-query.

The autonomous-analysis unit may send, transmit, or otherwise make available, the exploratory data-query to the distributed in-memory database, and may receive, obtain, or otherwise access, an exploratory results set responsive to the exploratory data-query, such as from the distributed in-memory database. The autonomous-analysis unit may cache the exploratory results data in an in-memory data storage unit of the autonomous-analysis unit.

In some implementations, the autonomous-analysis unit may determine whether exploratory results data corresponding to, or satisfying, the respective exploratory data-query is available (cached) in the in-memory cache of the autonomous-analysis unit, and may use the cached exploratory results data and omit obtaining exploratory results data from the distributed in-memory database for the respective exploratory data-query, in response to a determination that the exploratory results data is cached.

The autonomous-analysis unit may identify the outlier autonomous-analysis insight data based on the exploratory results data. For example, the autonomous-analysis unit may identify respective outlier autonomous-analysis insight data based on a respective exploratory results set. Obtaining outlier autonomous-analysis insight data may include identifying measure values that are statistically exceptional from the exploratory results data.

For example, the autonomous-analysis predicate may include the resolved-request 'precipitation by year', or a corresponding data-query. The exploratory attribute 'State' may be identified at 4200, an exploratory data-query corresponding to 'precipitation by year by state' may be generated and used to obtain exploratory results representing precipitation values grouped by year and by State, and exceptional precipitation values, for a year and State, may be identified as outliers. An outlier may indicate an attribute value and a measure value from the data distribution of the exploratory results data.

Obtaining outlier autonomous-analysis insight data may include using a linear regression-based outlier autonomous-analysis policy, such an Ordinary Least Squares based outlier autonomous-analysis policy. Obtaining outlier autonomous-analysis insight data may include using a z-score based outlier autonomous-analysis policy. Obtaining outlier autonomous-analysis insight data using a z-score based outlier autonomous-analysis policy may include identifying a current value from the exploratory results data as an outlier by determining an average of corresponding values from the exploratory results data, identifying a multiple of a standard deviation from the average, and identifying the current value as an outlier in response to a determination that the difference between the current value and the average exceeds, such as is greater than, the multiple of the standard deviation. A multiplier for determining the multiple of the standard deviation may be automatically identified. For example, the multiplier may be proportional to the cardinality of the exploratory results data. For example, the exploratory results data may have a cardinality, such as number of rows, less than twenty and the multiplier may be two, the exploratory results data may have a cardinality greater than or equal to twenty and less than five-hundred and the multiplier may be 3, the exploratory results data may have a cardinality greater than or equal to five-hundred and less than ten-thousand and the multiplier may be 4, or the exploratory results data may have a cardinality greater than or equal to ten-thousand and the multiplier may be 5. A relatively large multiplier may correspond with identifying relatively few, such as zero, outliers. A relatively small multiplier may correspond with identifying a greater cardinality of outliers relative to the relatively large multiplier. In some implementations, obtaining outlier autonomous-analysis insight data may include iteratively relaxing, or reducing, the multiplier, such as in a range from a maximum value to a minimum value, to identify a cardinality of outliers that satisfies a defined minimum threshold. In some implementations, the multiplier may be expressly identified, such as based on user input.

Obtaining the autonomous-analysis insight data at 4300 may include ranking or scoring the outliers and corresponding autonomous-analysis insight datasets. The outliers identified based on a respective exploratory results data portion may be sorted, ranked, or scored (exploratory results data portion-specific score). For example, the outliers may be sorted, ranked, or scored based on the magnitude of the difference between the value of the outlier data portion and the respective expected value, average, or other scoring metric. A combined set of outliers may be ranked, sorted, or scored based on the exploratory results data portion specific score (exploratory results data portion-agnostic ranking).

Obtaining the autonomous-analysis insight data may include obtaining trend autonomous-analysis insight data (trends) based on one or more trend autonomous-analysis policies, the autonomous-analysis predicate, and the exploratory data. The autonomous-analysis unit may generate an exploratory data-query for trend autonomous-analysis for respective distinct combinations of a measure, such as one of the exploratory measures or one of the measures indicated in the autonomous-analysis predicate, and a temporal-attribute, such as one of the exploratory temporal-attributes or one of temporal-attributes indicated in the autonomous-analysis predicate.

The autonomous-analysis unit may send, transmit, or otherwise make available, the exploratory data-query to the distributed in-memory database, and may receive, obtain, or otherwise access, an exploratory results set responsive to the exploratory data-query, such as from the distributed in-memory database. The autonomous-analysis unit may cache the exploratory results data in an in-memory data storage unit of the autonomous-analysis unit.

In some implementations, the autonomous-analysis unit may determine whether exploratory results data corresponding to, or satisfying, the respective exploratory data-query is available (cached) in the in-memory cache of the autonomous-analysis unit, and may use the cached exploratory results data and omit obtaining exploratory results data from the distributed in-memory database for the respective exploratory data-query, in response to a determination that the exploratory results data is cached.

The autonomous-analysis unit may identify the trend autonomous-analysis insight data based on the exploratory results data. For example, the autonomous-analysis unit may identify respective trend autonomous-analysis insight data based on a respective exploratory results set. Obtaining trend autonomous-analysis insight data may include identifying a statistical trend of values of a measure for a value of an attribute over time from the exploratory results data. A trend may indicate an attribute value and a temporal sequence of measure values from the data distribution of the exploratory results data.

For example, the autonomous-analysis predicate may include the resolved-request 'precipitation by state', or a corresponding data-query. The exploratory temporal-attribute corresponding to 'Year' may be identified at 4200, an exploratory data-query corresponding to 'precipitation by state by year' may be generated and used to obtain exploratory results representing precipitation values grouped by State and by year, and trends of the precipitation values (measure value), among years (temporal value), by State (attribute value), may be identified as trends.

The autonomous-analysis unit may generate a trend analysis model, such as a linear regression model, based on the exploratory results data. The autonomous-analysis unit may determine whether a threshold metric of the trend analysis model, such as a probability value (p_value) of a linear regression model, satisfies a defined criterion, such as is at least, such as greater than or equal to, a defined minimum value. The threshold metric may be less than the defined minimum value, the trend analysis model may be rejected, such as omitted from use, and trend autonomous-analysis insight data for the respective combination of exploratory measure and exploratory temporal-attribute may be unavailable. The threshold metric may satisfy the defined criterion, the trend analysis model may be accepted, the respective combination of exploratory measure and exploratory temporal-attribute may be identified as a trend, and a slope and intercept may be identified for the trend analysis model.

Obtaining the autonomous-analysis insight data at 4300 may include ranking or scoring the trends and the corresponding autonomous-analysis insight datasets. The trends identified based on a respective exploratory results data portion may be sorted, ranked, or scored (exploratory results data portion-specific score). For example, the trends may be sorted, ranked, or scored based on a trend ranking basis. A combined set of trends may be ranked, sorted, or scored based on the exploratory results data portion specific score (exploratory results data portion-agnostic ranking).

Obtaining the autonomous-analysis insight data may include obtaining cross-correlation autonomous-analysis insight data (cross-correlations) based on one or more cross-correlation autonomous-analysis policies, the autonomous-analysis predicate, and the exploratory results data. The autonomous-analysis unit may generate an exploratory data-query for cross-correlation autonomous-analysis for respective distinct combinations of a distinct pair of measures, such as measures from the exploratory measures or from the measures indicated in the autonomous-analysis predicate, and one or more temporal-attribute, such as one of the exploratory temporal-attributes or one of temporal-attributes indicated in the autonomous-analysis predicate.

For example, an exploratory data-query may be generated based on an attribute, a first measure, a second measure, and a temporal-attribute associated with the first measure and the second measure. In another example, an exploratory data-query may be generated based on an attribute, a first measure, a temporal-attribute associated with the first measure, a second measure, and a temporal-attribute associated with the second measure.

The autonomous-analysis unit may send, transmit, or otherwise make available, the exploratory data-query to the distributed in-memory database, and may receive, obtain, or otherwise access, an exploratory results set responsive to the exploratory data-query, such as from the distributed in-memory database. The autonomous-analysis unit may cache the exploratory results data in an in-memory data storage unit of the autonomous-analysis unit.

In some implementations, the autonomous-analysis unit may determine whether exploratory results data corresponding to, or satisfying, the respective exploratory data-query is available (cached) in the in-memory cache of the autonomous-analysis unit, and may use the cached exploratory results data and omit obtaining exploratory results data from the distributed in-memory database for the respective exploratory data-query, in response to a determination that the exploratory results data is cached.

The autonomous-analysis unit may identify the cross-correlation autonomous-analysis insight data based on the exploratory results data. For example, the autonomous-analysis unit may identify respective cross-correlation autonomous-analysis insight data based on a respective exploratory results set. Obtaining cross-correlation autonomous-analysis insight data may include identifying a statistical correlation, such as bivariate correlation, of a value of a first measure, from the pair of measures, with respect to a value of an attribute, at a value of a temporal-attribute relative to a value of a second measure, from the pair of measures, at a value of a temporal-attribute from the exploratory results data. For example, the autonomous-analysis predicate obtained at 4100 may include a resolved-request, or a corresponding data-query, that includes a 'precipitation' measure, a 'State' attribute, and a 'precipitation-date' temporal-attribute. an exploratory measure 'temperature' may be identified at 4200. An exploratory data-query corresponding to 'precipitation and temperature by state by year' may be generated and used to obtain exploratory results representing precipitation values (measure value) and temperature values (measure value) grouped by State (attribute value) and by year (temporal value). A cross-correlation may indicate an attribute value, a first temporal sequence of measure values, a second, correlated, temporal sequence of measure values from the data distribution, or distributions, of the exploratory results data, and a correlation lag.

In some implementations, obtaining cross-correlation autonomous-analysis insight data may include identifying a statistical correlation, such as bivariate correlation, of a value of a first measure, from the pair of measures, with respect to a value of an attribute, at a value of a first temporal-attribute relative to a value of a second measure, from the pair of measures, at a value of a second temporal-attribute from the exploratory results data. For example, the autonomous-analysis predicate obtained at 4100 may include a resolved-request, or a corresponding data-query, that includes a 'precipitation' measure, a 'State' attribute, and a 'precipitation-date' temporal-attribute. an exploratory measure, 'temperature', and an exploratory temporal-attribute, 'temperature-date', may be identified at 4200. A first exploratory data-query corresponding to 'precipitation by state by precipitation-year' may be generated and used to obtain first exploratory results representing precipitation values grouped by State and by precipitation-year, and a second exploratory data-query corresponding to 'temperature by state by temperature-year' may be generated and used to obtain first exploratory results representing temperature values grouped by State and by temperature-year. In some implementations, identifying a cross-correlation may include determining a coefficient of correlation indicating a probabilistic likelihood of correlation.

Cross-correlation may include aligning, or identifying a basis for aligning, a distribution of values of a first measure, from a pair of measures, with a distribution of values of a second measure, from the pair of measures, with respect to a value of an attribute, wherein the respective measure values are distributed in the temporal domain. A difference between temporal locations corresponding to the distribution of values of the first measure and temporal locations corresponding to the distribution of values of the second measure may be identified as a lag. For example, the correlation may be determined based on a value of a measure corresponding to a value of a date-attribute and a value of another measure corresponding to the value of the date-attribute, or a temporally equivalent value of another date-attribute, which may correspond with zero lag. In another example, the correlation may be determined based on a value of a measure corresponding to a value of a date-attribute and a value of another measure corresponding to another value of the date-attribute, or of another date-attribute, which may correspond with a non-zero lag. The maximal correlation may be determined for a range of lag values, such as from zero lag to a defined maximum lag.

In some implementations, the magnitude of the temporal difference between adjacent lag values (lag step size) may be determined based on the autonomous-analysis predicate. For example, the autonomous-analysis predicate may indicate a chronometric unit determining an aggregate measure value. For example, the resolved-request 'precipitation by month' indicates a request for aggregations of month-wise groups of precipitation values, and the lag step size may be identified as corresponding to a month. In some implementations, the magnitude of the temporal difference between adjacent lag values (lag step size) may be determined based on the exploratory results data. For example, the resolved-request 'precipitation by date' indicates a request for aggregations of precipitation values based on temporal groupings and omits an indication of a chronometric unit for the temporal grouping. Generating the exploratory results data includes determining a chronometric unit for the temporal grouping. For example, the chronometric unit for the temporal grouping may be identified by determining a chronometric unit magnitude, or step size, such that grouping the source data used for generating the exploratory date in accordance with the chronometric unit generates a cardinality of groups or categories that is with a defined range. The chronometric unit used for grouping the exploratory results data may be used as the lag step size. In some implementations, the chronometric unit associated with the exploratory results corresponding to a first date-attribute may differ from the chronometric unit associated with the exploratory results corresponding to a second date-attribute, and the larger chronometric unit may be used as the lag step size.

Obtaining the autonomous-analysis insight data at 4300 may include ranking or scoring the cross-correlations and the corresponding autonomous-analysis insight datasets. The cross-correlations identified based on a respective exploratory results data portion may be sorted, ranked, or scored (exploratory results data portion-specific score). For example, the cross-correlations may be sorted, ranked, or scored based on a cross-correlation ranking basis. A combined set of cross-correlations may be ranked, sorted, or scored based on the exploratory results data portion specific score (exploratory results data portion-agnostic ranking).

Obtaining the autonomous-analysis insight data may include obtaining comparative autonomous-analysis insight data (comparatives) based on one or more comparative autonomous-analysis policies, the autonomous-analysis predicate, two or more comparative tuples, and the exploratory results data.

Obtaining the autonomous-analysis predicate at 4100 may include obtaining data indicating two or more comparative tuples, such as comparative tuples identified in response to user input selecting the comparative tuples. A comparative tuple may include an attribute values of an attribute, such as an attribute value from results data corresponding to a resolved-request, or data-query, indicated in the autonomous-analysis predicate. The comparative tuples may include a measure value of a measure, such as a measure value from results data corresponding to a resolved-request, or data-query, indicated in the autonomous-analysis predicate. The comparative tuples may indicate a request for comparative autonomous-analysis of the comparative tuples.

For example, a first comparative tuple may include a first attribute value of an attribute and a first measure value, of a measure, corresponding to the first attribute value. A second comparative tuple may include a second attribute value of the attribute and a second measure value, of the measure, corresponding to the second attribute value. The comparative tuples may indicate a request for comparative autonomous-analysis of a difference between the first measure value, associated with the first attribute value, and the second measure value, associated with the second attribute value.

Although two comparative tuples are described herein, three or more comparative tuples may be used. For example, the comparative tuples may include three comparative tuples. The first comparative tuple may include a first attribute value of an attribute and a first measure value, of a measure, corresponding to the first attribute value. The second comparative tuple may include a second attribute value of the attribute and a second measure value, of the measure, corresponding to the second attribute value. The third comparative tuple may include a third attribute value of the attribute and a third measure value, of the measure, corresponding to the third attribute value. The comparative tuples may indicate a request for comparative autonomous-analysis of differences among the first measure value, associated with the first attribute value, the second measure value, associated with the second attribute value, and the third measure value, associated with the third attribute value.

Although two values of a measure and two values of an attribute are described herein, values of two or more attributes, two or more measures, or both, may be used. For example, the first comparative tuple may include a first attribute value of a first attribute, a second attribute value of a second attribute, and a first measure value, of a measure, corresponding to the first attribute value and the second attribute value. The second comparative tuple may include a third attribute value of the first attribute, a fourth attribute value of the second attribute, and a second measure value, of a measure, corresponding to the third attribute value and the fourth attribute value. The comparative tuples may indicate a request for comparative autonomous-analysis of a difference between the first measure value, associated with the first attribute value and the second attribute value, and the second measure value, associated with the third attribute value and the fourth attribute value.

The autonomous-analysis unit may generate an exploratory data-query for comparative autonomous-analysis based on the resolved-request, or data-query, indicated in the autonomous-analysis predicate, the comparative tuples, and one or more exploratory attributes. For example, an exploratory data-query may be generated based on a first attribute, such as an attribute from the autonomous-analysis predicate, a first value of the first attribute from the comparative tuples, a second value of the attribute from the comparative tuples, a measure, such as a measure from the autonomous-analysis predicate, and an exploratory attribute. Respective data-queries may be generated and used to obtain respective exploratory results on a per-exploratory attribute basis.

The autonomous-analysis unit may send, transmit, or otherwise make available, the exploratory data-query to the distributed in-memory database, and may receive, obtain, or otherwise access, an exploratory results set responsive to the exploratory data-query, such as from the distributed in-memory database. The autonomous-analysis unit may cache the exploratory results data in an in-memory data storage unit of the autonomous-analysis unit.

In some implementations, the autonomous-analysis unit may determine whether exploratory results data corresponding to, or satisfying, the respective exploratory data-query is available (cached) in the in-memory cache of the autonomous-analysis unit, and may use the cached exploratory results data and omit obtaining exploratory results data from the distributed in-memory database for the respective exploratory data-query, in response to a determination that the exploratory results data is cached.

The autonomous-analysis unit may identify the comparative autonomous-analysis insight data based on the exploratory results data. For example, the autonomous-analysis unit may identify respective comparative autonomous-analysis insight data based on a respective exploratory results set.

Obtaining comparative autonomous-analysis insight data may include determining a difference between the value of the measure corresponding to the first value of the comparative attribute and the value of the measure corresponding to the second value of the comparative attribute. For example, the autonomous-analysis predicate may include the resolved-request 'precipitation by year', or a corresponding data-query. A first comparative tuple may indicate a first year (comparative attribute value) and a first precipitation value (measure value). A second comparative tuple may indicate a second year (comparative attribute value) and a second precipitation value (measure value). The request for comparative autonomous-analysis may indicate a request to identify a basis for a difference between the first precipitation value and the second precipitation value.

Obtaining comparative autonomous-analysis insight data may include, on a per-exploratory attribute value basis, determining a difference between a value of the measure, corresponding to the first value of the comparative attribute and a respective value of the exploratory attribute, and a value of the measure, corresponding to the second value of the comparative attribute and the respective value of the exploratory attribute. For example, the autonomous-analysis predicate may include the resolved-request 'precipitation by year', or a corresponding data-query. A first comparative tuple may indicate a first year (comparative attribute value) and a first precipitation value (measure value). A second comparative tuple may indicate a second year (comparative attribute value) and a second precipitation value (measure value). The exploratory attribute corresponding to 'State' may be identified at 4200, an exploratory data-query corresponding to 'precipitation by state for the first year and the second year' may be generated and used to obtain exploratory results representing precipitation values grouped by State and by year for the first year and the second year, and differences in the precipitation values between the first year and the second year on a state-by-state basis may be determined. In some implementations, the exploratory results may include a value indicating the difference in the precipitation values between the first year and the second year for a respective State.

Obtaining comparative autonomous-analysis insight data may include, on a per-exploratory attribute basis, identifying a subset (contributors) of the values of the exploratory attribute, the contributors including exploratory attribute values corresponding to differences of measure values associated with the respective exploratory attribute values, such as in descending magnitude order with respect to the differences of measure values.

For example, the autonomous-analysis predicate may include the resolved-request 'precipitation by year', or a corresponding data-query. A first comparative tuple may indicate a first year (comparative attribute value) and a first precipitation value (measure value). A second comparative tuple may indicate a second year (comparative attribute value) and a second precipitation value (measure value). The exploratory attribute corresponding to 'State' may be identified at 4200, an exploratory data-query corresponding to 'precipitation by state for the first year and the second year' may be generated and used to obtain exploratory results representing precipitation values grouped by State and by year for the first year and the second year, and differences in the precipitation values between the first year and the second year on a state-by-state basis may be determined. The difference between the precipitation value for the first year for a first State and the precipitation value for the second year and the first state may be the highest magnitude precipitation value difference among the precipitation value differences corresponding to states and years. The difference between the precipitation value for the first year for a second State and the precipitation value for the second year and the second state may be the second-highest magnitude precipitation value difference among the precipitation value differences corresponding to states and years. The first State and the Second State may be identified as the contributors.

Obtaining comparative autonomous-analysis insight data may include, on a per-exploratory attribute basis, determining, for a respective contributor, for a respective measure value, a corresponding share value indicating a ratio of the exploratory attribute-specific measure value, associated with a value of the comparative attribute and a value of the exploratory attribute, to the exploratory attribute-agnostic measure value, associated with the value of the comparative attribute. Obtaining comparative autonomous-analysis insight data may include determining a difference between respective share values for the contributors, indicating a relative portion of the difference of the comparative measure values that corresponds to the respective exploratory attribute. Obtaining comparative autonomous-analysis insight data may include, on a per-exploratory attribute basis, identifying exceptional share value differences (share value exceptions), such as using a z-score analysis of the share value differences. Obtaining comparative autonomous-analysis insight data may include, on a per-exploratory attribute basis, may include identifying contributors corresponding to share value exceptions as comparative insights.

For example, the autonomous-analysis predicate may include the resolved-request 'precipitation by year', or a corresponding data-query. A first comparative tuple may indicate a first year (comparative attribute value), such as 1999 and a first precipitation value (measure value), such as 47091. A second comparative tuple may indicate a second year (comparative attribute value), such as 2000, and a second precipitation value (measure value), such as 54243. The exploratory attribute corresponding to 'State' may be identified at 4200, an exploratory data-query corresponding to 'precipitation by state for the first year and the second year' may be generated and used to obtain exploratory results representing precipitation values grouped by State and by year for the first year and the second year, and differences in the precipitation values between the first year and the second year on a state-by-state basis may be determined. The difference between a precipitation value, such as 1618, for the first year, 1999, for a first State, such as Hawaii, and the precipitation value, such as 1864, for the second year, 2000, and the first state may be the second highest magnitude precipitation value difference, approximately 246, among the precipitation value differences corresponding to states and years. The share value for Hawaii for 1999 is approximately 0.034. The share value for Hawaii for 2000 is approximately 0.034. The share value difference for precipitation in Hawaii between 1999 and 2000 is 0. The difference between a precipitation value, 1528, for the first year for a second State, such as Louisiana, and the precipitation value, 1869, for the second year and the second state may be the highest magnitude precipitation value difference, approximately 341, among the precipitation value differences corresponding to states and years. The share value for Louisiana for 1999 is 0.032. The share value for Louisiana for 2000 is approximately 0.034. The share value difference for precipitation in Louisiana between 1999 and 2000 is approximately 0.002. The first State, Hawaii, and the second State, Louisiana, may be identified as the contributors. Louisiana may be identified as a contributor and as corresponding to a share value exception and may be identified as a as comparative insight.

Obtaining the autonomous-analysis insight data at 4300 may include ranking or scoring the comparatives and the corresponding autonomous-analysis insight datasets. The comparatives identified based on a respective exploratory results data portion may be sorted, ranked, or scored (exploratory results data portion-specific score). For example, the comparatives may be sorted, ranked, or scored based on a comparative ranking basis. A combined set of comparatives may be ranked, sorted, or scored based on the exploratory results data portion specific score (exploratory results data portion-agnostic ranking).

The autonomous-analysis insight data, such as an insight or an autonomous-analysis insight dataset, generated based on an exploratory result set and a defined autonomous-analysis policy may include a respective context, which may be generated for the autonomous-analysis insight dataset, an autonomous-analysis insight data-query, which may be based on the exploratory data-query and the defined autonomous-analysis policy, corresponding results data, or a combination thereof.

The autonomous-analysis insight data may be output at 4400. For example, a defined cardinality of outlier autonomous-analysis insight datasets may be output, such as in rank, score, or order of the outlier autonomous-analysis insight datasets identified at 4300, a defined cardinality of trend autonomous-analysis insight datasets may be output, such as in rank, score, or order of the trend autonomous-analysis insight datasets identified at 4300, a defined cardinality of cross-correlation autonomous-analysis insight datasets may be output, such as in rank, score, or order of the cross-correlation autonomous-analysis insight datasets identified at 4300, a defined cardinality of comparative autonomous-analysis insight datasets may be output, such as in rank, score, or order of the comparative autonomous-analysis insight datasets identified at 4300, or a combination thereof, may be output at 4400.

Outputting the autonomous-analysis insight data at 4400 may include generating a visualization, a natural-language narrative, or a combination thereof, for a respective autonomous-analysis insight dataset.

Generating the visualization for the respective autonomous-analysis insight dataset may include identifying a visualization template, identifying one or more visualization parameter values in accordance with the visualization template, and generating the visualization based on the identified visualization parameter values in accordance with the visualization template.

The natural-language narrative, or description, may be a text string that describes the respective autonomous-analysis insight dataset, the corresponding visualization, the corresponding autonomous-analysis type, the utility thereof, or a combination thereof. The natural-language narrative may be generated based on the autonomous-analysis insight dataset in accordance with a defined natural-language narrative template, which may be associated with the corresponding autonomous-analysis type.

The visualizations, natural-language narratives, or both for the autonomous-analysis insight data may be output, such as sent, transmitted, or otherwise made available, to the system access interface unit for presentation to a user, such a via a user interface.

Outputting the autonomous-analysis insight data at 4400 may include generating a data-query, an answer object, or both, representing the autonomous-analysis insight data. The data-query, the answer object, or both, may be stored in the low-latency database analysis system, such as in a in-memory data storage unit of the low-latency database analysis system or in a persistent storage unit of the low-latency database analysis system, such as the persistent storage unit 3930 shown in FIG. 3.

Figure 5:
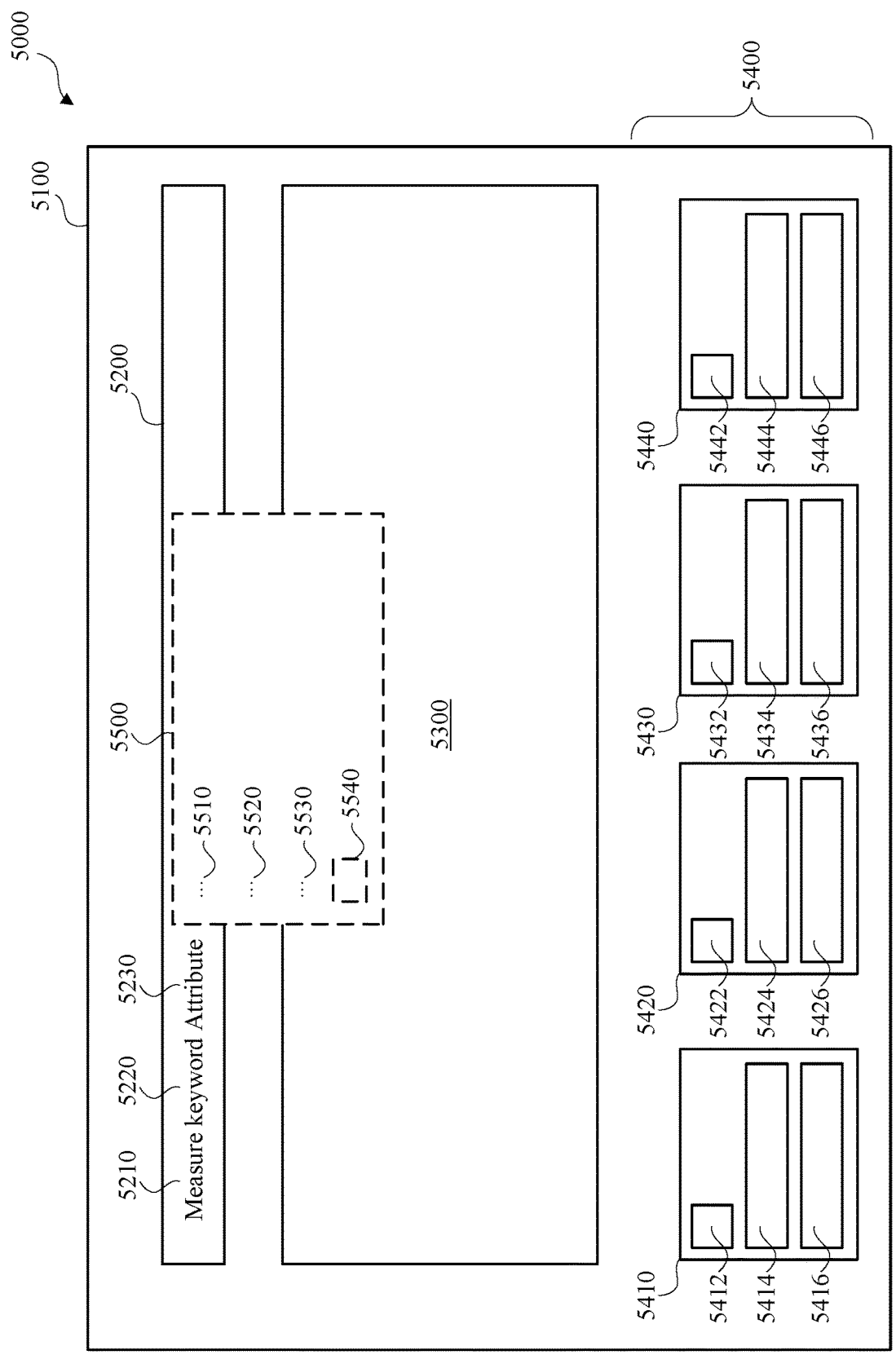
FIG. 5 is a block diagram of an example of a single predicate user interface with automatic low-latency predictive database analysis and presentation in a low-latency database analysis system.

FIG. 5 is a block diagram of an example of a single predicate user interface with automatic low-latency predictive database analysis and presentation 5000 in a low-latency database analysis system. The single predicate user interface with automatic low-latency predictive database analysis and presentation 5000 may be implemented in a low-latency database analysis system, such as the low-latency database analysis system 3000 shown in FIG. 3. As shown in FIG. 5, the single predicate user interface with automatic low-latency predictive database analysis and presentation 5000 includes a primary user interface portion 5100, which includes an express search criteria input and display portion 5200, a requested results data visualization portion 5300, an autonomous-analysis insight data visualization portion 5400, and a candidate autonomous-analysis related-requests portion 5500.

The express search criteria input and display portion 5200 includes a representation of a character string portion of an expressly specified search criteria portion of a current context (single autonomous-analysis predicate). For simplicity and clarity, the character string "Measure" is shown at 5210 to represent a measure token, the character string "keyword" is shown at 5220 to represent a keyword or operator, and the character string "Attribute" is shown at 5230 to represent an attribute token. Other expressly specified search criteria elements and configurations of elements may be used.

The requested results data visualization portion 5300 may include a visualization, such as a chart, of results data corresponding to the expressly specified search criteria 5210, 5220, 5230, such as results data obtained by the low-latency database analysis system responsive to the expressly specified search criteria 5210, 5220, 5230. The requested results data visualization portion 5300, or a portion thereof may be generated based on requested results data.

The autonomous-analysis insight data visualization portion 5400, or a portion thereof, the candidate autonomous-analysis related-requests portion 5500, or a portion thereof, or both, may be generated based on low-latency autonomous-analysis data, such as low-latency autonomous-analysis insight data, low-latency autonomous-analysis related-request data, or both. The low-latency autonomous-analysis data may be obtained subsequent to generating, outputting, or both, the primary user interface portion 5100 other than the autonomous-analysis insight data visualization portion 5400 and the candidate autonomous-analysis related-requests portion 5500.

The autonomous-analysis insight data visualization portion 5400 includes representations of respective sets of autonomous-analysis insight data. A respective set of autonomous-analysis insight data may be presented, or otherwise included in the autonomous-analysis insight data visualization portion 5400, as a respective visualization, such as a respective low-latency autonomous-analysis insight data visualization card 5410, 5420, 5430, 5440, as shown.

As shown, the autonomous-analysis insight data visualization portion 5400 includes a first low-latency autonomous-analysis insight data visualization card 5410, a second low-latency autonomous-analysis insight data visualization card 5420, a third low-latency autonomous-analysis insight data visualization card 5430, and a fourth low-latency autonomous-analysis insight data visualization card 5440. The maximum cardinality of the set of low-latency autonomous-analysis insight data visualization cards presented, or otherwise included in the autonomous-analysis insight data visualization portion 5400, may be defined by a defined latency constraint. For example, the maximum cardinality of the set of low-latency autonomous-analysis insight data visualization cards may be defined as four low-latency autonomous-analysis insight data visualization cards (as shown) or six low-latency autonomous-analysis insight data visualization cards. Other cardinalities of low-latency autonomous-analysis insight data visualization cards may be used. Each of the first low-latency autonomous-analysis insight data visualization card 5410, the second low-latency autonomous-analysis insight data visualization card 5420, the third low-latency autonomous-analysis insight data visualization card 5430, and the fourth low-latency autonomous-analysis insight data visualization card 5440 may respectively correspond to distinct autonomous-analysis insight data.

A respective set of autonomous-analysis insight data may have a corresponding autonomous-analysis insight data type, such as 'outlier', 'trend', or 'cross-correlation'. The autonomous-analysis insight data visualization cards 5410, 5420, 5430, 5440 may include a respective indication 5412, 5422, 5432, 5442, of the autonomous-analysis insight data type of the corresponding autonomous-analysis insight data.

A respective set of autonomous-analysis insight data may include a natural language representation of the corresponding autonomous-analysis insight data. The autonomous-analysis insight data visualization cards 5410, 5420, 5430, 5440 may include a respective portion 5414, 5424, 5434, 5444, including the natural language representation of the corresponding autonomous-analysis insight data, or a portion thereof.

A respective set of autonomous-analysis insight data may include an indication of a basis for the autonomous-analysis insight data, which may be a context for the autonomous-analysis insight data, which may be expressed as an ordered set of tokens. The basis for the autonomous-analysis insight data may be the expressly specified search criteria, wherein the autonomous-analysis insight data indicates an automatically identified characteristic of the requested response set, wherein the requested response set omits an express indication of the automatically identified characteristic. The basis for the autonomous-analysis insight data may be an automatically generated exploratory results data set generated based on the expressly specified search criteria and one or more other attributes, measures, or both, identified based on probabilistic utility. The autonomous-analysis insight data visualization cards 5410, 5420, 5430, 5440 may include a respective portion 5416, 5426, 5436, 5446, including the indication of the basis for corresponding autonomous-analysis insight data, or a portion thereof.

In some implementations, the autonomous-analysis insight data visualization cards may include one or more utility feedback interface elements (not shown), such as a positive utility feedback interface element and a negative utility feedback interface element. The autonomous-analysis insight data visualization cards may include user interface elements (not shown), such as user interface elements for pinning, saving, editing, downloading, or sharing the corresponding autonomous-analysis insight data or autonomous-analysis insight data visualization.

In some embodiments, data corresponding to the low-latency autonomous-analysis insight data visualization cards 5410, 5420, 5430, 5440, or a portion thereof, and identifying the low-latency autonomous-analysis insight data visualization cards 5410, 5420, 5430, 5440, or the portion thereof, as a hidden, non-visible, or non-display elements may be included in data corresponding to the single predicate user interface with automatic low-latency predictive database analysis and presentation 5000, an available-insights display control element (not shown) indicating that the low-latency autonomous-analysis insight data visualization cards 5410, 5420, 5430, 5440, or the portion thereof, are available may be included in the autonomous-analysis insight data visualization portion 5400, and the low-latency autonomous-analysis insight data visualization cards 5410, 5420, 5430, 5440, or the portion thereof, may be otherwise omitted from the autonomous-analysis insight data visualization portion 5400. The available-insights display control element (not shown) may indicate a cardinality of low-latency autonomous-analysis insight data visualization cards 5410, 5420, 5430, 5440, or the portion thereof, omitted from the autonomous-analysis insight data visualization portion 5400.

The available-insights display control element (not shown) may correspond with data indicating a display state for the low-latency autonomous-analysis insight data visualization cards 5410, 5420, 5430, 5440, or the portion thereof, omitted from the autonomous-analysis insight data visualization portion 5400. A first value of the display state (hidden state) may correspond with omitting the low-latency autonomous-analysis insight data visualization cards 5410, 5420, 5430, 5440, or the portion thereof, from the autonomous-analysis insight data visualization portion 5400. A second value of the display state (visible state) may correspond with including the low-latency autonomous-analysis insight data visualization cards 5410, 5420, 5430, 5440, or the portion thereof, in the autonomous-analysis insight data visualization portion 5400. In some embodiments, the candidate autonomous-analysis related-requests display control element 5540 may be omitted. In response to an event, such as obtaining input, such as user input selecting the available-insights display control element, the display state may be toggled, such as from hidden to visible or from visible to hidden. In response to a determination that the value of the display state of the available-insights display control element is hidden, the low-latency autonomous-analysis insight data visualization cards 5410, 5420, 5430, 5440, or the portion thereof may be omitted from the from the autonomous-analysis insight data visualization portion 5400. In response to a determination that the value of the display state of the available-insights display control element is visible, the low-latency autonomous-analysis insight data visualization cards 5410, 5420, 5430, 5440, or the portion thereof may be included in the from the autonomous-analysis insight data visualization portion 5400.

In some embodiments, a primary subset of the low-latency autonomous-analysis insight data visualization cards, such as a defined cardinality, such as four (4), or another defined cardinality, such as in descending probability of utility order, may be identified. A secondary subset of the low-latency autonomous-analysis insight data visualization cards may be identified, such as including the low-latency autonomous-analysis insight data visualization cards other than the low-latency autonomous-analysis insight data visualization cards included in the primary subset of the low-latency autonomous-analysis insight data visualization cards. The primary subset of the low-latency autonomous-analysis insight data visualization cards may be included in the autonomous-analysis insight data visualization portion 5400. The secondary subset of the low-latency autonomous-analysis insight data visualization cards may be omitted from the primary user interface portion 5100. Data corresponding to the secondary subset of the low-latency autonomous-analysis insight data visualization cards, and identifying the secondary subset of the low-latency autonomous-analysis insight data visualization cards as a hidden, non-visible, or non-display elements, may be included in data corresponding to the single predicate user interface with automatic low-latency predictive database analysis and presentation 5000. In response to an event, such as obtaining input, such as user input selecting the available-insights display control element, the display state may be toggled, such as from hidden to visible or from visible to hidden. In response to a determination that the value of the display state of the available-insights display control element is hidden, the secondary subset of the low-latency autonomous-analysis insight data visualization cards may be omitted from the from the autonomous-analysis insight data visualization portion 5400. In response to a determination that the value of the display state of the available-insights display control element is visible, the secondary subset of the low-latency autonomous-analysis insight data visualization cards may be included in the from the autonomous-analysis insight data visualization portion 5400.

In response to an event, such as obtaining input identifying a low-latency autonomous-analysis insight data visualization card 5410, 5420, 5430, 5440, such as user input selecting the low-latency autonomous-analysis insight data visualization card 5410, 5420, 5430, 5440, the corresponding low-latency autonomous-analysis insight data, such as the respective sequence of tokens, resolved-request, or data-query, may be identified as the current context and the single predicate user interface with automatic low-latency predictive database analysis and presentation 5000 may be generated, or regenerated, based on the current context.

The candidate autonomous-analysis related-requests portion 5500 may be included in the primary user interface portion 5100 subsequent to including the express search criteria input and display portion 5200 and the requested results data visualization portion 5300. In some embodiments, the candidate autonomous-analysis related-requests portion 5500 may be omitted from the primary user interface portion 5100, as indicated by the broken line border at 5500. For example, data corresponding to the candidate autonomous-analysis related-requests portion 5500, identifying the candidate autonomous-analysis related-requests portion 5500 as a hidden, non-visible, or non-display element, may be included in data corresponding to the single predicate user interface with automatic low-latency predictive database analysis and presentation 5000. In some embodiments, the candidate autonomous-analysis related-requests portion 5500 may be included, as a visible or displayed element, in the primary user interface portion 5100 in response to an event, such as in response to input, such as user input selecting, or setting focus on, the express search criteria input and display portion 5200, such as subsequent to including the requested results data visualization portion 5300.

The candidate autonomous-analysis related-requests portion 5500 may include zero or more candidate autonomous-analysis related-request portions as represented in FIG. 5 by the ellipsis at 5510, 5520, 5530, respectively corresponding to respective candidate autonomous-analysis related-requests.

A respective candidate autonomous-analysis related-request portion 5510, 5520, 5530 may include an ordered sequence of one or more tokens corresponding to a respective candidate autonomous-analysis related-request, an indication of a corresponding candidate autonomous-analysis related-request type, or both.

For example, an attribute-extension (type) autonomous-analysis related-request may include an exploratory attribute and a corresponding candidate autonomous-analysis related-request portion 5510, 5520, 5530 may include a representation of the exploratory attribute and a representation of the attribute-extension autonomous-analysis related-request type. In another example, an attribute-substitution (type) autonomous-analysis related-request may include an exploratory attribute and a corresponding candidate autonomous-analysis related-request portion 5510, 5520, 5530 may include a representation of the exploratory attribute and a representation of the attribute-substitution autonomous-analysis related-request type. In another example, a filter-extension (type) autonomous-analysis related-request may include an exploratory filter and a corresponding candidate autonomous-analysis related-request portion 5510, 5520, 5530 may include a representation of the exploratory filter and a representation of the filter-extension autonomous-analysis related-request type. In another example, a filter-substitution (type) autonomous-analysis related-request may include an exploratory filter and a corresponding candidate autonomous-analysis related-request portion 5510, 5520, 5530 may include a representation of the exploratory filter and a representation of the filter-substitution autonomous-analysis related-request type. In another example, a query-substitution (type) autonomous-analysis related-request may include a sequence of tokens and a corresponding candidate autonomous-analysis related-request portion 5510, 5520, 5530 may include a representation of the sequence of tokens and a representation of the filter-substitution autonomous-analysis related-request type.

In some implementations, a primary subset of the candidate autonomous-analysis related-requests, such as a defined cardinality, such as three (3), or another defined cardinality, of candidate autonomous-analysis related-requests, such as in descending probability of utility order, may be identified from the candidate autonomous-analysis related-requests and a secondary subset of the candidate autonomous-analysis related-requests may be identified from the candidate autonomous-analysis related-requests, such as including the candidate autonomous-analysis related-requests other than the candidate autonomous-analysis related-requests included in the primary subset of the candidate autonomous-analysis related-requests. The primary subset of the candidate autonomous-analysis related-requests may be included in the candidate autonomous-analysis related-requests portion 5500 as respective candidate autonomous-analysis related-request portions 5510, 5520, 5530. The secondary subset of the candidate autonomous-analysis related-requests may be omitted from the primary user interface portion 5100. Data corresponding to the secondary subset of the candidate autonomous-analysis related-requests and identifying the secondary subset of the candidate autonomous-analysis related-requests as a hidden, non-visible, or non-display elements may be included in data corresponding to the single predicate user interface with automatic low-latency predictive database analysis and presentation 5000. The candidate autonomous-analysis related-requests portion 5500 may include a candidate autonomous-analysis related-requests display control element 5540. The candidate autonomous-analysis related-requests display control element 5540 may correspond with data indicating a display state for the secondary subset of the candidate autonomous-analysis related-requests. A first value of the display state (hidden state) may correspond with omitting the secondary subset of the candidate autonomous-analysis related-requests from the candidate autonomous-analysis related-requests portion 5500. A second value of the display state (visible state) may correspond with including the secondary subset of the candidate autonomous-analysis related-requests in the candidate autonomous-analysis related-requests portion 5500. In response to an event, such as obtaining input, such as user input selecting the candidate autonomous-analysis related-requests display control element 5540, the display state may be toggled. In some embodiments, the candidate autonomous-analysis related-requests display control element 5540 may be omitted, as indicated by the broken line border at 5540.

For example, the display state may be the hidden state, the secondary subset of the candidate autonomous-analysis related-requests may be omitted from the candidate autonomous-analysis related-requests portion 5500, the display state may be toggled from the hidden state to the visible state, and the secondary subset of the candidate autonomous-analysis related-requests may be included in the candidate autonomous-analysis related-requests portion 5500. In another example, the display state may be the visible state, the secondary subset of the candidate autonomous-analysis related-requests may be included in the candidate autonomous-analysis related-requests portion 5500, the display state may be toggled from the visible state to the hidden state, and the secondary subset of the candidate autonomous-analysis related-requests may be omitted from the candidate autonomous-analysis related-requests portion 5500.

In response to an event, such as obtaining input identifying a respective candidate autonomous-analysis related-request portion 5510, 5520, 5530, such as user input selecting the respective candidate autonomous-analysis related-request portion 5510, 5520, 5530, the corresponding candidate autonomous-analysis related-request, or a combination of the candidate autonomous-analysis related-request and the expressly specified search criteria 5210, 5220, 5230, or a portion thereof, may be identified as the current context and the single predicate user interface with automatic low-latency predictive database analysis and presentation 5000 may be generated, or regenerated, based on the current context.

For example, a respective candidate autonomous-analysis related-request portion 5510, 5520, 5530 may represent an attribute-extension (type) autonomous-analysis related-request, which may include an exploratory attribute. In response to obtaining input identifying the respective candidate autonomous-analysis related-request portion 5510, 5520, 5530, the exploratory attribute may be combined with, such as appended to, the expressly specified search criteria 5210, 5220, 5230, such that the combination represents an autonomously identified request for data that differs from the request for data represented by the expressly specified search criteria 5210, 5220, 5230, which may be identified as the current context.

In another example, a respective candidate autonomous-analysis related-request portion 5510, 5520, 5530 may represent an attribute-substitution (type) autonomous-analysis related-request, which may include an exploratory attribute. In response to obtaining input identifying the respective candidate autonomous-analysis related-request portion 5510, 5520, 5530, the exploratory attribute may be combined with the data represented by the expressly specified search criteria 5210, 5220, 5230, such as by omitting the expressly specified attribute 5230, or the expressly specified keyword 5220 and the expressly specified attribute 5230, and concatenating the exploratory attribute, or the exploratory attribute and a respective keyword, to the measure 5210, such that the combination represents an autonomously identified request for data that differs from the request for data represented by the expressly specified search criteria 5210, 5220, 5230, which may be identified as the current context.

In another example, a respective candidate autonomous-analysis related-request portion 5510, 5520, 5530 may represent a filter-extension (type) autonomous-analysis related-request, which may include an exploratory filter. In response to obtaining input identifying the respective candidate autonomous-analysis related-request portion 5510, 5520, 5530, the exploratory filter may be combined with, such as appended to, the expressly specified search criteria 5210, 5220, 5230, such that the combination represents an autonomously identified request for data that differs from the request for data represented by the expressly specified search criteria 5210, 5220, 5230, which may be identified as the current context.

In another example, the expressly specified search criteria may include an expressly specified filter (not shown), a respective candidate autonomous-analysis related-request portion 5510, 5520, 5530 may represent a filter-substitution (type) autonomous-analysis related-request, which may include an exploratory filter. In response to obtaining input identifying the respective candidate autonomous-analysis related-request portion 5510, 5520, 5530, the exploratory filter may be combined with, such as by omitting the expressly specified filter from the expressly specified search criteria and appending the exploratory filter to the other expressly specified search criteria 5210, 5220, 5230, such that the combination represents an autonomously identified request for data that differs from the request for data represented by the expressly specified measure 5210, the expressly specified keyword 5220, the expressly specified attribute 5230, and the expressly specified filter (not shown). The combination including the exploratory filter may be identified as the current context.

In another example, a respective candidate autonomous-analysis related-request portion 5510, 5520, 5530 may represent a query-substitution (type) autonomous-analysis related-request. In response to obtaining input identifying the respective candidate autonomous-analysis related-request portion 5510, 5520, 5530, the corresponding query-substitution (type) autonomous-analysis related-request may be identified as the current context, representing an autonomously identified request for data that differs from the request for data represented by the expressly specified search criteria 5210, 5220, 5230.

Figure 6:
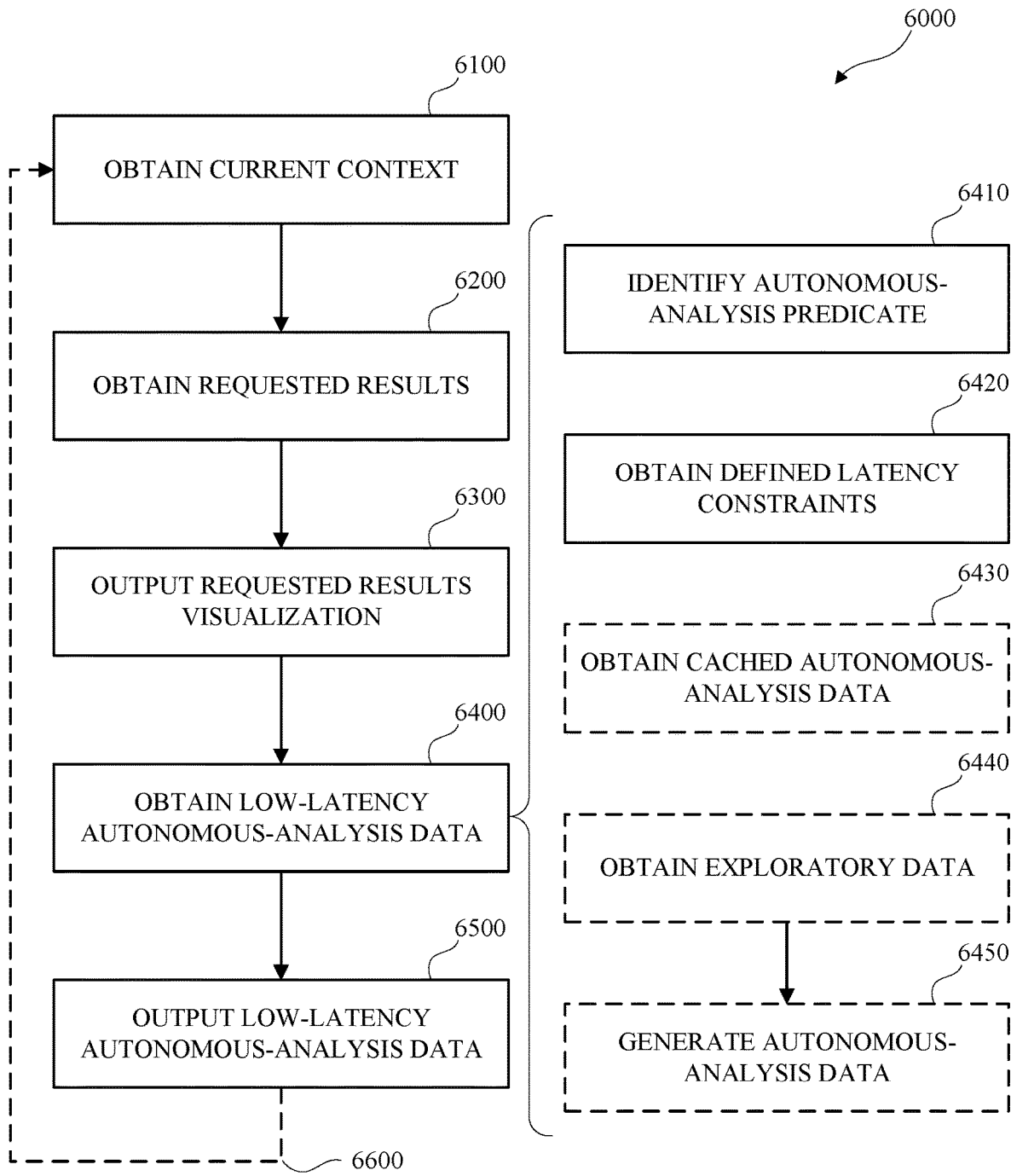
FIG. 6 is a flow diagram of an example of automatic single-predicate low-latency predictive database analysis in a low-latency database analysis system.

FIG. 6 is a flow diagram of an example of automatic single-predicate low-latency predictive database analysis 6000 in a low-latency database analysis system. Automatic single-predicate low-latency predictive database analysis 6000 may be implemented in a low-latency database analysis system, such as the in a low-latency database analysis system 3000 shown in FIG. 3. For example, one or more aspects of automatic single-predicate low-latency predictive database analysis 6000 may be implemented in a system access interface unit of the low-latency database analysis system, such as the system access interface unit 3900 shown in FIG. 3 and one or more aspects of automatic single-predicate low-latency predictive database analysis 6000 may be implemented in a relational search unit of the low-latency database analysis system, such as the relational search unit 3700 shown in FIG. 3.

Automatic single-predicate low-latency predictive database analysis 6000 may include generating, outputting, presenting, or a combination thereof, a user interface, or a portion thereof, such as the single-predicate user interface with automatic low-latency predictive database analysis and presentation 5000 shown in FIG. 5.

Automatic single-predicate low-latency predictive database analysis 6000 may include obtaining and outputting low-latency autonomous-analysis insight data (low-latency autonomous-analysis insight analysis). Low-latency autonomous-analysis insight analysis may include obtaining and outputting one or more low-latency autonomous-analysis insight datasets (insights), such as the low-latency autonomous-analysis insight datasets represented by the autonomous-analysis insight data visualization cards 5410, 5420, 5430, 5440 shown in FIG. 5. Automatic single-predicate low-latency predictive database analysis 6000 may include obtaining and outputting low-latency autonomous-analysis related-request data (low-latency autonomous-analysis related-request analysis). Low-latency autonomous-analysis related-request analysis may include obtaining and outputting one or more low-latency autonomous-analysis related-requests, such as shown at 5500 in FIG. 5.

Automatic single-predicate low-latency predictive database analysis 6000 includes obtaining a current context at 6100, obtaining requested results data at 6200, outputting a visualization of the requested results data at 6300, obtaining low-latency autonomous-analysis data at 6400, and outputting the low-latency autonomous-analysis data, or a portion thereof, at 6500. Obtaining the low-latency autonomous-analysis data at 6400 and outputting the low-latency autonomous-analysis data, or a portion thereof, at 6500 may include low-latency autonomous-analysis insight analysis, low-latency autonomous-analysis related-request analysis, or both.

The current context may be obtained at 6100. For example, a relational search unit of the low-latency database analysis system, such as the relational search unit 3700 shown in FIG. 3, may obtain data representing a usage intent, such as from a system access interface unit of the low-latency database analysis system, such as the system access interface unit 3900 shown in FIG. 3, such as in response to user input. The data expressing the usage intent may include the current context, and the relational search unit may obtain the current context from the data expressing the usage intent. In some embodiments, data expressing the usage intent may include an indication of a previously stored object, such as a table object or an analytical-object, which may correspond with previously generated autonomous-analysis insight data, and obtaining the current context may include obtaining data corresponding to the respective object, such as from a data storage unit of the low-latency database analysis system based on an identifier of the previously stored object, and generating the current context based on the data corresponding to the respective object. The data expressing the usage intent, and the current context obtained at 6100, omits data corresponding to user input expressly requesting autonomous-analysis. The current context may include data representing a request for data from the low-latency database analysis system, such as a resolved-request or a data-query. The current context may include data identifying one or more data source objects, such as a table or columns. The current context may include requestor data, such as data indicating a current user, group, organization, or a combination thereof. In some implementations, the current context obtained at 6100 may include utility data, or a portion thereof.

In some implementations, obtaining the current context at 6100 may include receiving expressly specified search criteria. For example, the current context may include the expressly specified search criteria. For example, the expressly specified search criteria may include a string, which may be a string of characters or symbols. The relational search unit may generate a resolved-request representing a request for data corresponding to the expressly specified search criteria indicated in the data expressing the usage intent. In some implementations, the current context may include previously identified context data, such as previously identified context data identifying one or more tokens, search operators (keywords), or both, in the expressly specified search criterion, which may include a column identifier for each respective token.

In some implementations, obtaining the current context at 6100 may include obtaining previously generated expressly specified search criteria and identifying a current context corresponding to the previously generated expressly specified search criteria, or a portion thereof. For example, the previously generated expressly specified search criteria may correspond with an answer object. In some embodiments, the previously generated expressly specified search criteria may be identified in response to input, such as user input, indicating the previously generated expressly specified search criteria, such as from a list of distinct sets of previously generated expressly specified search criteria, such as a list of answer objects. In some implementations, a previously generated autonomous-analysis dataset may be stored as previously generated expressly specified search criteria and may be identified as the current context at 6100.

The requested results data is obtained at 6200 based on the current context identified at 6100. The relational search unit may send, or otherwise make available, the current context, or a portion thereof, such as the resolved-request, to other components of the low-latency database analysis system, such as a semantic interface of the low-latency database analysis system, such as the semantic interface 3600 shown in FIG. 3. The semantic interface may generate, or otherwise obtain, a data-query corresponding to the resolved request, and may send, or otherwise make available, the data-query to a distributed in-memory database of the low-latency database analysis system, such as the distributed in-memory database 3300 shown in FIG. 3, or a combination thereof. The distributed in-memory database may generate the requested results data based on the data-query, which may include executing, or otherwise processing, one or more queries corresponding to the data-query to obtain the requested results data, or a portion thereof, from low-latency data stored in the distributed in-memory database. The distributed in-memory database may output, such as send, or otherwise make available, the requested results data to one or more other components of the low-latency database analysis system, such as to the semantic interface, the relational search unit, or both.

In some implementations, the current context may include a previously generated resolved-request and generating the resolved-request may be otherwise omitted. In some implementations, obtaining the requested results may include obtaining previously generated, or cached, requested results corresponding to the current context, and generating the requested results by executing the data-query may be otherwise omitted. Obtaining the cached requested results may include obtaining a temporal indicator indicating a temporal location at which the cached requested results were generated or cached.

The semantic interface unit may process, format, or transform the requested results data to obtain visualization data. For example, the semantic interface unit may identify a visualization for representing or presenting the requested results data, or a portion thereof, such as based on the requested results data or a portion thereof. The semantic interface unit, or a component thereof, such as a data visualization unit, the system access interface unit, or a combination thereof, may generate a user interface, or one or more portions thereof for presenting the visualization of the requested results data. Obtaining the requested results data at 6200 may include including the resolved-request, or a portion thereof, in the current context.

The visualization of the requested results data is output at 6300. For example, the visualization of the requested results data, or a portion thereof, may be output to the system access interface unit for presentation to a user via a user interface, such as in the requested results data visualization portion 5300 shown in FIG. 5. Outputting the visualization of the requested results data at 6300 may include including visualization data in the current context.

Low-latency autonomous-analysis data is automatically obtained at 6400. Automatically obtaining the low-latency autonomous-analysis data at 6400 may include identifying an autonomous-analysis predicate at 6410, identifying one or more defined latency constraints at 6420, obtaining cached autonomous-analysis data at 6430, obtaining exploratory data at 6440, generating autonomous-analysis data at 6450, or a combination thereof.

Automatically obtaining the low-latency autonomous-analysis data at 6400 includes identifying an autonomous-analysis predicate at 6410. For example, the data expressing the usage intent, or a portion thereof, such as the current context, or a portion thereof, identified at 6100 may be identified as the autonomous-analysis predicate at 6410. In some embodiments, identifying an autonomous-analysis predicate may include automatically identifying two or more comparative tuples.

Automatically obtaining the low-latency autonomous-analysis data at 6400 includes identifying one or more defined latency constraints at 6420 for low-latency predictive database analysis, such as autonomous-analysis latency constraints, autonomous-analysis related-request constraints, or both. Identifying the latency constraints may include reading, or otherwise accessing, the latency constraints from the in-memory database, or from another accessible data source. For example, the latency constraints may be specified or configured using a command line administration interface.

The autonomous-analysis latency constraints may indicate, for example, a maximum cardinality of low-latency autonomous-analysis datasets. The maximum cardinality of low-latency autonomous-analysis datasets may be defined on an autonomous-analysis type basis. For example, the defined latency constraints may include a defined maximum cardinality of outlier autonomous-analysis datasets, such as four, a defined maximum cardinality of cross-correlation autonomous-analysis datasets, such as one, and a defined maximum cardinality of trend autonomous-analysis datasets, such as one.

The defined latency constraints may include a defined autonomous-analysis depth constraint. For example, the defined autonomous-analysis depth constraint may have a value, such as zero (0), indicating a disabled status for low-latency predictive database analysis and automatically obtaining the low-latency autonomous-analysis data at 6400 and outputting the low-latency autonomous-analysis data at 6500 may be omitted in response to identifying a defined autonomous-analysis depth constraint having a value indicating the disabled status. In another example, the defined autonomous-analysis depth constraint may have a value, such as one (1), indicating the use of the autonomous-analysis predicate, and omitting the use of exploratory data portions other than those included in the autonomous-analysis predicate, and low-latency predictive database insight analysis may be performed based on the autonomous-analysis predicate, which may omit identifying exploratory data portions. In another example, the defined autonomous-analysis depth constraint may have a value, such as two (2) or more, indicating the use of the autonomous-analysis predicate and exploratory data portions and low-latency predictive database insight analysis may be performed based on the autonomous-analysis predicate and the exploratory data portions. The magnitude of the value of the depth constraint may correspond with the cardinality of the exploratory data portions that may be included. For example, a depth constraint having a value of two (2) may correspond with identifying one exploratory attribute and one exploratory measure. In another example, the cardinality (|A|), or number, of exploratory attributes (A) may be determined based on the defined autonomous-analysis depth constraint, which may be expressed as the following:

$$|A| = 2^{Depth-2}; \max 10.$$

In an example, automatic single-predicate low-latency predictive database analysis 6000 for a table object may identify a defined maximum exploratory measures constraint value of two (2) and a defined maximum exploratory attributes constraint value of two (2). The extended-latency predictive database analysis 4000 shown in FIG. 4 may evaluate, for example, any number of measures and attributes, such as ten (10) attributes and three (3) measures, for a table object.

Identifying the defined latency constraints may include identifying one or more defined autonomous-analysis related-request constraints. For example, the defined autonomous-analysis related-request constraint may have a value, such as zero (0), indicating a disabled status for low-latency autonomous-analysis related-request and low-latency autonomous-analysis related-request may be omitted. In another example, the defined autonomous-analysis related-request constraint may have a value, such as one (1), indicating low-latency autonomous-analysis related-request may be performed. A defined autonomous-analysis related-request constraint may indicate a defined maximum cardinality of exploratory data portions for autonomous-analysis related-request. For example, the autonomous-analysis predicate may include a measure, and the defined autonomous-analysis related-request constraint may indicate a defined maximum cardinality of ten (10) exploratory attributes for autonomous-analysis related-request. In another example, the autonomous-analysis predicate may omit a measure, and the defined autonomous-analysis related-request constraint may indicate a defined maximum cardinality of three (3) exploratory measures and a defined maximum cardinality of three (3) exploratory attributes for autonomous-analysis related-request.

Identifying the defined latency constraints may include identifying a defined exploratory results constraint, which may indicate a defined cardinality, or number, of rows, records, or values, that may be included in the exploratory results data. For example, automatic single-predicate low-latency predictive database analysis 6000 may identify a defined exploratory results constraint value of one hundred thousand. The extended-latency predictive database analysis 4000 shown in FIG. 4 may evaluate, for example, one million rows.

Although not shown separately in FIG. 6, automatically obtaining the low-latency autonomous-analysis data at 6400 may include generating and sending one or more requests for low-latency autonomous-analysis, such as a request for low-latency autonomous-analysis insight analysis, a request for low-latency autonomous-analysis related-request analysis, both, or a combination thereof, automatically, such as in the absence of user input data indicating an express request for the autonomous-analysis. For example, the low-latency autonomous-analysis may be automatically requested in response to obtaining the requested results data at 6200 or in response to outputting the visualization of the requested results data at 6300. For example, a component of the low-latency database analysis system, such as the system access interface unit or the relational search unit, may send the request for low-latency autonomous-analysis to another component of the low-latency database analysis system, such as the autonomous-analysis unit. In some embodiments, the request for low-latency autonomous-analysis may include the autonomous-analysis predicate, or a portion thereof.

Identifying the defined latency constraints may include identifying one or more defined maximum latency constraints, such as a defined maximum latency constraint indicating a defined maximum latency between requesting the low-latency autonomous-analysis at 6400 and outputting the low-latency autonomous-analysis data at 6500. In another example, the defined latency constraints may indicate a maximum cardinality of low-latency insight visualizations for output, such as for presentation.

Automatically obtaining the low-latency autonomous-analysis data at 6400 may include obtaining previously generated, such as cached, autonomous-analysis insight data at 6430. In some implementations, obtaining previously generated, such as cached, autonomous-analysis insight data at 6430 may be omitted, as indicated by the broken line border at 6430, and automatically obtaining the low-latency autonomous-analysis data at 6400 may include obtaining exploratory data at 6440 and generating autonomous-analysis data at 6450. Obtaining previously generated autonomous-analysis insight data at 6430 may include obtaining cached low-latency autonomous-analysis insight data, cached extended-latency autonomous-analysis insight data, or a combination thereof.

In some implementations, the defined latency constraints obtained at 6420 may indicate a defined maximum cardinality of cached autonomous-analysis insight datasets to include in the low-latency autonomous-analysis data. The defined latency constraints obtained at 6420 may indicate a defined maximum cardinality of low-latency autonomous-analysis insight datasets to generate and include in the low-latency autonomous-analysis data.

In some embodiments, the autonomous-analysis latency constraints may indicate whether to generate low-latency autonomous-analysis data. For example, the autonomous-analysis latency constraints may indicate a defined maximum cardinality, such as one, of low-latency autonomous-analysis insights which may be included in the low-latency autonomous-analysis data, such as in response to a determination that cached autonomous-analysis data is unavailable, or that, for available cached autonomous-analysis data, a difference between a current temporal point and the temporal point at which the cached autonomous-analysis data was generated or cached exceeds a defined threshold (e.g., indicating that the cached autonomous-analysis data is stale).

Automatically obtaining the low-latency autonomous-analysis data at 6400 may include obtaining exploratory data at 6440. Obtaining the exploratory data at 6440 may be similar to obtaining exploratory data as described at 4200 in FIG. 4, except as described herein or otherwise clear from context. Obtaining the exploratory data at 6400 includes obtaining the exploratory data in accordance with one or more of the defined latency constraints obtained at 6420. For example, the defined autonomous-analysis depth constraint may have the value, such as one (1), indicating the use of exploratory data corresponding to the data-query indicated by the autonomous-analysis predicate and omitting the use of exploratory data portions. For example, the exploratory results may be generated based on the measures, attributes, or both, indicated in the expressly specified search criterion. In another example, the defined autonomous-analysis depth constraint may have the value, such as two (2), indicating the use of the autonomous-analysis predicate and one or more exploratory data portions and low-latency predictive database insight analysis may be performed based on exploratory data corresponding to the data-query indicated by the autonomous-analysis predicate and one or more exploratory data portions. The exploratory data portions may include attributes or measures other than the measures and attributes indicated in the autonomous-analysis predicate (e.g., in the expressly specified search criterion).

Automatically obtaining the low-latency autonomous-analysis data at 6400 may include generating autonomous-analyses data at 6450. Generating the autonomous-analyses data at 6450 may include generating low-latency autonomous-analysis insight data, generating low-latency autonomous-analysis related-request data, or both.

Generating the low-latency autonomous-analysis insight data may be similar to obtaining autonomous-analysis insight data as shown at 4300 in FIG. 4, except as described herein or otherwise clear from context. For example, generating the low-latency autonomous-analysis insight data at 6450 includes generating the low-latency autonomous-analysis insight data in accordance with one or more of the defined latency constraints obtained at 6420.

In some implementations, obtaining exploratory data at 6440 and generating autonomous-analysis data at 6450 may be omitted, as indicated by the broken line border at 6440 and at 6450, and automatically obtaining the low-latency autonomous-analysis data at 6400 may include obtaining previously generated, such as cached, autonomous-analysis insight data at 6430. For example, a component of the low-latency database analysis system, such as the system access interface unit or the relational search unit, may send the request for low-latency autonomous-analysis that includes an indication of a request to omit generating low-latency autonomous-analysis data, generating low-latency autonomous-analysis data may be omitted, and previously generated low-latency autonomous-analysis data, such as the cached low-latency autonomous-analysis data obtained at 6430, may be used.

Generating low-latency autonomous-analysis related-request data may include identifying one or more measures for low-latency autonomous-analysis related-request analysis, identifying one or more attributes for low-latency autonomous-analysis related-request analysis, identifying one or more filters, formulas, or both, for low-latency autonomous-analysis related-request analysis, identifying one or more similar queries for low-latency autonomous-analysis related-request analysis, or a combination thereof. For example, the autonomous-analysis unit may send, transmit, or otherwise make available, the autonomous-analysis predicate, or a portion thereof, such as the current context, which may include one or more tokens, such as tokens of a current resolved-request or data-query, to a data utility unit of the low-latency database analysis system, such as the data utility unit 3720 shown in FIG. 3, the data utility unit may identify the measures, attributes, filters, or a combination thereof, for low-latency autonomous-analysis related-request analysis based on probabilistic utility data. Identifying the exploratory data portions for generating low-latency autonomous-analysis related-request data may be similar to obtaining exploratory data as shown at 4200 in FIG. 4, except as described herein or otherwise clear from context.

The measures for low-latency autonomous-analysis related-request analysis may include one or more requested measures, such as measures from the autonomous-analysis predicate, such as from the resolved-request included in the current context. The measures for low-latency autonomous-analysis related-request analysis may include one or more exploratory measures. The exploratory measures may be identified based on the requested attributes from the autonomous-analysis predicate, such as from the resolved-request included in the current context. In some implementations, identifying exploratory measures may be omitted. For example, the current context may include one or more requested measures and identifying exploratory measures may be omitted. The measures for low-latency autonomous-analysis related-request analysis may be sorted, ranked, or scored based on probabilistic utility, such as in descending rank order of probabilistic utility by the data utility unit. The data utility unit may send, transmit, or otherwise make available, data indicating the measures for low-latency autonomous-analysis related-request analysis, which may include corresponding probabilistic utility data, to the autonomous-analysis unit. The defined latency constraints may indicate a defined maximum cardinality of exploratory measures for low-latency autonomous-analysis related-request analysis, such as two (2).

The attributes for low-latency autonomous-analysis related-request analysis may include one or more requested attributes, such as attributes from the autonomous-analysis predicate, such as from the resolved-request included in the current context. The attributes for low-latency autonomous-analysis related-request analysis may include one or more exploratory attributes. The exploratory attributes may be identified based on the measures for low-latency autonomous-analysis related-request analysis, such as on a per-measure basis. The attributes for low-latency autonomous-analysis related-request analysis may be sorted, ranked, or scored based on probabilistic utility, such as in descending rank order of probabilistic utility by the data utility unit. The data utility unit may send, transmit, or otherwise make available, data indicating the attributes for low-latency autonomous-analysis related-request analysis, which may include corresponding probabilistic utility data, to the autonomous-analysis unit. The defined latency constraints may indicate a defined maximum cardinality of exploratory attributes for low-latency autonomous-analysis related-request analysis, such as two (2).

The filters, or formulas, for low-latency autonomous-analysis related-request analysis may include one or more requested filters, such as filters from the autonomous-analysis predicate, such as from the resolved-request included in the current context. A filter may be an identified attribute and a corresponding value identified for filtering, limiting, or otherwise constraining, requested results data. For example, the resolved-request "precipitation by year climate tropical" includes the measure "precipitation", the attribute "year", and the filter "climate tropical" including the filter-attribute "climate" and the filter-value "tropical." The filters for low-latency autonomous-analysis related-request analysis may include one or more exploratory filters. The exploratory filters may be identified based respective combinations of a measure for low-latency autonomous-analysis related-request analysis and one or more attributes for low-latency autonomous-analysis related-request analysis. For example, the current context may include the resolved-request "precipitation by year climate tropical", and the exploratory filter "geographical zone torrid" may be identified. The filters for low-latency autonomous-analysis related-request analysis may be sorted, ranked, or scored based on probabilistic utility, such as in descending rank order of probabilistic utility by the data utility unit. The data utility unit may send, transmit, or otherwise make available, data indicating the filters for low-latency autonomous-analysis related-request analysis, which may include corresponding probabilistic utility data, to the autonomous-analysis unit. For example, the filters, formulas, or both, may be identified by the data utility unit based on usage data corresponding to previous requests for data. The defined latency constraints may indicate a defined maximum cardinality of exploratory filters for low-latency autonomous-analysis related-request analysis, such as two (2).

The similar queries for low-latency autonomous-analysis related-request analysis may be identified based on probabilistic utility, probabilistic similarity, or a combination thereof. For example, the data utility unit may identify the similar queries using Jaccard or Set similarity. Identifying the similar queries may include using a weighting metric, such as based on object types associated with the respective similar query. For example, a similar query corresponding to a previously generated and stored answer object may have a greater weight than a similar query associated with another object type. A similar query identified based on the tokens included in the current context omits the tokens included in the current context. The similar queries for low-latency autonomous-analysis related-request analysis may be sorted, ranked, or scored based on probabilistic utility, such as in descending rank order of probabilistic utility by the data utility unit. The data utility unit may send, transmit, or otherwise make available, data indicating the similar queries for low-latency autonomous-analysis related-request analysis, which may include corresponding probabilistic utility data, to the autonomous-analysis unit.

Generating low-latency autonomous-analysis related-request data may include identifying one or more autonomous-analysis related-requests. Identifying the autonomous-analysis related-requests may include identifying the autonomous-analysis related-requests on a per-measure basis. In some embodiments, the measures may be the measures from the current context. In some embodiments, the measures may include the exploratory measures. Identifying the autonomous-analysis related-requests may include identifying autonomous-analysis related-requests having one or more autonomous-analysis related-request type, such as attribute-extension autonomous-analysis related-requests, attribute-substitution autonomous-analysis related-requests, filter-extension autonomous-analysis related-requests, filter-substitution autonomous-analysis related-requests, query-substitution autonomous-analysis related-requests, or a combination thereof.

For a respective measure, an autonomous-analysis related-request including the sequence of tokens from the current context and an exploratory attribute, identified in descending rank order of probabilistic utility, may be identified (attribute-extension). For the respective measure, an autonomous-analysis related-request including the measure and an exploratory attribute, identified in descending rank order of probabilistic utility, may be identified (attribute-substitution). For the respective measure, an autonomous-analysis related-request including the sequence of tokens from the current context and an exploratory filter, identified in descending rank order of probabilistic utility, may be identified (filter-extension). For the respective measure, an autonomous-analysis related-request including the sequence of tokens from the current context, omitting a filter from the current context, and including an exploratory filter, identified in descending rank order of probabilistic utility, may be identified (filter-substitution). A similar query, identified in descending rank order of probabilistic utility, may be identified as an autonomous-analysis related-request (query-substitution). The candidate autonomous-analysis related-request data for a respective candidate autonomous-analysis related-request may include data indicating the corresponding candidate autonomous-analysis related-request type.

The autonomous-analysis related-requests may be identified as an ordered, or ranked, set of candidate autonomous-analysis related-requests, such as up to a defined maximum cardinality of candidate autonomous-analysis related-requests, such as twenty-four (24), in a sequence, per-measure, such as the sequence: attribute-extension, attribute-substitution, filter-extension, filter-substitution, query-substitution, which may omit including an autonomous-analysis related-request corresponding to a candidate autonomous-analysis related-request in the set of candidate autonomous-analysis related-requests. Other sequences may be used.

For example, the measures may include two measures, an attribute-extension autonomous-analysis related-request corresponding to the first measure and the highest ranked exploratory attribute may be included in the set of candidate autonomous-analysis related-requests, an attribute-substitution autonomous-analysis related-request corresponding to the first measure and the highest ranked exploratory attribute may be included in the set of candidate autonomous-analysis related-requests, a filter-substitution autonomous-analysis related-request corresponding to the first measure and the highest ranked exploratory filter may be included in the set of candidate autonomous-analysis related-requests, a query-substitution autonomous-analysis related-request corresponding to the highest ranked similar query may be included in the set of candidate autonomous-analysis related-requests, an attribute-extension autonomous-analysis related-request corresponding to the second measure and the highest ranked exploratory attribute may be included in the set of candidate autonomous-analysis related-requests, an attribute-substitution autonomous-analysis related-request corresponding to the second measure and the highest ranked exploratory attribute may be included in the set of candidate autonomous-analysis related-requests, a filter-substitution autonomous-analysis related-request corresponding to the second measure and the highest ranked exploratory filter may be included in the set of candidate autonomous-analysis related-requests, a query-substitution autonomous-analysis related-request corresponding to the second-highest ranked similar query may be included in the set of candidate autonomous-analysis related-requests, an attribute-extension autonomous-analysis related-request corresponding to the first measure and the second-highest ranked exploratory attribute may be included in the set of candidate autonomous-analysis related-requests, an attribute-substitution autonomous-analysis related-request corresponding to the first measure and the second-highest ranked exploratory attribute may be included in the set of candidate autonomous-analysis related-requests, a filter-substitution autonomous-analysis related-request corresponding to the first measure and the second-highest ranked exploratory filter may be included in the set of candidate autonomous-analysis related-requests, a query-substitution autonomous-analysis related-request corresponding to the third-highest ranked similar query may be included in the set of candidate autonomous-analysis related-requests, an attribute-extension autonomous-analysis related-request corresponding to the second measure and the second-highest ranked exploratory attribute may be included in the set of candidate autonomous-analysis related-requests, an attribute-substitution autonomous-analysis related-request corresponding to the second measure and the second-highest ranked exploratory attribute may be included in the set of candidate autonomous-analysis related-requests, a filter-substitution autonomous-analysis related-request corresponding to the second measure and the second-highest ranked exploratory filter may be included in the set of candidate autonomous-analysis related-requests, and a query-substitution autonomous-analysis related-request corresponding to the fourth-highest ranked similar query may be included in the set of candidate autonomous-analysis related-requests.

The low-latency autonomous-analysis data may be output at 6500. Outputting the low-latency autonomous-analysis data at 6500 may be similar to outputting autonomous-analysis insight data as shown at 4400 in FIG. 4, except as described herein or otherwise clear from context.

Outputting the low-latency autonomous-analysis data at 6500 may include outputting the low-latency autonomous-analysis insight data. For example, outputting the autonomous-analysis insight data may include obtaining a visualization, a natural-language narrative, or a combination thereof, for a respective autonomous-analysis insight dataset obtained at 6400. A respective visualization of the low-latency autonomous-analysis insight data, or a portion thereof, may be output to the system access interface unit for presentation to a user via a user interface, such as in the autonomous-analysis insight data visualization portion 5400 shown in FIG. 5.

Outputting the low-latency autonomous-analysis insight data may include generating, for a respective low-latency autonomous-analysis insight dataset, a corresponding visualization, a corresponding natural-language narrative, or a combination thereof. Generating the visualization for the respective autonomous-analysis insight dataset may include identifying a visualization template, identifying one or more visualization parameter values in accordance with the visualization template, and generating the visualization based on the identified visualization parameter values in accordance with the visualization template. The natural-language narrative may be generated based on the autonomous-analysis insight dataset in accordance with a defined natural-language narrative template, which may be associated with the corresponding autonomous-analysis type. The visualizations, the natural-language narratives, or both, for the autonomous-analysis insight data may be output, such as sent, transmitted, or otherwise made available, to the system access interface unit for presentation to a user, such a via a user interface.

In some embodiments, automatically obtaining the low-latency autonomous-analysis data at 6400 may include initiating a temporal counter based on the to the maximum latency, such as in response to obtaining the requested results data at 6200 or in response to outputting the visualization of the requested results data at 6300, such that outputting the low-latency autonomous-analysis data at 6500 may omit outputting low-latency autonomous-analysis data obtained, generated, or otherwise accessed, subsequent to the expiration of the temporal counter.

In some embodiments, outputting the low-latency autonomous-analysis data at 6500 may include outputting the low-latency autonomous-analysis data in accordance with the defined latency constraints obtained at 6420.

For example, the defined latency constraints may indicate a defined cardinality of low-latency autonomous-analysis insight datasets, or corresponding visualizations, natural-language narratives, or both, for output or presentation. Respective low-latency autonomous-analysis insight datasets may be included in the defined cardinality of low-latency autonomous-analysis insight datasets for output or presentation based on ranking, prioritization, or a combination thereof. For example, cached extended-latency autonomous-analysis insight datasets may be ranked, the cached low-latency autonomous-analysis insight datasets may be ranked, and the cached extended-latency autonomous-analysis insight datasets may have a greater priority than the cached autonomous-analysis insight datasets. In some embodiments, presenting a cached autonomous-analysis insight dataset may include presenting an indication of the temporal point at which the cached autonomous-analysis insight dataset was generated or cached.

In some embodiments, identifying the autonomous-analysis insight datasets to include in the defined cardinality of low-latency autonomous-analysis insight datasets for output or presentation may include determining a pseudo-random weighting factor for each respective autonomous-analysis insight dataset, and identifying the autonomous-analysis insight datasets to include in the defined cardinality of low-latency autonomous-analysis insight datasets for output or presentation based on a combination of the respective pseudo-random weighting factor for each respective autonomous-analysis insight dataset and the probabilistic utility based ranking corresponding to the respective autonomous-analysis insight dataset.

In some embodiments, outputting the low-latency autonomous-analysis insight data may include outputting a visual element indicating that the outputting the low-latency autonomous-analysis insight data is available, and omitting the presentation of, or hiding, the corresponding low-latency insight visualization. The visual element indicating that the outputting the low-latency autonomous-analysis insight data is available, may indicate a cardinality of a set of low-latency insight visualizations that are available for presentation and are currently hidden, or otherwise omitted from presentation. In response to input, such as user input, indicating or selecting the visual element indicating the availability of the outputting the low-latency autonomous-analysis insight data, a corresponding low-latency insight visualization, or a portion thereof, may be output, such as presented, shown, or otherwise visibly included in the user interface.

Outputting the low-latency autonomous-analysis data at 6500 may include outputting the low-latency autonomous-analysis related-request data. For example, the low-latency autonomous-analysis related-request data, or a portion thereof, may be output to the system access interface unit for presentation to a user via a user interface, such as in the candidate autonomous-analysis related-request portion 5500 shown in FIG. 5. In an example, the low-latency autonomous-analysis related-request data may include an ordered, or ranked, set of candidate autonomous-analysis related-requests, such as up to a defined maximum cardinality of candidate autonomous-analysis related-requests, such as twenty-four (24), and one or more of the candidate autonomous-analysis related-requests may be output as respective candidate autonomous-analysis related-request portions, such as one of the candidate autonomous-analysis related-request portions 5510, 5520, 5530 shown in FIG. 5.

In response to obtaining, such as receiving, or otherwise accessing, input, such as data representing user input, indicating or selecting a low-latency autonomous-analysis insight dataset, or a visualization thereof, such as data indicating the selection of a low-latency autonomous-analysis insight data visualization card 5410, 5420, 5430, 5440 as shown in FIG. 5, the analytical-object, resolved-request, or data-query corresponding to the respective low-latency autonomous-analysis insight dataset may be identified as the current context. In response to identifying the current context, automatic single-predicate low-latency predictive database analysis 6000 may be automatically performed, as indicated by the broken line arrow at 6600.

In response to obtaining, such as receiving, or otherwise accessing, input, such as data representing user input, indicating or selecting a low-latency autonomous-analysis related-request, such as data indicating the selection of a low-latency autonomous-analysis related-request portion 5510, 5520, 5530 as shown in FIG. 5, a concatenation of the resolved-request or data-query of the autonomous-analysis predicate, such as the expressly specified search criteria 5210, 5220, 5230 shown in FIG. 5, and the low-latency autonomous-analysis related-request may be identified as the current context. In response to identifying the current context, automatic single-predicate low-latency predictive database analysis 6000 may be automatically performed, as indicated by the broken line arrow at 6600.

Although not shown separately in FIG. 6, automatic single-predicate low-latency predictive database analysis 6000 may include verifying access to low-latency predictive database analysis and obtaining low-latency autonomous-analysis data at 6400 and outputting the low-latency autonomous-analysis data, or a portion thereof, at 6500 may be omitted in response to a determination that access to low-latency predictive database analysis is prohibited, unverified, or otherwise unavailable.

Figure 7:
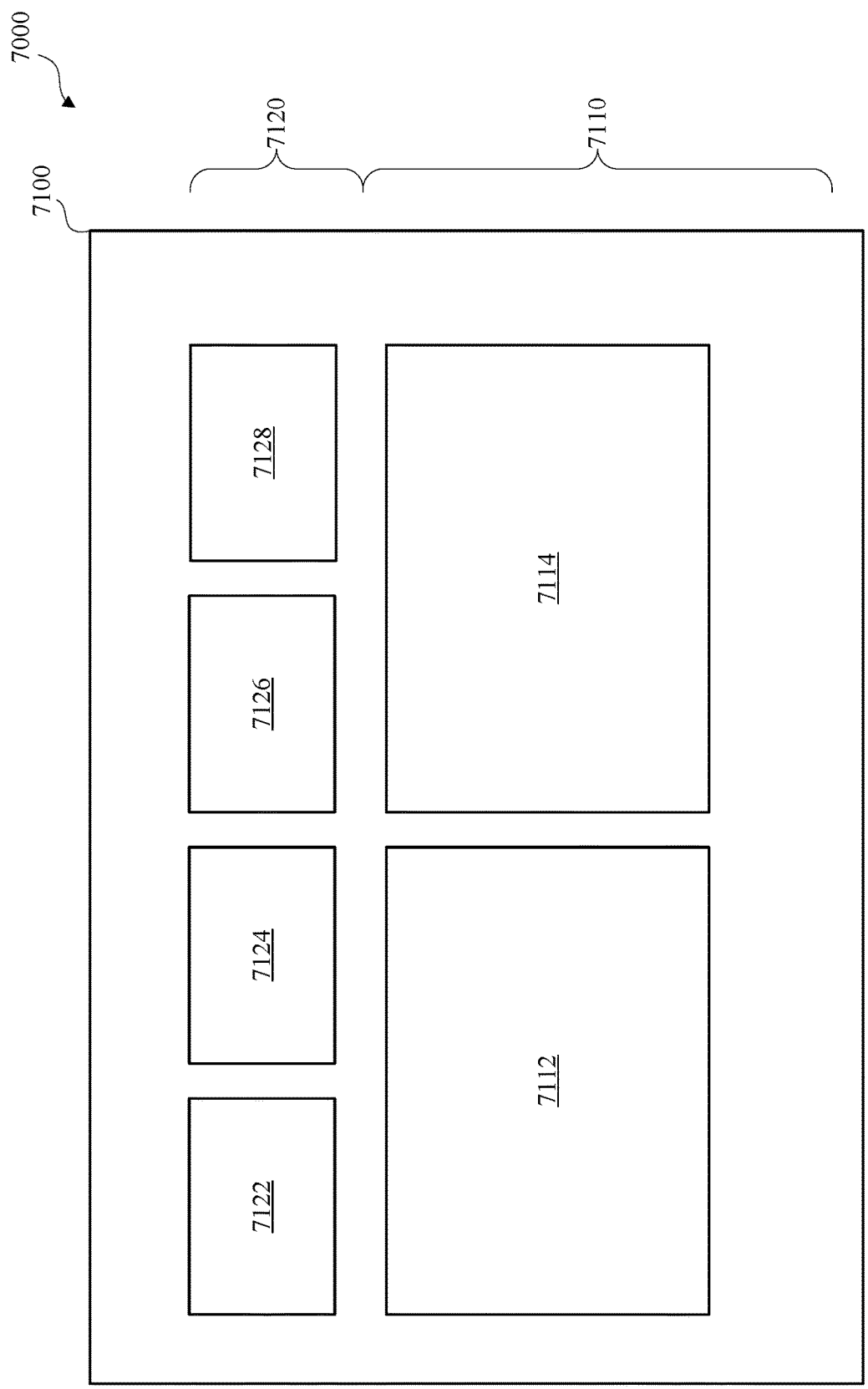
FIG. 7 is a block diagram of an example of a multi-predicate user interface for predictive database analysis in a low-latency database analysis system.

FIG. 7 is a block diagram of an example of a multi-predicate user interface for predictive database analysis 7000 in a low-latency database analysis system. The multi-predicate user interface for predictive database analysis 7000 may be implemented in a low-latency database analysis system, such as the low-latency database analysis system 3000 shown in FIG. 3. The multi-predicate user interface for predictive database analysis 7000 may be similar to the single predicate user interface with automatic low-latency predictive database analysis and presentation 5000, except as described herein or otherwise clear from context.

As shown in FIG. 7, the multi-predicate user interface for predictive database analysis 7000 includes a primary user interface portion 7100, which includes a requested data portion 7110 and an autonomous-analysis visualizations portion 7120. Although the requested data portion 7110 is shown below the autonomous-analysis visualizations portion 7120, other orientations may be used. For example, the requested data portion 7110 may be included in the primary user interface portion 7100 above the autonomous-analysis visualizations portion 7120. The primary user interface portion 7100 may include other elements not shown in FIG. 7.

The requested data portion 7110 may represent a requested object-nexus. A requested object-nexus may represent a set, group, or collection of objects represented in the low-latency database analysis system, such as a set of analytical-objects, that are associated in the low-latency database analysis system. The set, group, or collection of objects represented by the object-nexus may be expressly associated objects, such as the set of answer-objects associated with a pinboard object. The set, group, or collection of objects represented by the object-nexus may be operatively associated objects, such as a set of objects identified in response to an expressly-specified request for objects. The set, group, or collection of objects represented by the object-nexus may be automatically associated objects, such a set of objects automatically identified based on user data, group data, organization data, utility data, temporal data, or a combination thereof. Although described as a requested data portion 7110 representing a requested object-nexus, the requested data portion 7110 and the requested object-nexus may be automatically generated based on user data, group data, organization data, utility data, temporal data, or a combination thereof, such as in response to obtaining data expressing a usage intent that omits an expressly-specified request for data.

The set, group, or collection of objects represented by a requested object-nexus may be determined based on defined object-nexus criteria, a set of available objects, or a combination thereof. The set of available objects may be based on user data, group data, organization data, or a combination thereof, such as permission data and utilization data. For example, the set of available objects may include distinct objects previously generated in association with an identified user identifier (such as corresponding to a current user), distinct objects previously generated in association with multiple users (a population), including the current user, that are members of a group within an organization, distinct objects previously generated in association with multiple users, including the current user, that are members of multiple groups within an organization or other defined domain, or a combination thereof.

For example, the requested object-nexus may be an expressly-specified object-nexus, such as a pinboard object, and the defined object-nexus criteria may distinctly identify the pinboard or the set, group, or collection of objects included in the pinboard. In another example, the requested object-nexus may be an operatively-specified object-nexus identified in response to expressly-specified object-nexus criteria, such as data expressing a usage intent indicating a request for objects.

The requested data portion 7110 may include one or more distinct analytical-object visualization portions 7112, 7114. For example, the multi-predicate user interface for predictive database analysis 7000 may represent a pinboard analytical-object that includes two answer-objects, the distinct analytical-object visualization portion 7112 on the left may represent a first answer-object associated with the pinboard analytical-object, and the distinct analytical-object visualization portion 7114 on the right may represent a second answer-object associated with the pinboard analytical-object. In another example, the multi-predicate user interface for predictive database analysis 7000 may represent object-results data responsive to a request for objects, such as a request for objects including expressly-specified object-nexus criteria or a request for available objects, such as a request for available answers or a request for available pinboards. The object-results data may include two analytical-objects, the distinct analytical-object visualization portion 7112 on the left may represent a first analytical-object responsive to the request for objects, and the distinct analytical-object visualization portion 7114 on the right may represent a second analytical-object responsive to the request for objects.

Although two distinct analytical-object visualization portions 7112, 7114 are shown, any number of distinct analytical-object visualization portions may be included in the requested data portion 7110, which may be scrollable. Other orientations for the distinct analytical-object visualization portions 7112, 7114 may be used.

In some embodiments, the object-nexus may be an automatically-generated object-nexus, and the defined object-nexus criteria may be automatically identified, such as in response to data expressing a usage intent that omits expressly-specified object-nexus criteria. The automatically identified object-nexus criteria may include user data, group data, organization data, utility data, temporal data, or a combination thereof. Other automatically identified data may be used.

The autonomous-analysis visualizations portion 7120 may be generated based on an object-nexus. For example, the requested data portion 7110 may represent a requested object-nexus and the autonomous-analysis visualizations portion 7120 may be generated based on the requested object-nexus. In another example, the autonomous-analysis visualizations portion 7120 may be generated based on an automatically-generated object-nexus.

The autonomous-analysis visualizations portion 7120 includes a first low-latency autonomous-analysis insight data visualization card 7122, a second low-latency autonomous-analysis insight data visualization card 7124, a third low-latency autonomous-analysis insight data visualization card 7126, and a fourth low-latency autonomous-analysis insight data visualization card 7128. The maximum cardinality of the set of low-latency autonomous-analysis insight data visualization cards presented, or otherwise included in the autonomous-analysis visualizations portion 7120, may be defined by defined autonomous-analysis latency constraints for the multi-predicate user interface for predictive database analysis 7000. Generating the multi-predicate user interface for predictive database analysis 7000 may include identifying the defined autonomous-analysis latency constraints.

The first low-latency autonomous-analysis insight data visualization card 7122, the second low-latency autonomous-analysis insight data visualization card 7124, the third low-latency autonomous-analysis insight data visualization card 7126, and the fourth low-latency autonomous-analysis insight data visualization card 7128 may respectively correspond to distinct autonomous-analysis insight data.

For example, the requested data portion 7110 may represent a requested object-nexus and may include the distinct analytical-object visualization portion 7112 on the left representing a first analytical-object and the distinct analytical-object visualization portion 7114 on the right representing a second analytical-object, and a respective low-latency autonomous-analysis insight data visualization card 7122, 7124, 7126, 7128 may be obtained based on the requested object-nexus, the first analytical-object, or the second analytical-object.

Figure 8:
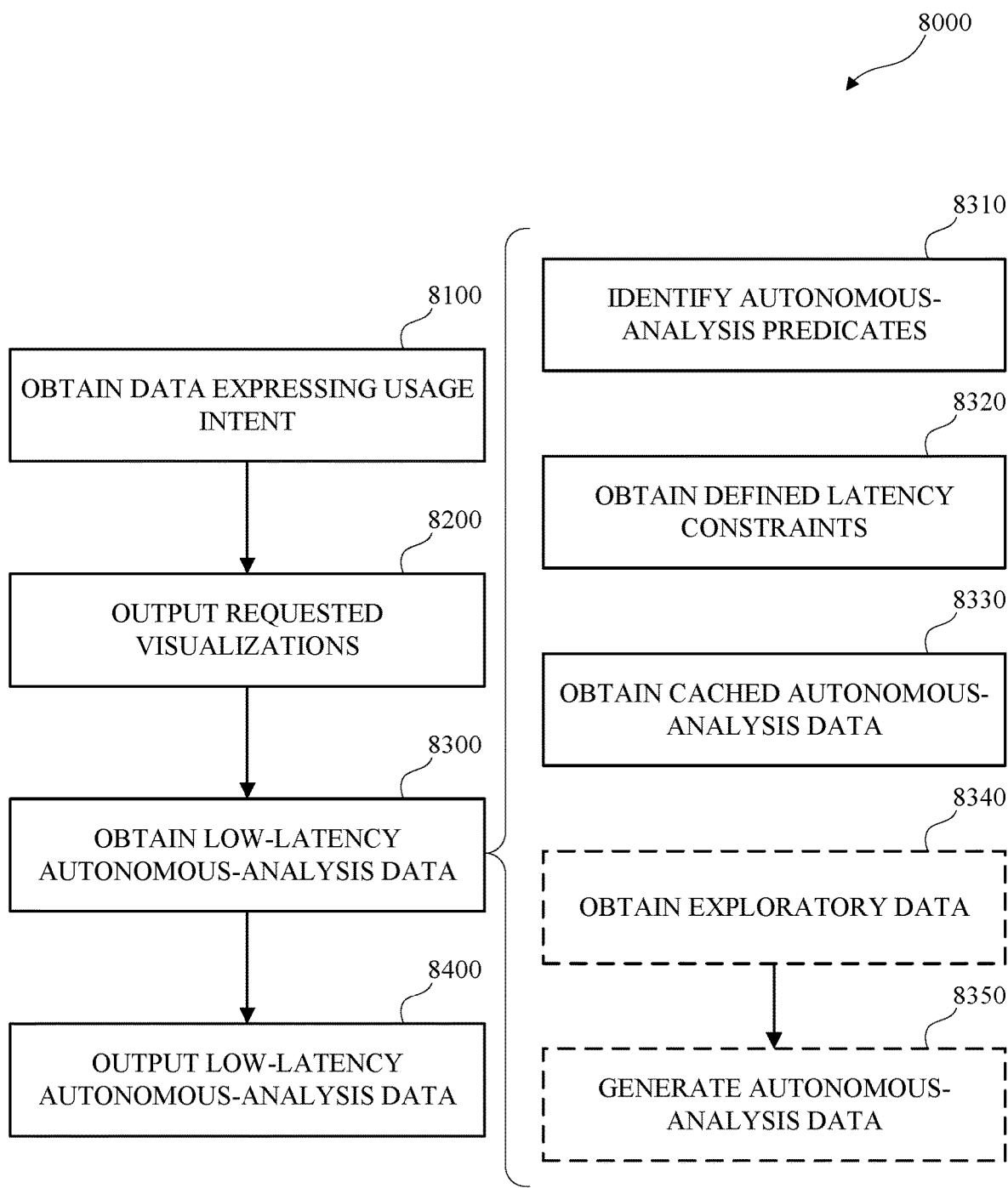
FIG. 8 is a flow diagram of an example of multi-predicate low-latency predictive database analysis in a low-latency database analysis system.

FIG. 8 is a flow diagram of an example of multi-predicate low-latency predictive database analysis 8000 in a low-latency database analysis system. Multi-predicate low-latency predictive database analysis 8000 may be implemented in a low-latency database analysis system, such as the in a low-latency database analysis system 3000 shown in FIG. 3. For example, one or more aspects of multi-predicate low-latency predictive database analysis 8000 may be implemented in an autonomous-analysis unit of the low-latency database analysis system, such as the autonomous-analysis unit 3730 shown in FIG. 3. Multi-predicate low-latency predictive database analysis 8000, as shown in FIG. 8, may be similar to the automatic single predicate low-latency predictive database analysis 6000 shown in FIG. 6, except as described herein or otherwise clear from context.

Multi-predicate low-latency predictive database analysis 8000 may include generating, outputting, presenting, or a combination thereof, a user interface, or a portion thereof, such as the multi-predicate user interface for low-latency predictive database analysis 7000 shown in FIG. 7.

Multi-predicate low-latency predictive database analysis 8000 may include obtaining and outputting autonomous-analysis insight data, such as the autonomous-analysis insight data represented by the low-latency autonomous-analysis insight data visualization cards 7122, 7124, 7126, 7128 shown in FIG. 7.

Multi-predicate low-latency predictive database analysis 8000 includes obtaining data expressing a usage intent at 8100, outputting requested visualizations at 8200, obtaining low-latency autonomous-analysis data at 8300, and outputting the low-latency autonomous-analysis data, or a portion thereof, at 8400.

The data expressing the usage intent may be obtained at 8100. For example, a relational search unit of the low-latency database analysis system, such as the relational search unit 3700 shown in FIG. 3, may obtain the data expressing the usage intent, such as from a system access interface unit of the low-latency database analysis system, such as the system access interface unit 3900 shown in FIG. 3, such as in response to user input.

The data expressing the usage intent may indicate a requested object-nexus. For example, the data expressing the usage intent may include a requested object identifier, such as in indication of a requested pinboard, and the requested object may be identified as the requested object-nexus. In another example, the data expressing the usage intent may include expressly-specified object-nexus criteria, such as a request for objects, and requested results data responsive to the include expressly-specified object-nexus criteria may be identified as the requested object-nexus. In another example, the data expressing the usage intent may omit an expressly-specified request for data and a set of objects automatically identified based on user data, group data, organization data, utility data, temporal data, or a combination thereof, may be identified as the requested object-nexus. Obtaining the data expressing the usage intent at 8100 may include obtaining a current context. The data expressing the usage intent obtained at 8100 omits data corresponding to user input expressly requesting autonomous-analysis. The data expressing the usage intent may include requestor data, such as data indicating a current user, group, organization, or a combination thereof. In some implementations, the data expressing the usage intent obtained at 8100 may include utility data, or a portion thereof.

One or more requested visualizations may be output at 8200. Outputting the requested visualization at 8200 may include obtaining the requested visualizations. The requested visualizations may be obtained based on the data expressing the usage intent obtained at 8100. Obtaining the requested visualizations may be similar to obtaining requested results as shown at 6200 in FIG. 6, except as described herein or otherwise clear from context.

The data expressing the usage intent obtained at 8100 may include a requested object identifier, such as a pinboard object identifier. Obtaining the requested visualizations may include identifying answer objects associated with the pinboard object indicated by the pinboard object identifier and obtaining results data, corresponding visualization data, or both, for the respective answer objects, or a portion thereof.

The data expressing the usage intent obtained at 8100 may include expressly-specified object-nexus criteria, such as a request for objects. Obtaining the requested visualizations may include identifying objects responsive to the expressly-specified object-nexus criteria and obtaining results data, corresponding visualization data, or both, for the respective objects, or a portion thereof.

The data expressing the usage intent obtained at 8100 may omit an expressly-specified request for data. Obtaining the data expressing the usage intent obtained at 8100 may include automatically identifying automatically identified object-nexus criteria, which may include user data, group data, organization data, utility data, temporal data, or a combination thereof. Obtaining the requested visualizations may include identifying objects based on the automatically identified object-nexus criteria and obtaining results data, corresponding visualization data, or both, for the respective objects, or a portion thereof. For example, the requested visualizations may be obtained based on current user utilization recency, population utilization recency, current user utilization frequency, population utilization frequency, or a combination thereof, which may be subject to constraints based on probabilistic utility. For example, trending requested visualizations may be obtained based on a combination of utilization recency and utilization frequency.

The results data, corresponding visualization data, or both, for the respective objects, or a portion thereof, may be output to the system access interface unit for presentation to a user via a user interface, such as in the requested data portion 7110 shown in FIG. 7.

Low-latency autonomous-analysis data is automatically obtained at 8300. Automatically obtaining the low-latency autonomous-analysis data at 8300 may be similar to automatically obtaining the low-latency autonomous-analysis data as shown at 6400 in FIG. 6, except as described herein or otherwise clear from context. Automatically obtaining the low-latency autonomous-analysis data at 8300 may include identifying one or more autonomous-analysis predicates at 8310, identifying one or more defined latency constraints at 8320, obtaining cached autonomous-analysis data at 8330, obtaining exploratory data at 8340, generating autonomous-analysis data at 8350, or a combination thereof.

Automatically obtaining the low-latency autonomous-analysis data at 8300 identifying one or more autonomous-analysis predicates at 8310. Identifying the autonomous-analysis predicates at 8310 may be similar to identifying an autonomous-analysis predicate at 6410, except as described herein or otherwise clear from context. The autonomous-analysis predicates may be identified based on the requested object-nexus identified at 8100 or the requested visualizations output at 8200. For example, a requested visualizations output at 8200 may be identified as an autonomous-analysis predicate at 8310. In some embodiments, identifying an autonomous-analysis predicate may include automatically identifying two or more comparative tuples.

Automatically obtaining the low-latency autonomous-analysis data at 8300 includes identifying one or more defined latency constraints at 8320 for low-latency predictive database analysis, such as autonomous-analysis latency constraints. Identifying the defined latency constraints at 8320 may be similar to identifying one or more defined latency constraints at 6420 as shown in FIG. 6, except as described herein or otherwise clear from context. The defined latency constraints may be identified based on the requested object-nexus identified at 8100. Identifying the defined latency constraints at 8320 may omit identifying autonomous-analysis request extension constraints.

Although not shown separately in FIG. 8, automatically obtaining the low-latency autonomous-analysis data at 8300 may include generating and sending one or more requests for low-latency autonomous-analysis automatically, such as in the absence of user input data indicating an express request for the autonomous-analysis. For example, the low-latency autonomous-analysis may be automatically requested in response to outputting the requested visualization at 8200. In some implementations, the requests for low-latency autonomous-analysis may be generated and sent on a per-autonomous-analysis predicate basis.

Automatically obtaining the low-latency autonomous-analysis data at 8300 may include obtaining previously generated, such as cached, autonomous-analysis insight data at 8330. Obtaining the previously generated autonomous-analysis insight data at 8330 may be similar to obtaining the previously generated autonomous-analysis insight data as shown at 6430 in FIG. 6, except as described herein or otherwise clear from context. Obtaining previously generated autonomous-analysis insight data at 8330 may include obtaining cached low-latency autonomous-analysis insight data, cached extended-latency autonomous-analysis insight data, or a combination thereof. In some implementations, obtaining previously generated autonomous-analysis insight data at 8330 may include obtaining previously generated autonomous-analysis insight data on a per-autonomous-analysis predicate basis.

Automatically obtaining the low-latency autonomous-analysis data at 8300 may include obtaining exploratory data at 8340. Obtaining the exploratory data at 8340 may be similar to obtaining exploratory data as described at 4200 in FIG. 4 or obtaining exploratory data as shown at 6440 in FIG. 6, except as described herein or otherwise clear from context. In some implementations, obtaining the exploratory data at 8340 may include obtaining the exploratory data on a per-autonomous-analysis predicate basis.

Automatically obtaining the low-latency autonomous-analysis data at 8300 may include generating autonomous-analyses data at 8350. Generating the autonomous-analyses data at 8350 may be similar to generating autonomous-analyses data as shown at 6450 in FIG. 6, except as described herein or otherwise clear from context. For example, generating the autonomous-analyses data at 8350 may omit generating low-latency autonomous-analysis request extension data. In some implementations, generating the autonomous-analyses data at 8350 may include generating the autonomous-analyses data on a per-autonomous-analysis predicate basis.

In some implementations, obtaining exploratory data at 8340 and generating autonomous-analysis data at 8350 may be omitted, as indicated by the broken line border at 8340 and at 8350, and automatically obtaining the low-latency autonomous-analysis data at 8300 may include obtaining previously generated, such as cached, autonomous-analysis insight data at 8330.

The low-latency autonomous-analysis data may be output at 8400. Outputting the low-latency autonomous-analysis data at 8400 may be similar to outputting autonomous-analysis insight data as shown at 4400 in FIG. 4 or outputting the low-latency autonomous-analysis data as shown at 6500 in FIG. 6, except as described herein or otherwise clear from context. For example, outputting the low-latency autonomous-analysis data at 8400 may omit outputting low-latency autonomous-analysis request extension data. In some implementations, outputting the low-latency autonomous-analysis data at 8400 may include outputting the low-latency autonomous-analysis data on a per-autonomous-analysis predicate basis.

In response to obtaining, such as receiving, or otherwise accessing, input, such as data representing user input, indicating or selecting a low-latency autonomous-analysis insight dataset, or a visualization thereof, such as data indicating the selection of a low-latency autonomous-analysis insight data visualization card 7122, 7124, 7126, 7128 as shown in FIG. 7, the analytical-object corresponding to the respective low-latency autonomous-analysis insight dataset may be identified as the current context. In response to identifying the current context, automatic single-predicate low-latency predictive database analysis, such as the automatic single-predicate low-latency predictive database analysis 6000 shown in FIG. 6, may be automatically performed.

Although not shown separately in FIG. 8, multi-predicate low-latency predictive database analysis 8000 may include verifying access to low-latency predictive database analysis, and obtaining low-latency autonomous-analysis data at 8300 and outputting the low-latency autonomous-analysis data at 8400 may be omitted in response to a determination that access to low-latency predictive database analysis is prohibited, unverified, or otherwise unavailable.

Figure 9:
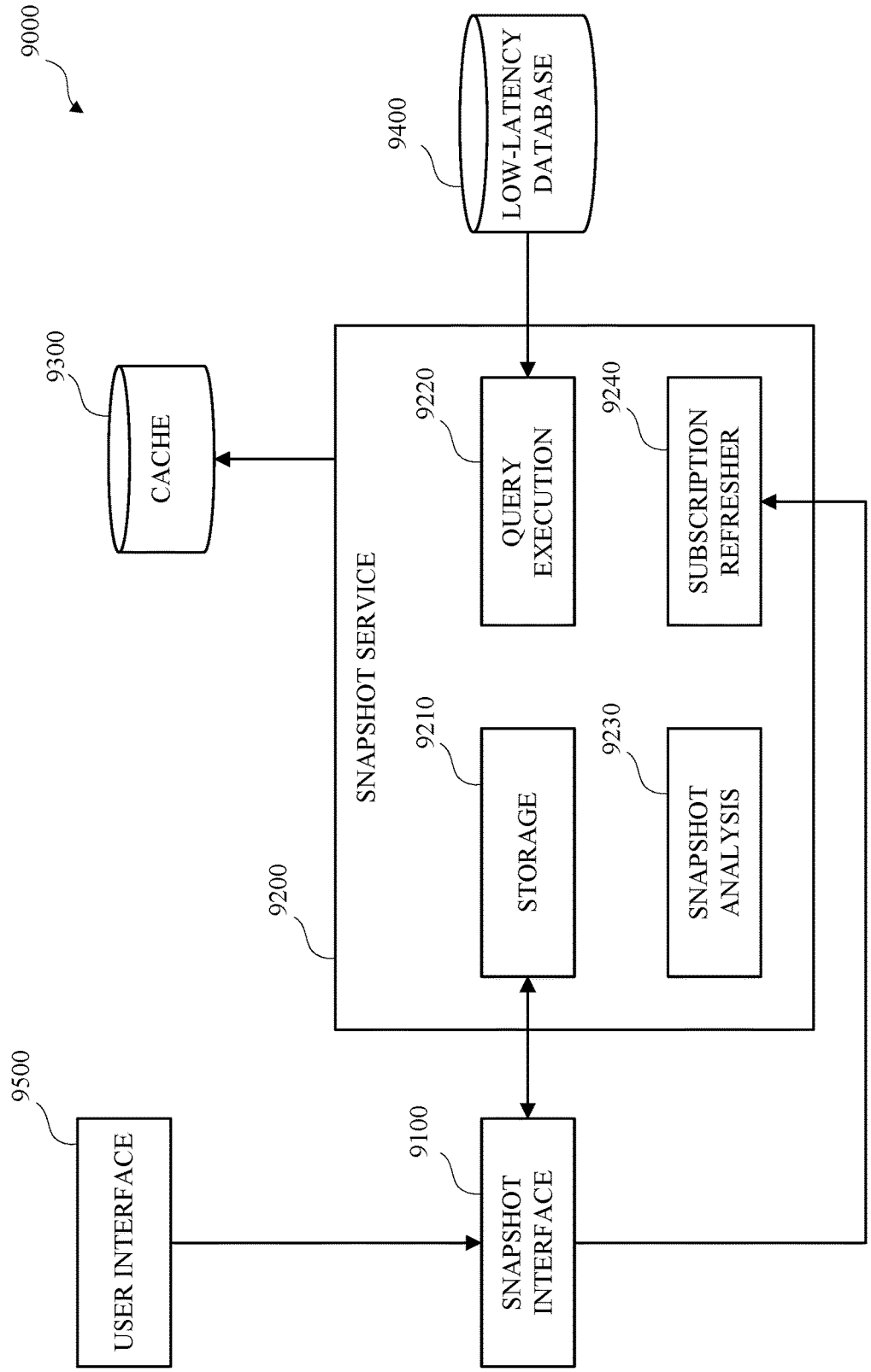
FIG. 9 is a block diagram of a snapshot unit in a low-latency database analysis system.

FIG. 9 is a block diagram of a snapshot unit 9000 in a low-latency database analysis system. The snapshot unit 9000 be implemented in a low-latency database analysis system, such as the in a low-latency database analysis system 3000 shown in FIG. 3. The snapshot unit 9000 includes a snapshot interface 9100, a snapshot service 9200, a cache 9300, a low-latency database 9400, and a user interface 9500.

In some embodiments, low-latency predictive database analysis, or a portion thereof, may be performed periodically (periodic low-latency predictive database analysis), which may be independent of obtaining data expressing a usage intent, or other user input data. Visualizations for distinct previously generated analytical-objects may be cached. The visualizations may be based on data stored in the low-latency database. The data stored in the low-latency database may change over time, such that a cached visualization may become inaccurate or stale. Periodic low-latency predictive database analysis may include monitoring, tracking, and analyzing changes in the data stored in the low-latency database corresponding to cached visualizations. The data stored in the low-latency database corresponding to a cached visualization, or a corresponding analytical-object, concurrent with the generation of the visualization, or corresponding analytical-object, may be referred to herein as a snapshot. Snapshots may be stored in the low-latency database.

Snapshots older than a defined period, such as three months, may be removed. Predictive database analysis may be performed for one or more snapshots, which may include identifying outliers, trends, cross correlations, or a combination thereof, for the respective snapshot. Differences between a snapshot and a temporally adjacent corresponding snapshot may be identified (differential snapshot data). Differences between autonomous-analysis insight data generated using predictive database analysis for two defined temporal spans, such as successive days, may be identified (differential autonomous-analysis insights).

Storing snapshots may be performed by a snapshot storage service. The storage service may monitor visualizations, store their snapshots, and analysis results. A query execution service may generate the snapshots and store the generated snapshots using the snapshot storage service. A snapshot predictive database analysis service may perform predictive database analysis for the stored snapshots to generate new, updated, or both, autonomous-analysis insight data.

The snapshot interface 9100 may be implemented in a semantic interface unit of the low-latency database analysis system, such as the semantic interface unit 3600 shown in FIG. 3. The snapshot interface 9100 may implement an electronic computing interface, such as an application programming interface (API), such as a remote procedure call application programming interface (RPC API), such as an interface for indicating subscription information, requesting snapshots, requesting autonomous-analysis insights, or a combination thereof.

The snapshot service 9200 may include a storage service 9210, a query execution unit 9220, a snapshot analysis unit 9230, a subscription refresher 9240, or a combination thereof. The snapshot interface 9100 and the storage service 9210 may communicate, such as store, retrieve, or both, subscription information, snapshots, differential autonomous-analysis insights, or a combination thereof. The snapshot interface 9100 may send database management data, such as relational search query data, database query data, or email data, to the subscription refresher 9240. The query execution unit 9220 may receive database query results from the low-latency database 9400. The snapshot service 9200 may send subscription information, snapshots, autonomous-analysis insight analysis results, or a combination thereof to the cache 9300.

The cache 9300 may cache the subscription information, snapshots, autonomous-analysis insight analysis results, or a combination thereof. The low-latency database 9400 may be similar to the distributed in-memory database 3300 shown in FIG. 3, except as described herein or otherwise clear from context. The cache 9300, the low-latency database 9400, or both may be stored in internal memory of the low-latency database analysis system. In some embodiments, the cache 9300 may be implemented in internal memory other than the low-latency memory, such as in the persistent storage unit 3930 shown in FIG. 3.

The user interface 9500 may be similar to the system access interface unit 3900 shown in FIG. 3. For example, input, such as user input, may be received via the user interface 9500 indicating subscription information, requesting snapshots, requesting autonomous-analysis insights, or a combination thereof. In another example, subscription information, snapshots, autonomous-analysis insights, or a combination thereof may be output via the user interface 9500. The requested, and output, data may include previously stored snapshots, corresponding autonomous-analysis insight analysis results, differential snapshot data, differential autonomous-analysis insight data, or a combination thereof.

The snapshot service 9200 may be a periodic or scheduled service. The snapshot service 9200 may iterate through previously generated and stored visualization-contexts, or corresponding visualizations, identified for monitoring, such as on a per-user basis. The most recent snapshot of for a visualization, respective of row-level security permissions for the corresponding user, may be stored by the storage service 9210 in the cache 9300.

The storage service 9210 may use the cache 9300 to improve access (read/write) speed, such as for relatively small amounts of data and to improve memory utilization efficiency, such as at large scale. The cache 9300 provide a rich interface with support for multiple programing languages and query syntax. The cache 9300, or the data therein, or a portion thereof, may be backed up to, or restored from, an external data storage unit. In addition, or in the alternative, the cache 9300 may be implemented as a structured query language database, as a distributed file system, or may be included in the low-latency database 9400.

The snapshot data may be represented using a format associated with the low-latency database 9400, such as protocol buffer format for compact representation and efficient serialization/deserialization. Average data size to represent, for example, 1000 data points may be approximately 100 KB and may be transmitted over wire and memory. A snapshot record may include response data from the with the low-latency database 9400 and the identifiers, such as primary key columns, which may include the snapshot temporal information and a unique query signature from the low-latency database 9400.

The storage service 9210, such as at initiation or start-up, may generate, or may request the generation of, one or more tables in the cache 9300, which may be omitted for tables previously generated in the cache 9300. The following table shows an example format for the cache table schema.

| Snapshots Table Schema | | |
|---|---|---|
| Column | Description | Cache Type |
| Query_signature | The low-latency database query signature | Text |
| Snapshot_time | The snapshot temporal information | Timestamp |
| data | the low-latency database response data | blob |

The snapshot table may store periodic, such as daily, snapshots of a visualization, such as for a defined temporal span, such as 90 days. The cache 9300 may implement auto-compression and auto-expiration to reduce memory and disk utilization. The schema, query, and visualization details may be stored once per unique query signature. A distinct subscriptions table may store information representing the status per subscription, recipient user, and snapshot time. The subscriptions table may be accessed to determine whether a snapshot was previously stored for a current date. The following table shows an example format for the cache subscriptions schema.

| Snapshots Subscriptions Table Schema | | |
|---|---|---|
| Column | Description | Cache Type |
| visualization_id | The visualization ID | Uuid |
| user_id | The user ID | Uuid |
| subscription_id | The low-latency database query signature | Text |
| pinboard_id | The pinboard ID if its for Pinboard | text |
| Snapshot_time | The snapshot temporal information | Timestamp |
| Query_signature | The low-latency database query signature | Text |
| user_email | The user email address | Text |
| Query | The relational search unit query or ACContext | Blob |
| query_set | A query set protocol buffer for querying the low-latency database | Blob |
| auto_analyze | Whether to auto-analyze and generate autonomous-analysis insight differential data | Boolean |
| a3_request | An automatic analysis request protocol buffer | blob |

The following table shows an example format for the cache analysis results table schema.

| Snapshots Analysis Results Table Schema | | |
|---|---|---|
| Column | Description | Cache Type |
| Query_signature | The low-latency database query signature | Text |
| Snapshot_time | The snapshot temporal information | Timestamp |
| Analysis_results | the analysis results protocol buffer | blob |

The snapshots may be generated periodically. The underlying metadata of the monitored elements (objects) or the subscribing user may be updated (e.g. column names, query, user email). The subscription refresher 9240 may periodically update the subscription data for the most recent snapshot date for each of the subscriptions. A request, such as an RPC request to an automatic analysis service (A3) of the search and visualization constructor (GetSubscriptionData) may be made to fetch the updated subscription data. In a distributed system, wherein the snapshot service may be implemented as multiple distributed instances, one of the instances may be designated to perform the subscription update, such as the first instance in a list of the instances. In addition, or in the alternative, a temporal service scheduler may schedule a periodic job to perform the subscription update via a designated instance.

Multiple visualizations may correspond to an underlying query. The query signatures of the visualization may be used to avoid duplicate query execution. The query signature, which may be data version sensitive, may be stored, which may eliminate redundant query execution, such as in the absence of recent data updates (since the last snapshot). The query execution may be associated with configurable concurrency parameter and may be marked with lower admission control priority (Batch) which may reduce resource utilization at the low-latency database 9400.

The analysis may include long-term differential analysis, such as using historic snapshots, which may detect outliers and trends in the measure value for each attribute value. The analysis may include daily differential analysis, which may identify differences between measures by attribute values relative to a previous day, which may include the magnitude (absolute) and relative magnitude (percent change) of the differences. The analysis may include daily autonomous-analysis insight differential analysis, which may include determining daily autonomous-analysis insights, and corresponding differential data, which may have defined minimum variance thresholds, such that, for example, the generation of differential data based on a one tenth multiple variance may be omitted.

In some embodiments, the snapshot interface 9100 may be implemented as a Thrift API using a protocol buffer object as a payload. The storage service 9210 may expose APIs for operations, such as copy, read, update, and delete (CRUD) operations. An example of the operations is shown in the following:

```
AddSubscription: <visualization_id> <user_id> <pinboard_id>
    Optional details: <snapshot time> <query_signature>
    <RelationalQuery> <Low-LatencyQuerySet>
GetSnapshots <visualization_id> <user_id> <start_date> <end_date>
    Returns: Collection of <Low-LatencyResponse>
GetAutonomous-analysis insights <visualization_id> <user_id>
<snapshot_date>
    Returns: Collection of <AnalysisResult>
CheckSubscription <user_id> <visualization IDs>
    Returns: Collection of subscribed visualization IDs
DeleteSubscription <visualization_id> <user_id>
```

Protocol buffer messages may be used to store subscription and snapshot data. For example, a low-latency database protocol buffer message may store data points for a visualization. A context protocol buffer message may store relational search unit query data. An automatic analysis request protocol buffer message may store automatic analysis request data. A snapshot protocol buffer message may store query signatures, timestamps, and low-latency database response data. A subscription details protocol buffer message may store visualization identifiers, user identifiers, subscription identifiers, snapshot timestamp data, user email data, query signature data, low-latency query set data, automatic analysis request data, and auto analyze flag data.

The snapshot unit 9000 may generate and send per-subscription notifications, such as email notifications to users, indicating corresponding analysis results. For example, the notifications may include, or indicate, daily differential data, autonomous-analysis insight differential data, long-term (such as greater than one day) differential snapshot data, and the like.

A subscription may identify intent to track an object, such as a principal, object, schedule, priority, notification rule, or the like. A principal is the user (or group) associated with the current context. Priority defines the priority of the subscription and is used to order query execution. A result snapshot may be results of object execution query results at a defined temporal point (t). The scheduler is a scheduling engine that takes a subscription and creates a result snapshot. The result store is a storage layer to store result snapshots. The analyzer analyzes result snapshots to provide autonomous-analysis insights, includes text summary corresponding to the autonomous-analysis insight. Edge analysis includes moving analysis to the user device (e.g. phone, browser). Relevance is a determinable metric based on the probabilistic utility of autonomous-analysis insights. The delivery engine may send autonomous-analysis insights for access by users or subscribers. A notification rule may be a user specific, notification in-use status flag (e.g., on/off), indicating whether to notify if a defined threshold is met. A feedback loop may receive feedback, such as based on user input, on relevance of results, used to fine tune relevance.

As used herein, the terminology "computer" or "computing device" includes any unit, or combination of units, capable of performing any method, or any portion or portions thereof, disclosed herein.

As used herein, the terminology "processor" indicates one or more processors, such as one or more special purpose processors, one or more digital signal processors, one or more microprocessors, one or more controllers, one or more microcontrollers, one or more application processors, one or more central processing units (CPU)s, one or more graphics processing units (GPU)s, one or more digital signal processors (DSP)s, one or more application specific integrated circuits (ASIC)s, one or more application specific standard products, one or more field programmable gate arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the terminology "determine," "identify," "obtain," and "form" or any variations thereof, includes selecting, ascertaining, computing, looking up, receiving, determining, establishing, obtaining, or otherwise identifying or determining in any manner whatsoever using one or more of the devices and methods shown and described herein.

As used herein, the term "computing device" includes any unit, or combination of units, capable of performing any method, or any portion or portions thereof, disclosed herein.

As used herein, the terminology "example," "embodiment," "implementation," "aspect," "feature," or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "or" is intended to mean an inclusive "or" rather than an exclusive "or." That is, unless specified otherwise, or clear from context, "X includes A or B" is intended to indicate any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

Although some embodiments herein refer to methods, it will be appreciated by one skilled in the art that they may also be embodied as a system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "processor," "device," or "system." Furthermore, aspects of the present invention may take the form of a computer program product embodied in one or more computer readable mediums having computer readable program code embodied thereon. Any combination of one or more computer readable mediums may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to CDs, DVDs, wireless, wireline, optical fiber cable, RF, etc., or any suitable combination of the foregoing.

Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Attributes may comprise any data characteristic, category, content, etc. that in one example may be non-quantifiable or non-numeric. Measures may comprise quantifiable numeric values such as sizes, amounts, degrees, etc. For example, a first column containing the names of states may be considered an attribute column and a second column containing the numbers of orders received for the different states may be considered a measure column.

Aspects of the present embodiments are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a computer, such as a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks. The flowcharts and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for use in a low-latency database analysis system, the method comprising:
 obtaining data expressing a usage intent with respect to the low-latency database analysis system, wherein the data expressing the usage intent omits data corresponding to user input expressly requesting low-latency autonomous-analysis;
 obtaining requested results data based on the data expressing the usage intent;
 outputting requested visualization data representing at least a portion of the requested results data for presentation to a user; and
 in response to outputting the requested visualization data, obtaining low-latency autonomous-analysis data by performing low-latency autonomous-analysis based on the data expressing the usage intent, wherein low-latency autonomous-analysis includes:
  identifying an autonomous-analysis predicate based on the requested visualization data;
  obtaining a defined autonomous-analysis latency constraint;

obtaining the low-latency autonomous-analysis data based on the autonomous-analysis predicate in accordance with the defined autonomous-analysis latency constraint, such that the low-latency autonomous-analysis data differs from the requested results data; and outputting at least a portion of the low-latency autonomous-analysis data for presentation to a user.

2. The method of claim 1, wherein obtaining the defined autonomous-analysis latency constraint includes identifying a defined autonomous-analysis depth constraint.

3. The method of claim 1, wherein obtaining the low-latency autonomous-analysis data based on the autonomous-analysis predicate in accordance with the defined autonomous-analysis latency constraint includes:

identifying measure objects, wherein identifying the measure object includes:
in response to a determination that the autonomous-analysis predicate includes a requested measure, including the requested measure in the measure objects; and
in response to a determination that the autonomous-analysis predicate omits the requested measure:
identifying a requested attribute from the autonomous-analysis predicate;
identifying exploratory measures based on the requested attribute and in accordance with the defined autonomous-analysis latency constraint, wherein identifying the exploratory measures includes identifying probabilistic utility data corresponding to respective exploratory measures; and
including the exploratory measures in the measure objects; and identifying attribute objects, wherein identifying the attribute object includes:
in response to a determination that the autonomous-analysis predicate includes the requested attribute, including the requested attribute in the attribute objects;
identifying exploratory attributes based on the measure objects and in accordance with the defined autonomous-analysis latency constraint, wherein identifying the exploratory attributes includes identifying probabilistic utility data corresponding to respective exploratory attributes; and
including the exploratory attributes in the attribute objects.

4. The method of claim 3, wherein in response to a determination that the defined autonomous-analysis latency constraint indicates a maximum cardinality of exploratory measures, identifying the exploratory measures includes identifying up to the maximum cardinality of exploratory measures from a plurality of available measures such that the probabilistic utility of the exploratory measures is maximal.

5. The method of claim 3, wherein in response to a determination that the defined autonomous-analysis latency constraint indicates a maximum cardinality of exploratory attributes, identifying the exploratory attributes includes identifying up to the maximum cardinality of exploratory attributes from a plurality of available attributes such that the probabilistic utility of the exploratory attributes is maximal.

6. The method of claim 3, wherein obtaining the low-latency autonomous-analysis data includes:
obtaining low-latency autonomous-analysis insight data based on the measure objects and the attribute objects such that the low-latency autonomous-analysis insight data includes autonomous-analysis data other than the requested results data; and
in response to a determination that the data expressing the usage intent includes an expressly-specified request for data, obtaining low-latency autonomous-analysis related-request data based on the measure objects and the attribute objects such that the low-latency autonomous-analysis related-request data includes a resolved-request that differs from a resolved-request corresponding to the expressly-specified request for data.

7. The method of claim 6, wherein obtaining the low-latency autonomous-analysis insight data includes:
in response to a determination that the defined autonomous-analysis latency constraint indicates a defined maximum cardinality of outlier autonomous-analysis insight datasets, automatically generating outlier autonomous-analysis insight datasets up to the defined maximum cardinality of outlier autonomous-analysis insight datasets;
in response to a determination that the defined autonomous-analysis latency constraint indicates a defined maximum cardinality of trend autonomous-analysis insight datasets, automatically generating trend autonomous-analysis insight datasets up to the defined maximum cardinality of trend autonomous-analysis insight datasets;
in response to a determination that the defined autonomous-analysis latency constraint indicates a defined maximum cardinality of cross-correlation autonomous-analysis insight datasets, automatically generating cross-correlation autonomous-analysis insight datasets up to the defined maximum cardinality of cross-correlation autonomous-analysis insight datasets;
in response to a determination that the defined autonomous-analysis latency constraint indicates a defined maximum cardinality of comparative autonomous-analysis insight datasets, automatically generating comparative autonomous-analysis insight datasets up to the defined maximum cardinality of comparative autonomous-analysis insight datasets; and
in response to a determination that the defined autonomous-analysis latency constraint indicates a defined exploratory results constraint, obtaining exploratory results in accordance with the defined exploratory results constraint.

8. The method of claim 1, wherein:
in response to a determination that the data expressing the usage intent includes an expressly-specified request for data:
obtaining requested results data based on the data expressing the usage intent includes:
generating a resolved-request based on the expressly-specified request for data;
generating a data-query based on the resolved-request; and
obtaining the requested results data from a distributed in-memory database of the low-latency database analysis system;
outputting the requested visualization data includes generating the requested visualization data such that the requested visualization data represents the requested results data; and
identifying the autonomous-analysis predicate includes identifying the resolved-request as the autonomous-analysis predicate.

9. The method of claim 1, wherein:
in response to a determination that the data expressing the usage intent includes an expressly-specified request for objects:
  obtaining requested results data based on the data expressing the usage intent includes:
    identifying previously generated analytical-objects responsive to the expressly-specified request for objects; and
    including, in the requested results data, requested results data portions respectively representing the previously generated analytical-objects;
  outputting the requested visualization data includes including, in the requested visualization data, requested visualization data portions, wherein a requested visualization data portion from the requested visualization data portions is based on a respective requested results data portion from the requested results data portions and represents a corresponding previously generated analytical-object from the previously generated analytical-objects; and
  identifying the autonomous-analysis predicate includes identifying a plurality of autonomous-analysis predicates, such that an autonomous-analysis predicate from the plurality of autonomous-analysis predicates corresponds to a respective requested visualization data portion from the requested visualization data portions.

10. The method of claim 1, wherein:
in response to a determination that the data expressing the usage intent includes a requested object identifier of a previously generated object:
  obtaining requested results data based on the data expressing the usage intent includes:
    obtaining object data for the previously generated object based on the requested object identifier;
    in response to a determination that the object data for the previously generated object indicates a plurality of previously generated analytical-objects, obtaining object data for respective previously generated analytical-objects from the plurality of previously generated analytical-objects; and
    including the object data in the requested results data;
  outputting the requested visualization data includes:
    in response to the determination that the previously generated object indicates the plurality of previously generated analytical-objects, including, in the requested visualization data, requested visualization data portions, wherein a requested visualization data portion from the requested visualization data portions is based on the object data for a corresponding previously generated analytical-object from the previously generated analytical-objects and represents the corresponding previously generated analytical-object from the previously generated analytical-objects; and
    in response to a determination that the previously generated object omits indicating the plurality of previously generated analytical-objects, including, in the requested visualization data, visualization data based on the object data and representing the previously generated object; and
  identifying the autonomous-analysis predicate includes:
    in response to the determination that the previously generated object indicates the plurality of previously generated analytical-objects, identifying a plurality of autonomous-analysis predicates, such that an autonomous-analysis predicate from the plurality of autonomous-analysis predicates corresponds to a respective requested visualization data portion from the requested visualization data portions; and
    in response to the determination that the previously generated object omits indicating the plurality of previously generated analytical-objects, identifying the previously generated object as the autonomous-analysis predicate.

11. The method of claim 1, wherein:
in response to a determination that the data expressing the usage intent omits an expressly-specified request for data, an expressly-specified request for objects, and a requested object identifier:
  obtaining requested results data based on the data expressing the usage intent includes:
    identifying previously generated objects based on the data expressing the usage intent; and
    including, in the requested results data, requested results data portions respectively representing the previously generated objects;
  outputting the requested visualization data includes including, in the requested visualization data, requested visualization data portions, wherein a requested visualization data portion from the requested visualization data portions is based on a respective requested results data portion from the requested results data portions and represents the corresponding previously generated object from the previously generated objects; and
  identifying the autonomous-analysis predicate includes identifying a plurality of autonomous-analysis predicates, such that an autonomous-analysis predicate from the plurality of autonomous-analysis predicates corresponds to a respective requested visualization data portion from the requested visualization data portions.

12. The method of claim 1, wherein outputting the portion of the low-latency autonomous-analysis data includes:
  generating a first object representing the portion of the low-latency autonomous-analysis data, such that the first object includes a resolved-request corresponding to the portion of the low-latency autonomous-analysis data.

13. The method of claim 12, further comprising:
  obtaining data expressing a second usage intent with respect to the low-latency database analysis system, wherein the data expressing the second usage intent omits data corresponding to user input expressly requesting autonomous-analysis, and wherein the data expressing the second usage intent includes data indicating the first object;
  obtaining second requested results data based on the first object;
  outputting second requested visualization data representing at least a portion of the second requested results data for presentation to a user; and
  in response to outputting the second requested visualization data, obtaining second low-latency autonomous-analysis data by performing low-latency autonomous-analysis based on the data expressing the second usage intent, wherein low-latency autonomous-analysis includes identifying a second autonomous-analysis predicate based on the first object, such that the second low-latency autonomous-analysis data differs from the second requested results data.

14. A method for use in a low-latency database analysis system, the method comprising:
    obtaining data expressing a usage intent with respect to the low-latency database analysis system, wherein the data expressing the usage intent omits data corresponding to user input expressly requesting low-latency autonomous-analysis;
    obtaining requested results data based on the data expressing the usage intent;
    outputting requested visualization data representing at least a portion of the requested results data for presentation to a user; and
    in response to outputting the requested visualization data:
        obtaining a defined autonomous-analysis latency constraint, wherein obtaining the defined autonomous-analysis latency constraint includes identifying a value of an autonomous-analysis depth constraint, wherein a first candidate value of the autonomous-analysis depth constraint indicates the omission of low-latency autonomous-analysis;
        in response to a determination that the value of the autonomous-analysis depth constraint is a second candidate value of the autonomous-analysis depth constraint that differs from the first candidate value of the autonomous-analysis depth constraint, obtaining low-latency autonomous-analysis data by:
            identifying an autonomous-analysis predicate based on the requested visualization data;
            identifying a requested data portion based on the autonomous-analysis predicate;
            obtaining the low-latency autonomous-analysis data, in accordance with the autonomous-analysis depth constraint, based on the requested data portion; and
            outputting a visualization card representing at least a portion of the low-latency autonomous-analysis data for presentation to a user.

15. The method of claim 14, wherein, the value of the autonomous-analysis depth constraint is a third candidate value of the autonomous-analysis depth constraint that differs from the first candidate value of the autonomous-analysis depth constraint and the second candidate value of the autonomous-analysis depth constraint, or a fourth candidate value of the autonomous-analysis depth constraint that differs from the first candidate value of the autonomous-analysis depth constraint, the second candidate value of the autonomous-analysis depth constraint, and the third candidate value of the autonomous-analysis depth constraint.

16. The method of claim 15, wherein, in response to a determination that the value of the autonomous-analysis depth constraint is the third candidate value, obtaining the low-latency autonomous-analysis data includes:
    obtaining at least one exploratory data portion, in accordance with the autonomous-analysis depth constraint, based on the requested data portion and probabilistic utility data, wherein obtaining the at least one exploratory data portion includes:
        obtaining up to one exploratory measure; and
        obtaining up to one exploratory attribute; and
    obtaining the low-latency autonomous-analysis data based on the requested data portion and the exploratory data portions.

17. The method of claim 15, wherein, in response to a determination that the value of the autonomous-analysis depth constraint is the fourth candidate value, obtaining the low-latency autonomous-analysis data includes:
    obtaining at least one exploratory data portion, in accordance with the autonomous-analysis depth constraint, based on the requested data portion and probabilistic utility data, wherein obtaining the at least one exploratory data portion includes:
        obtaining up to one exploratory measure;
        determining a maximum cardinality of exploratory attributes as a result of raising two to the power of the value of the autonomous-analysis depth constraint minus two; and
        obtaining up to the maximum cardinality of exploratory attributes; and
    obtaining the low-latency autonomous-analysis data based on the requested data portion and the exploratory data portions.

18. A method for use in a low-latency database analysis system, the method comprising:
    obtaining data expressing a usage intent with respect to the low-latency database analysis system, wherein the data expressing the usage intent omits data corresponding to user input expressly requesting low-latency autonomous-analysis;
    obtaining requested results data based on the data expressing the usage intent, wherein obtaining the requested results data includes identifying a first resolved-request corresponding to an expressly-specified request for data;
    outputting requested visualization data representing at least a portion of the requested results data for presentation to a user; and
    in response to outputting the requested visualization data, and in response to a determination that the data expressing the usage intent includes an expressly-specified request for data, obtaining low-latency autonomous-analysis related-request data by:
        identifying an autonomous-analysis predicate based on the requested visualization data;
        obtaining a defined autonomous-analysis related-request latency constraint;
        obtaining the low-latency autonomous-analysis related-request data based on the autonomous-analysis predicate in accordance with the defined autonomous-analysis related-request latency constraint, such that the low-latency autonomous-analysis related-request data includes a second resolved-request that differs from the first resolved-request; and
        outputting at least a portion of the low-latency autonomous-analysis related-request data for presentation to a user.

19. The method of claim 18, wherein:
    in response to a determination that the first resolved-request includes a requested measure and a requested attribute, obtaining the low-latency autonomous-analysis related-request data includes identifying the second resolved-request, such that:
        a first portion of the second resolved-request includes the requested measure, the requested attribute, and an exploratory attribute;
        a second portion of the second resolved-request includes the requested measure and an exploratory attribute and omits the requested attribute;
        in response to a determination that the first resolved-request includes a requested filter, a third portion of the second resolved-request includes the requested measure, the requested attribute, and an exploratory filter and omits the requested filter; and a fourth portion of the second resolved-request:
  omits the requested measure and the requested attribute;
  includes an exploratory measure and the exploratory attribute; and
  is generated based on probabilistic similarity of the fourth portion of the second resolved-request to the first resolved-request.

20. The method of claim 18, further comprising:
obtaining data expressing a second usage intent with respect to the low-latency database analysis system, wherein the data expressing the second usage intent omits data corresponding to user input expressly requesting autonomous-analysis includes the second resolved-request;
obtaining second requested results data based on the second resolved-request;
outputting second requested visualization data representing at least a portion of the second requested results data for presentation to a user; and
in response to outputting the second requested visualization data, obtaining second low-latency autonomous-analysis related-request data based on the second resolved-request, such that the second low-latency autonomous-analysis related-request data includes a third resolved-request that differs from the second resolved-request.

* * * * *